United States Patent [19]
Wilson et al.

[11] Patent Number: 5,964,609
[45] Date of Patent: *Oct. 12, 1999

[54] MODULAR COMMUNICATION CABLING ARRANGEMENT

[75] Inventors: Harold R. Wilson, Hudsonville; Ross S. Johnson, Jenison, both of Mich.

[73] Assignee: Haworth, Inc., Holland, Mich.

[*] Notice: This patent issued on a continued prosecution application filed under 37 CFR 1.53(d), and is subject to the twenty year patent term provisions of 35 U.S.C. 154(a)(2).

[21] Appl. No.: 08/846,622

[22] Filed: Apr. 30, 1997

Related U.S. Application Data

[63] Continuation-in-part of application No. 08/814,280, Mar. 10, 1997, which is a continuation of application No. 08/447,176, May 19, 1995, abandoned, which is a continuation-in-part of application No. 08/377,743, Jan. 25, 1995, abandoned.

[51] Int. Cl.⁶ .................................................. H01R 13/502
[52] U.S. Cl. .......................... 439/215; 439/225; 439/701
[58] Field of Search ..................................... 439/215, 211, 439/210, 701, 540.1, 225; 174/48

[56] References Cited

U.S. PATENT DOCUMENTS

| | | | |
|---|---|---|---|
| 3,638,164 | 1/1972 | Glance et al. | 339/49 |
| 3,958,850 | 5/1976 | Ayer . | |
| 3,984,622 | 10/1976 | Ross | 174/72 |
| 4,153,326 | 5/1979 | Frantz et al. | 339/99 |
| 4,227,764 | 10/1980 | Fiske . | |
| 4,303,296 | 12/1981 | Spaulding . | |
| 4,349,239 | 9/1982 | Roberts et al. | 339/97 |
| 4,595,799 | 6/1986 | Krob et al. | 179/98 |
| 4,748,541 | 5/1988 | Nozick | 361/426 |
| 4,795,356 | 1/1989 | Pauza | 439/225 |
| 4,898,549 | 2/1990 | Nakama et al. | 439/701 |
| 4,973,796 | 11/1990 | Dougherty et al. | 174/48 |
| 5,104,332 | 4/1992 | McCoy | 439/290 |
| 5,127,082 | 6/1992 | Below et al. | 385/135 |
| 5,160,276 | 11/1992 | Marsh et al. | 439/502 |
| 5,205,762 | 4/1993 | Carney | 439/607 |

(List continued on next page.)

FOREIGN PATENT DOCUMENTS

| | | |
|---|---|---|
| 2 609 218 | 7/1988 | France . |
| 4162898 | 8/1992 | Japan . |
| 6251847 | 9/1994 | Japan . |

OTHER PUBLICATIONS

U.S. Patent Application No. 08/377 915, filed Jan. 25, 1995 (also see corresponding PCT application below).
PCT International Publication No. WO 96/23340, Aug. 1, 1996.

*Primary Examiner*—Gary F. Paumen
*Attorney, Agent, or Firm*—Flynn, Thiel, Boutell & Tanis, P.C.

[57] ABSTRACT

A modular communication system, particularly for interior space-dividing wall panels which are serially-connected together to define a plurality of adjacent workstations. The modular communication system is defined by a plurality of prefabricated modules, one of which is an elongate main distribution module mountable within a raceway which extends horizontally longitudinally of the panel. This elongate main distribution module, in one embodiment, has a length which approximately corresponds to the panel length, and has terminals or connectors at opposite ends so that a plurality of main distribution modules can be serially-connected to extend along a plurality of serially-connected panels. The main communication modules define a plurality of telecommunication links (i.e., paths), with each link preferably being defined by eight conductors (i.e., four pairs). The system also includes tap-off modules which cooperate with the main distribution modules to permit one (two in the preferred embodiment) link to be tapped off at a workstation for connection to communication equipment (i.e. a telephone and/or a computer). The tap-off module permits only the selected link or links to be tapped off and accessible at the workstation.

19 Claims, 60 Drawing Sheets

U.S. PATENT DOCUMENTS

| | | | |
|---|---|---|---|
| 5,272,277 | 12/1993 | Humbles et al. | 174/48 |
| 5,303,320 | 4/1994 | Duffie | 385/135 |
| 5,378,166 | 1/1995 | Gallagher, Sr. | 439/540.1 |
| 5,431,573 | 7/1995 | Endo et al. | 439/157 |
| 5,431,578 | 7/1995 | Wayne | 439/259 |
| 5,431,584 | 7/1995 | Ferry | 439/620 |
| 5,451,714 | 9/1995 | Duffie | 174/48 |
| 5,460,545 | 10/1995 | Siemon et al. | 439/308 |
| 5,593,317 | 1/1997 | Humbles | 439/502 |
| 5,634,817 | 6/1997 | Siemon et al. | 439/608 |
| 5,719,933 | 2/1998 | Welch | 379/397 |
| 5,725,397 | 3/1998 | Fukamachi et al. | 439/701 |
| 5,816,386 | 10/1998 | Snow et al. | 439/215 |

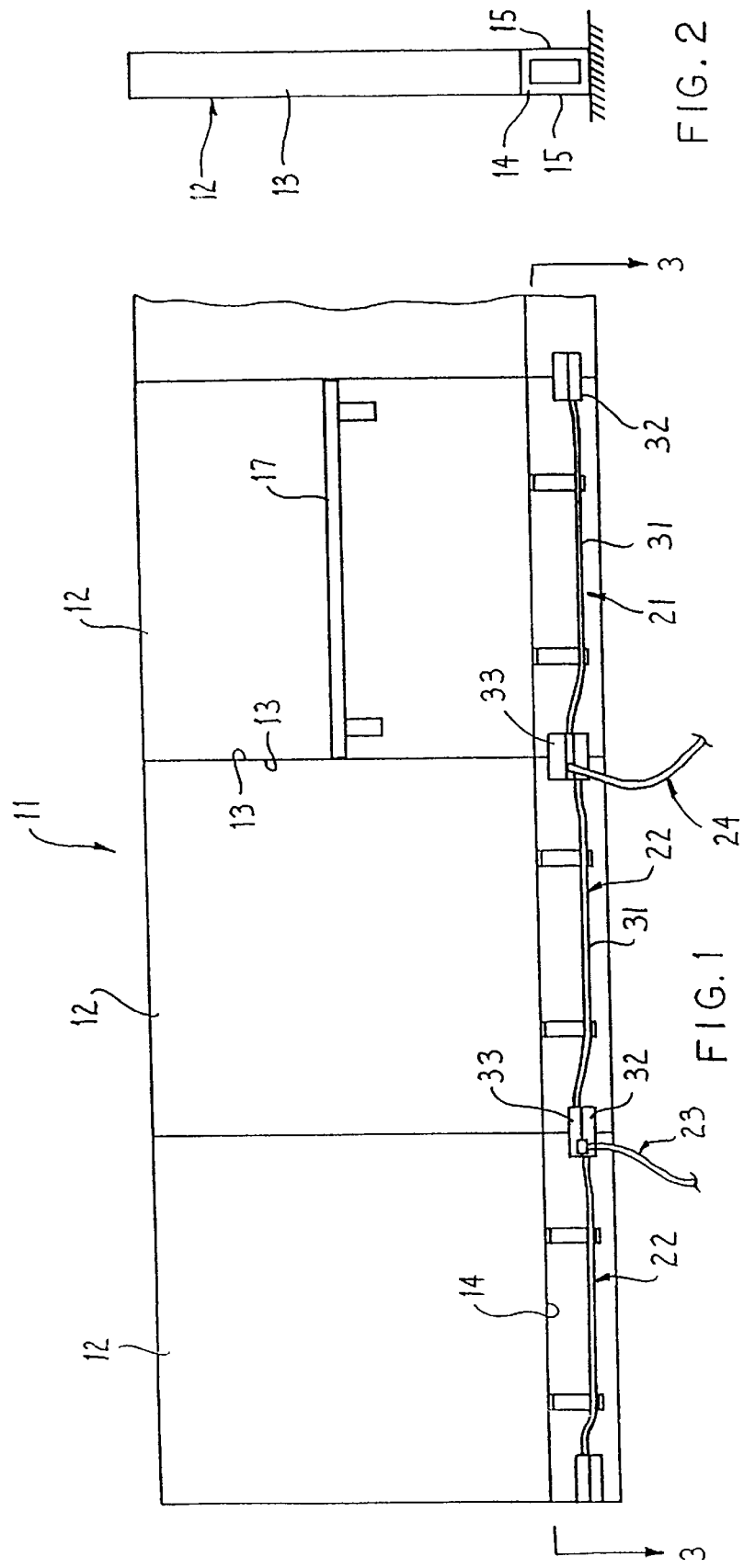

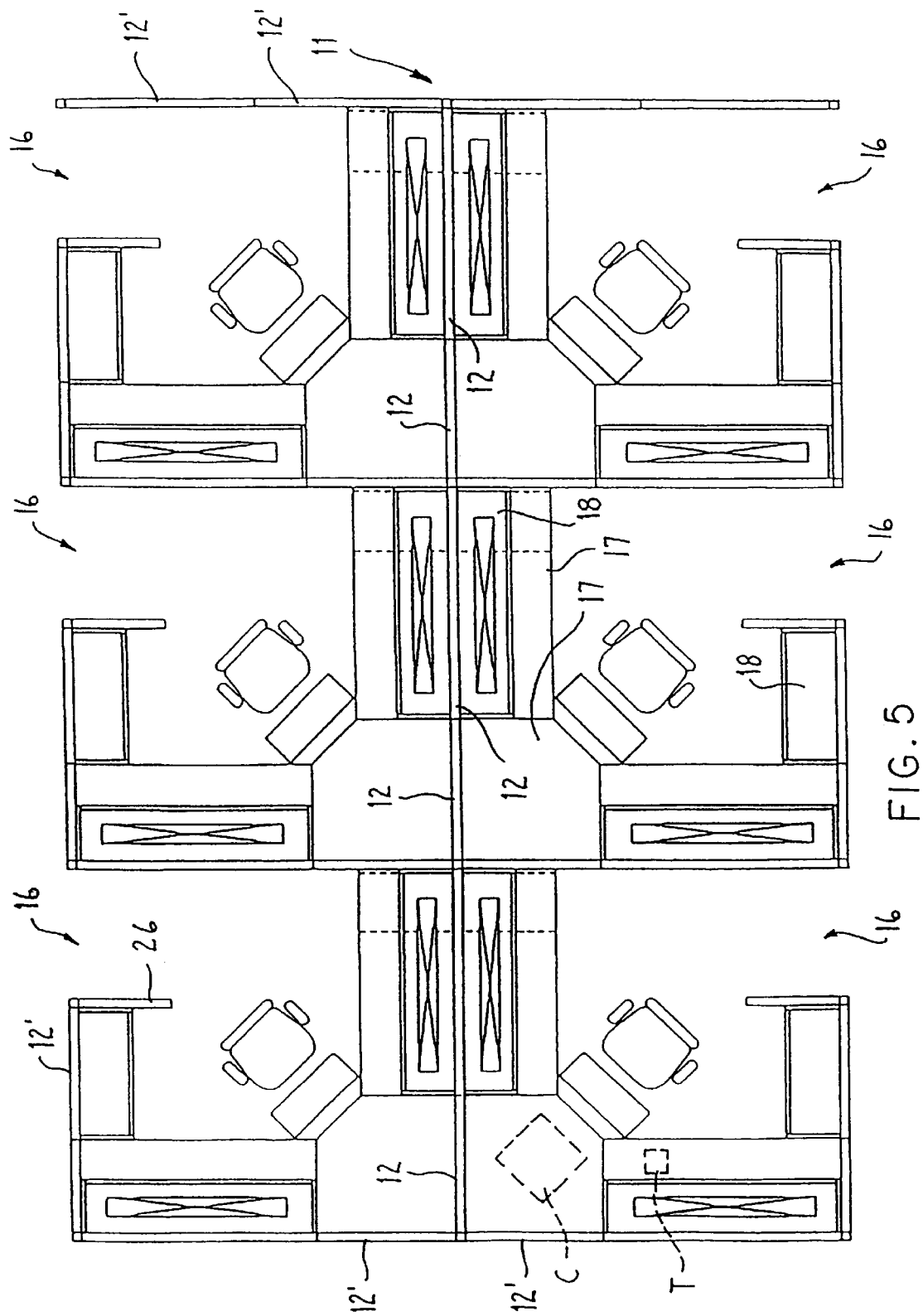

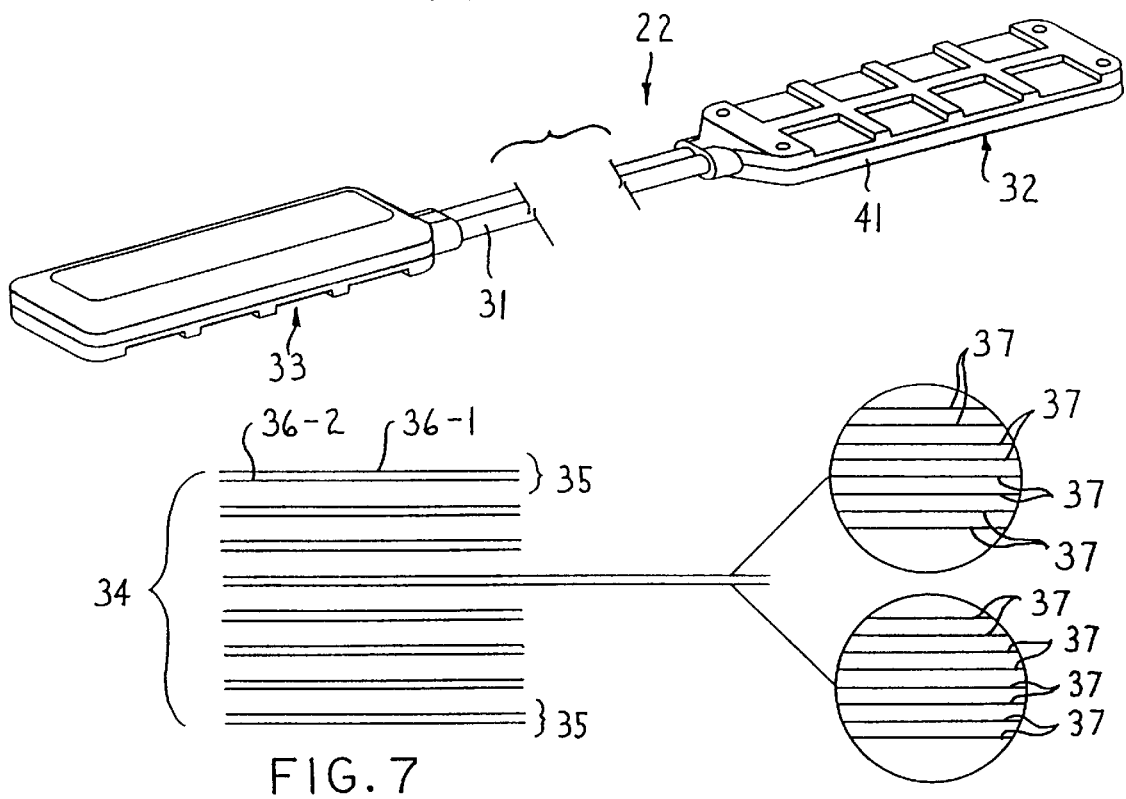
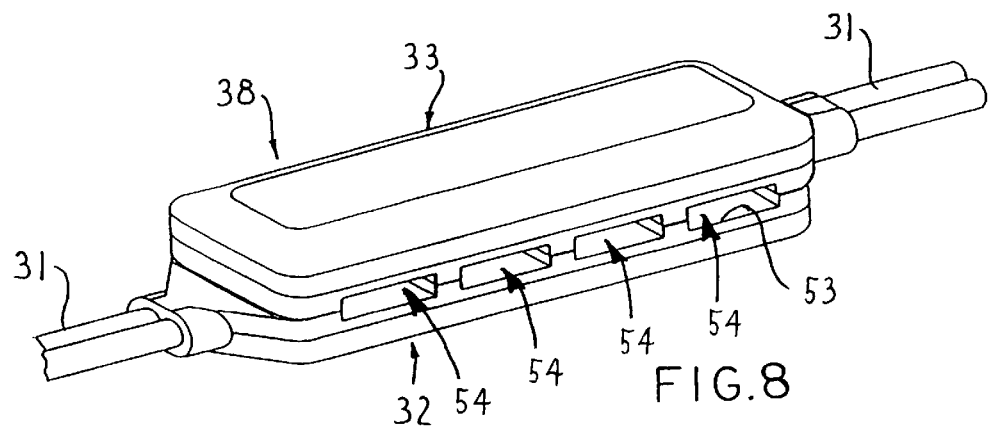

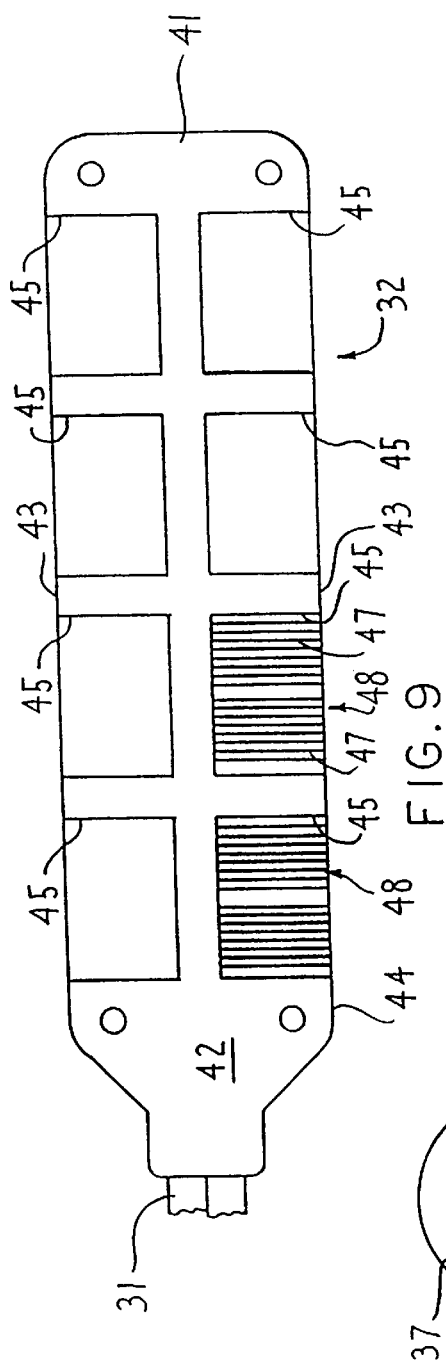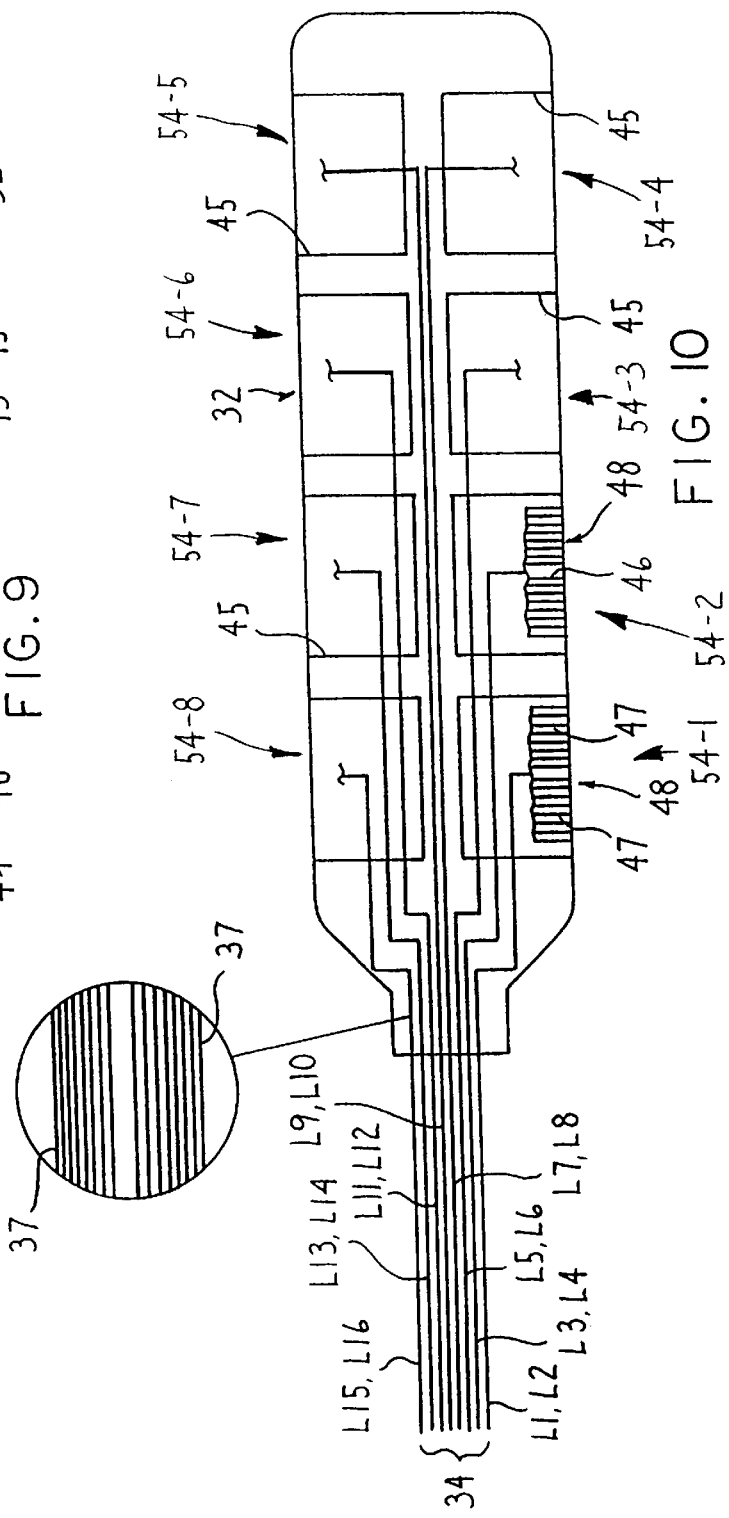

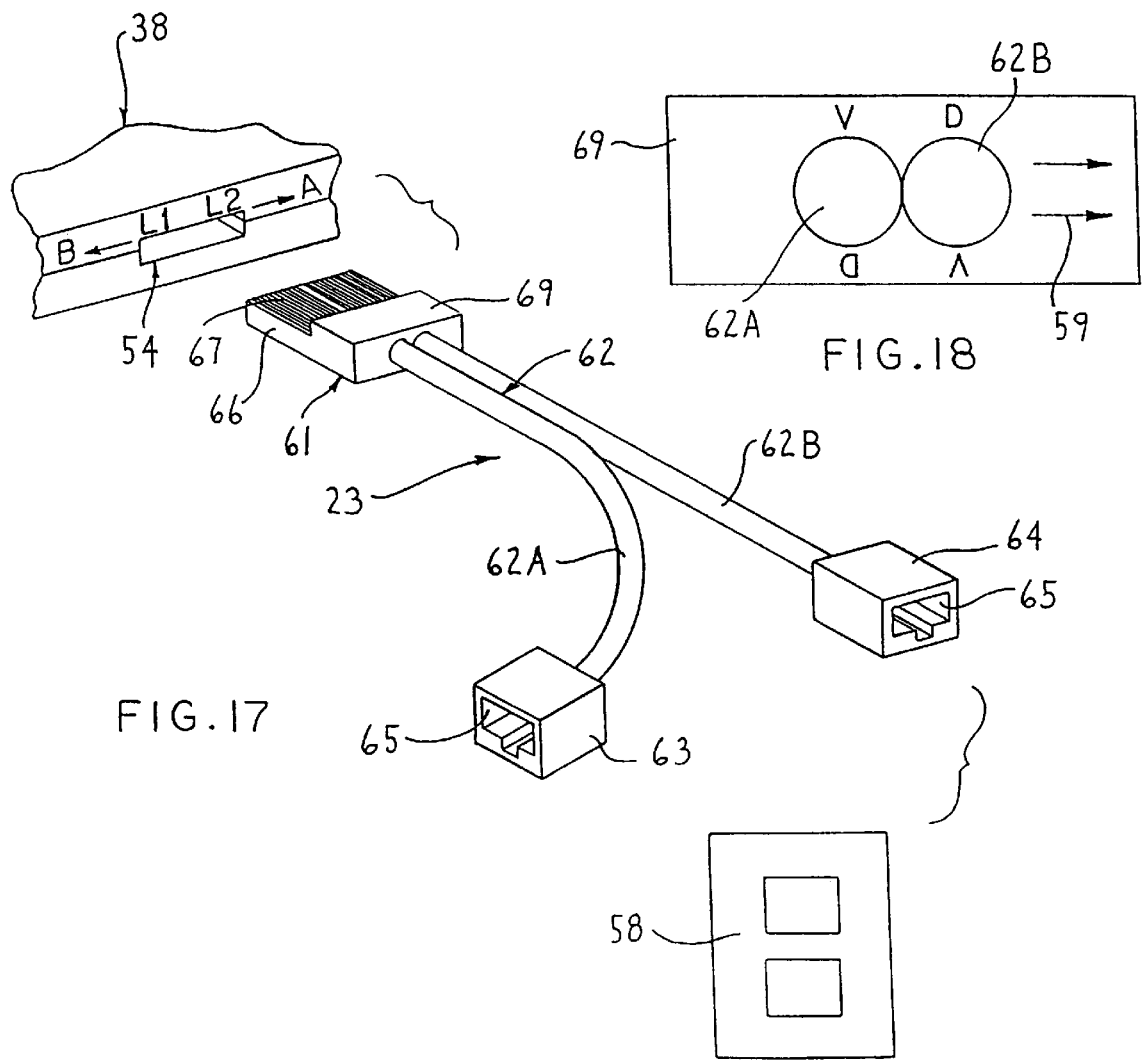

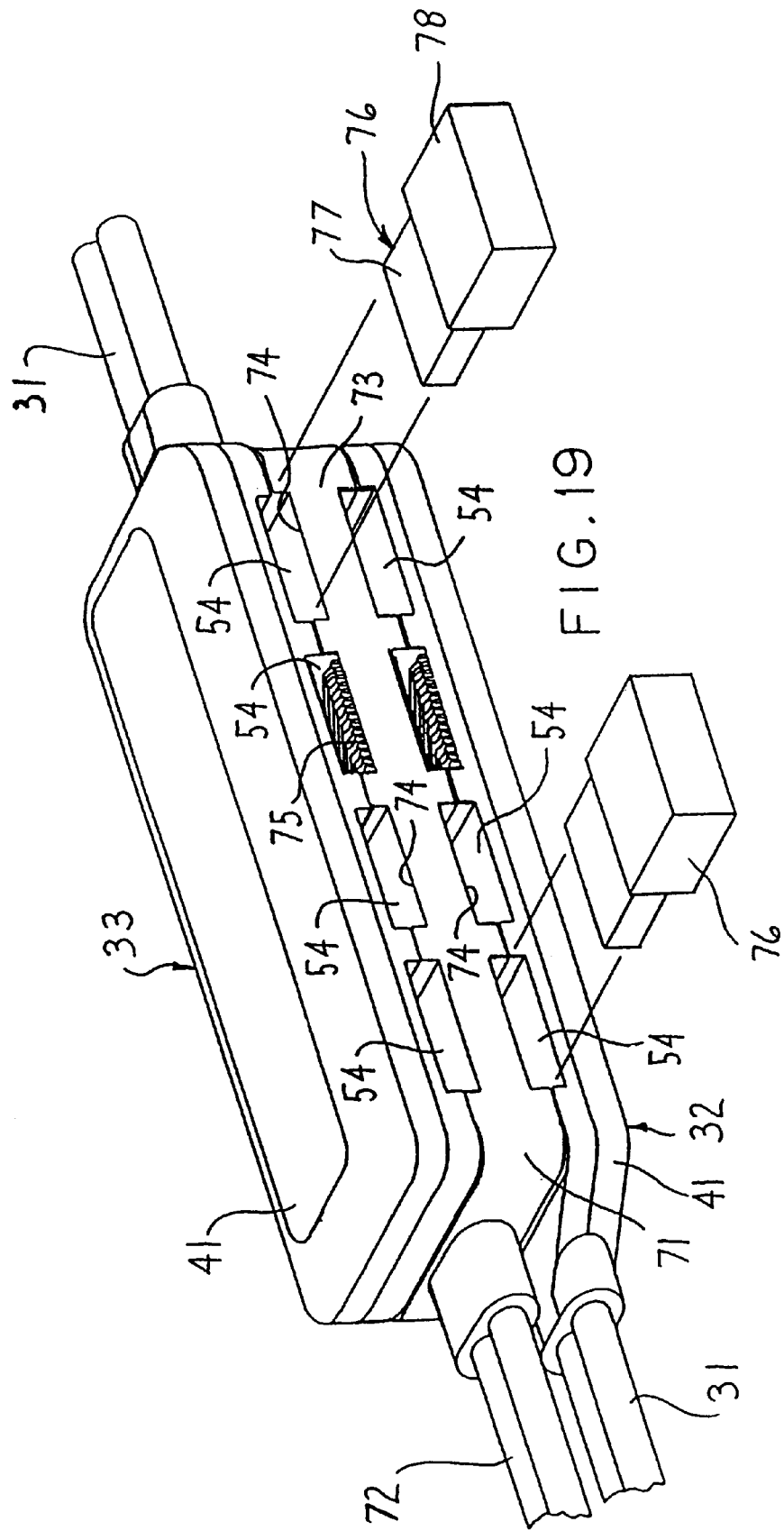

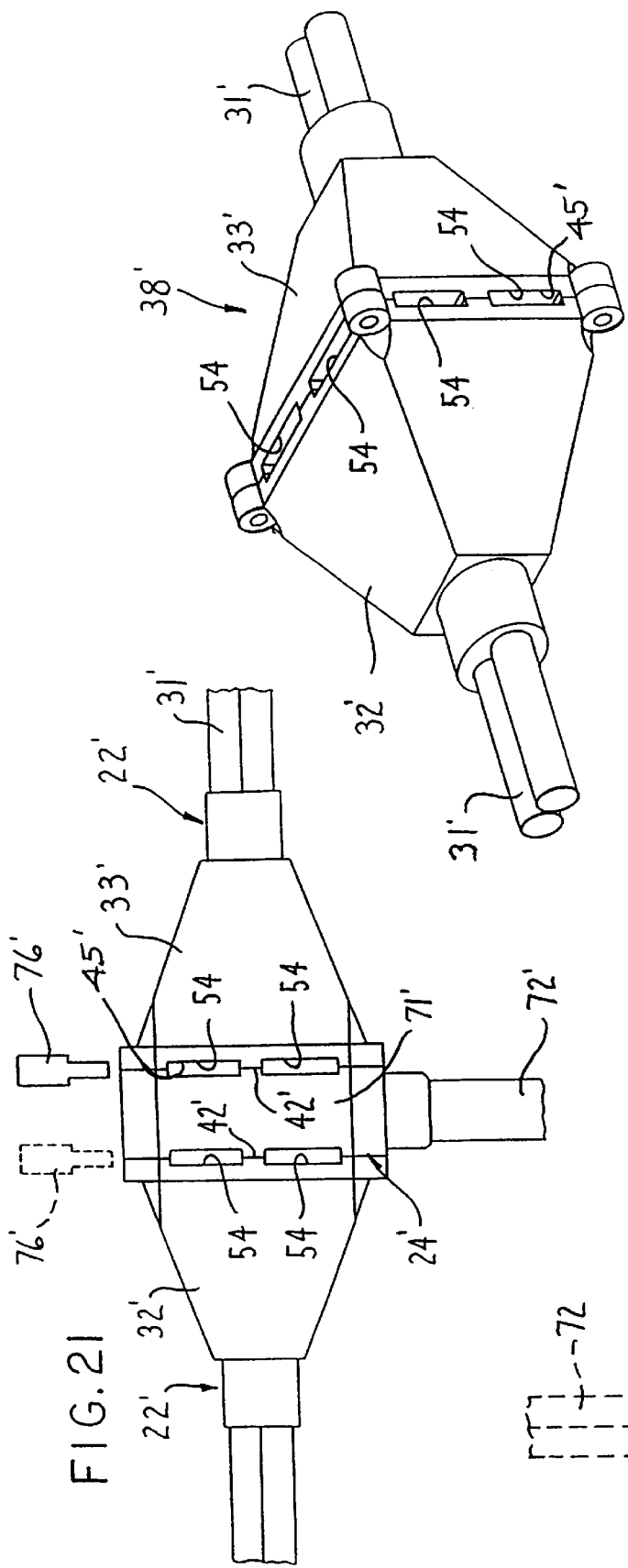
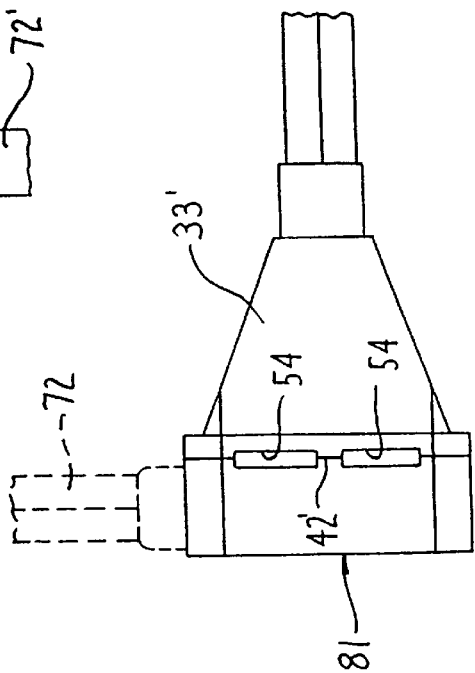
FIG. 20
FIG. 21
FIG. 22

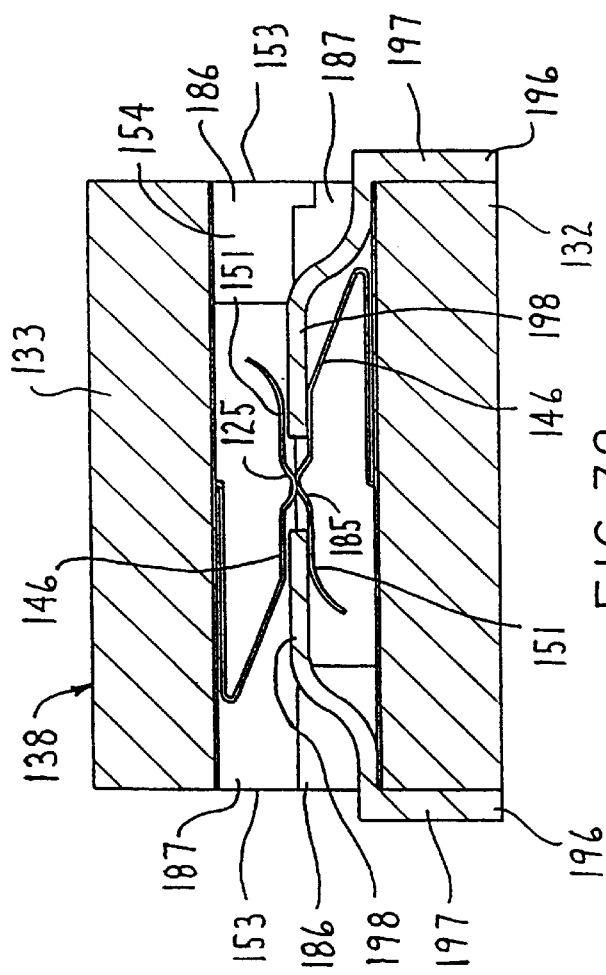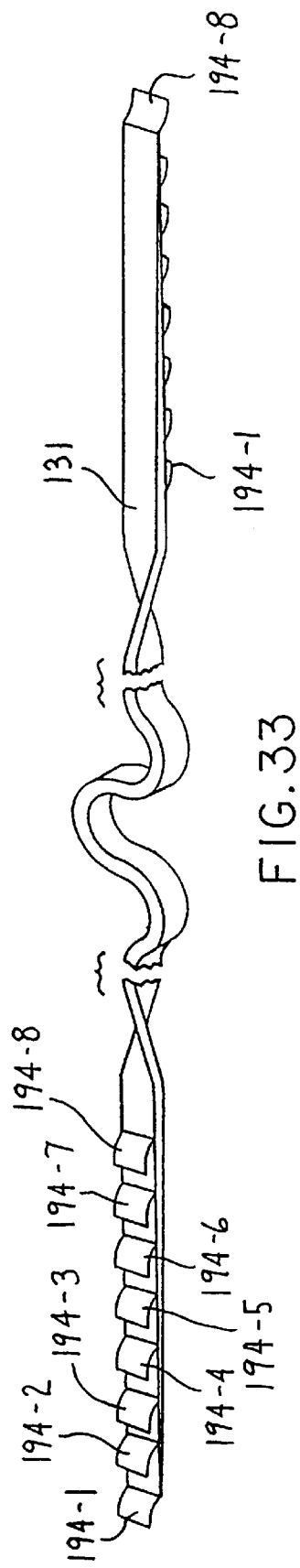
FIG. 32
FIG. 33

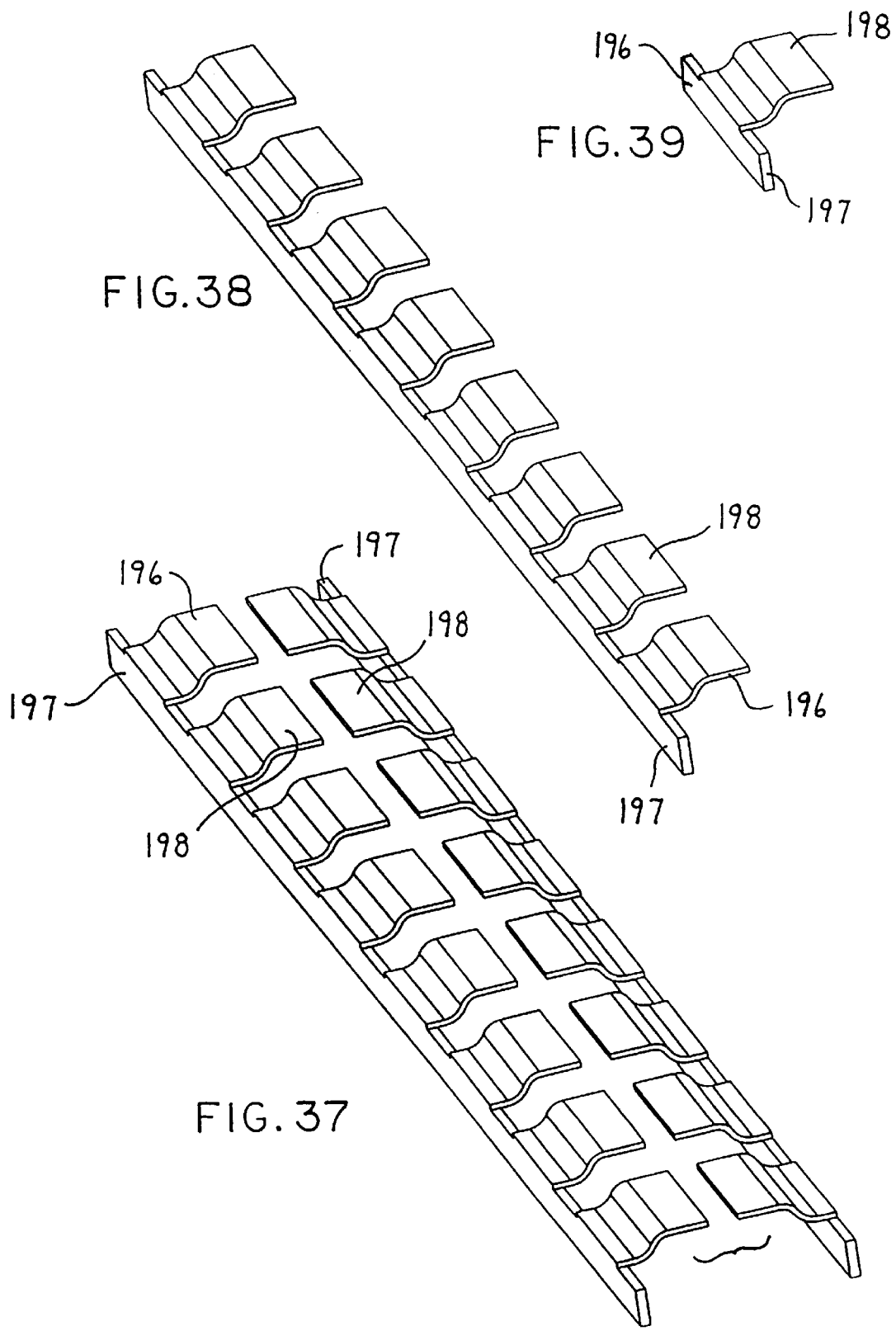

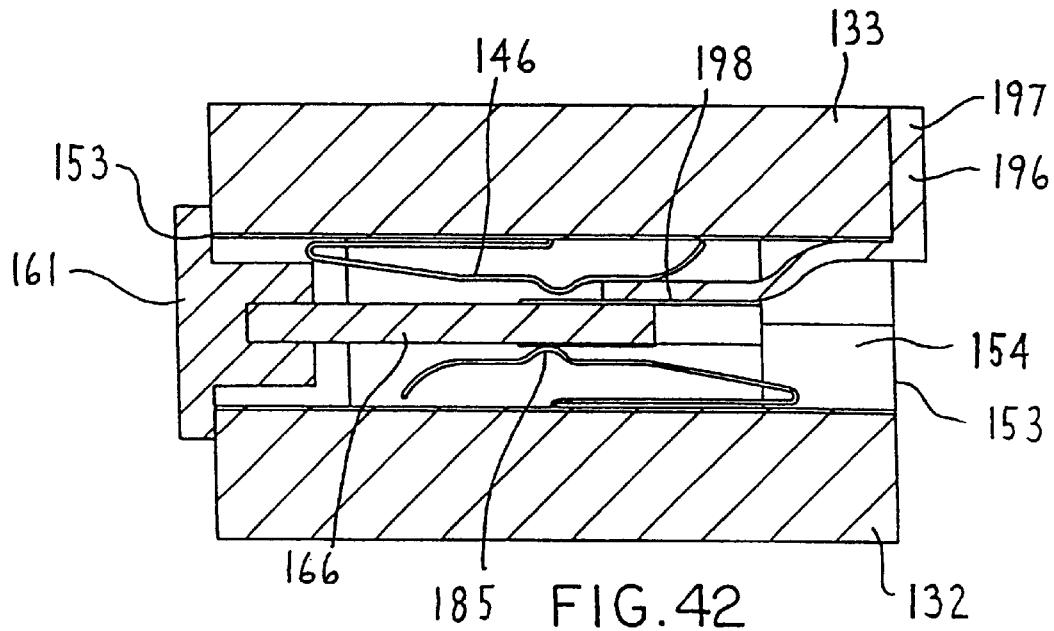
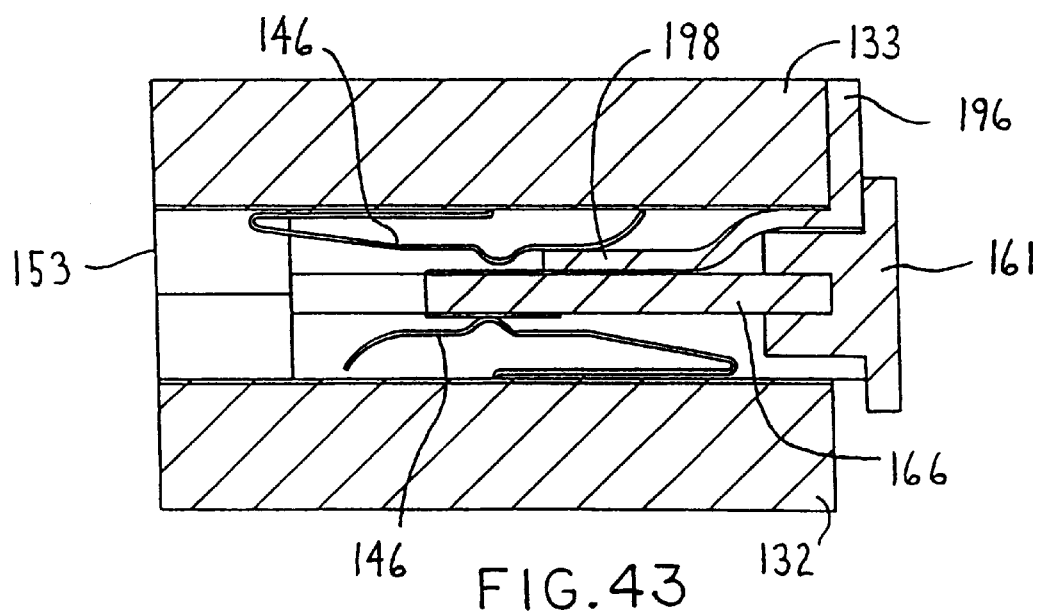

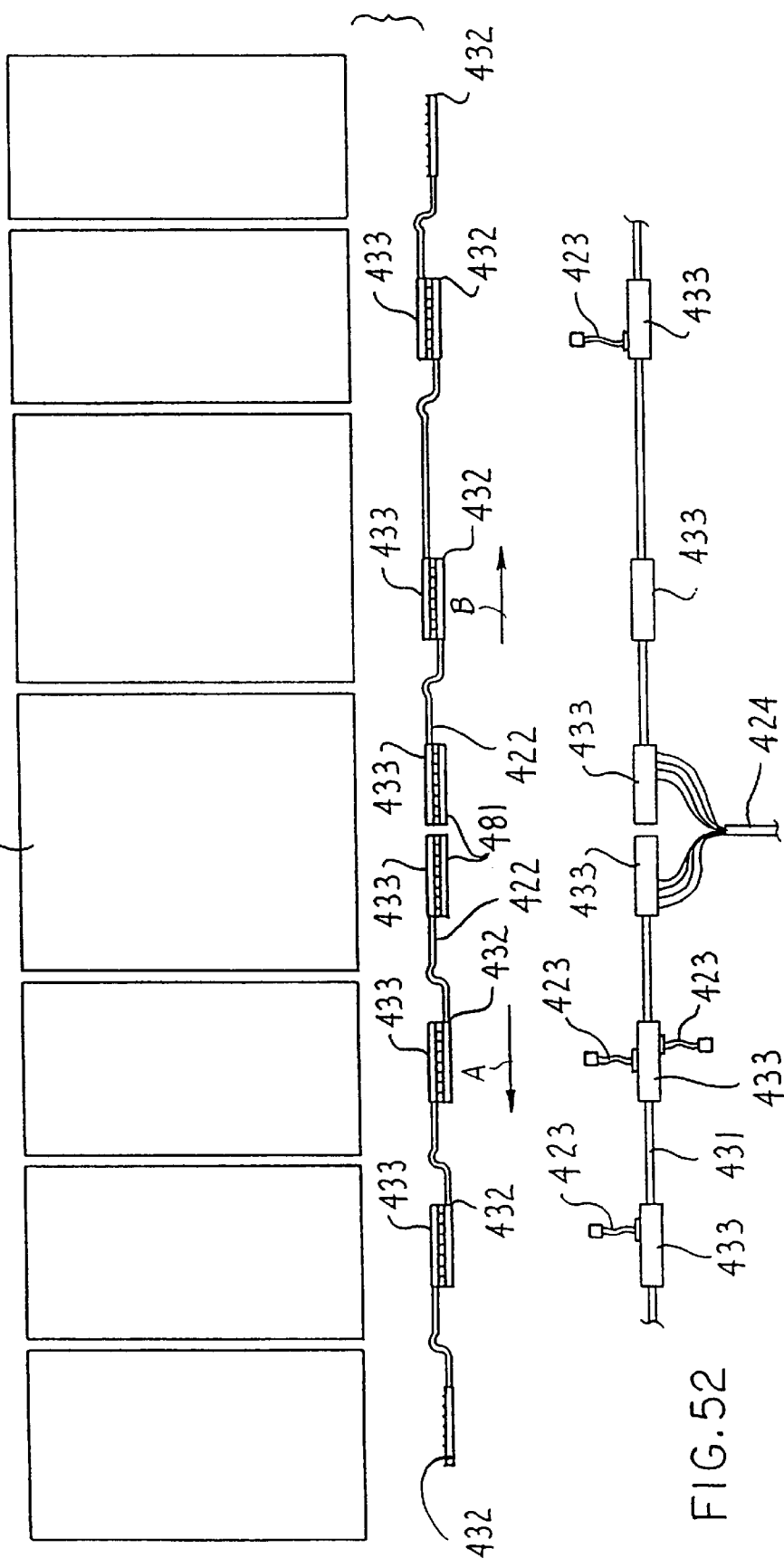

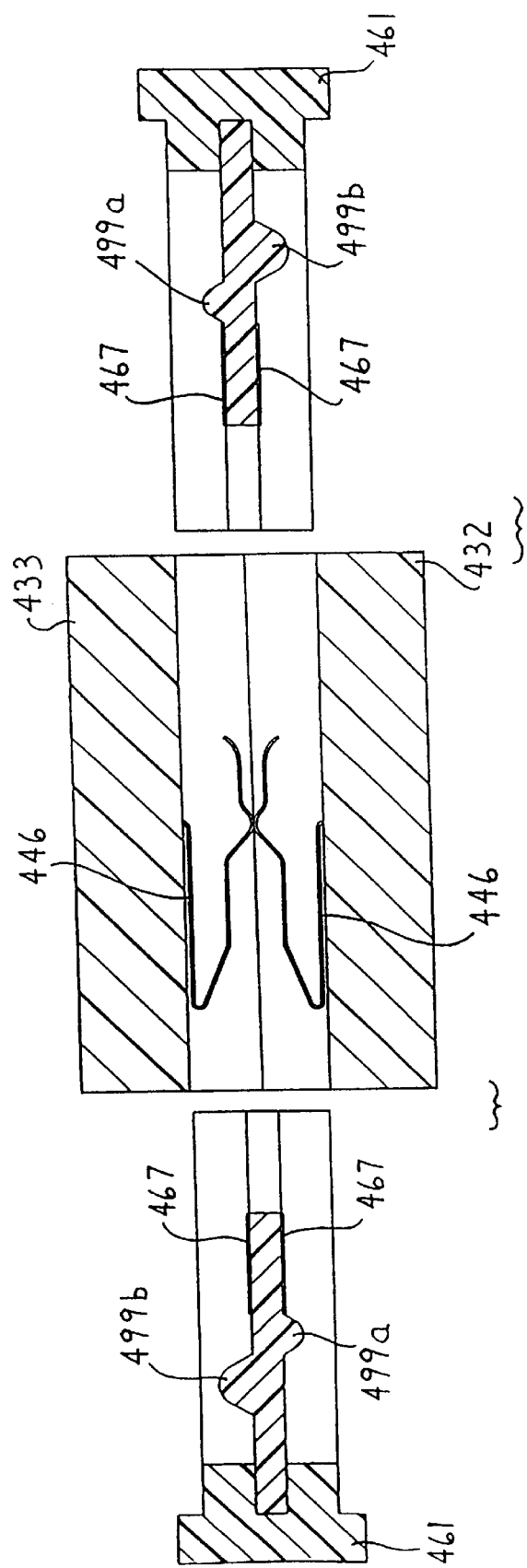

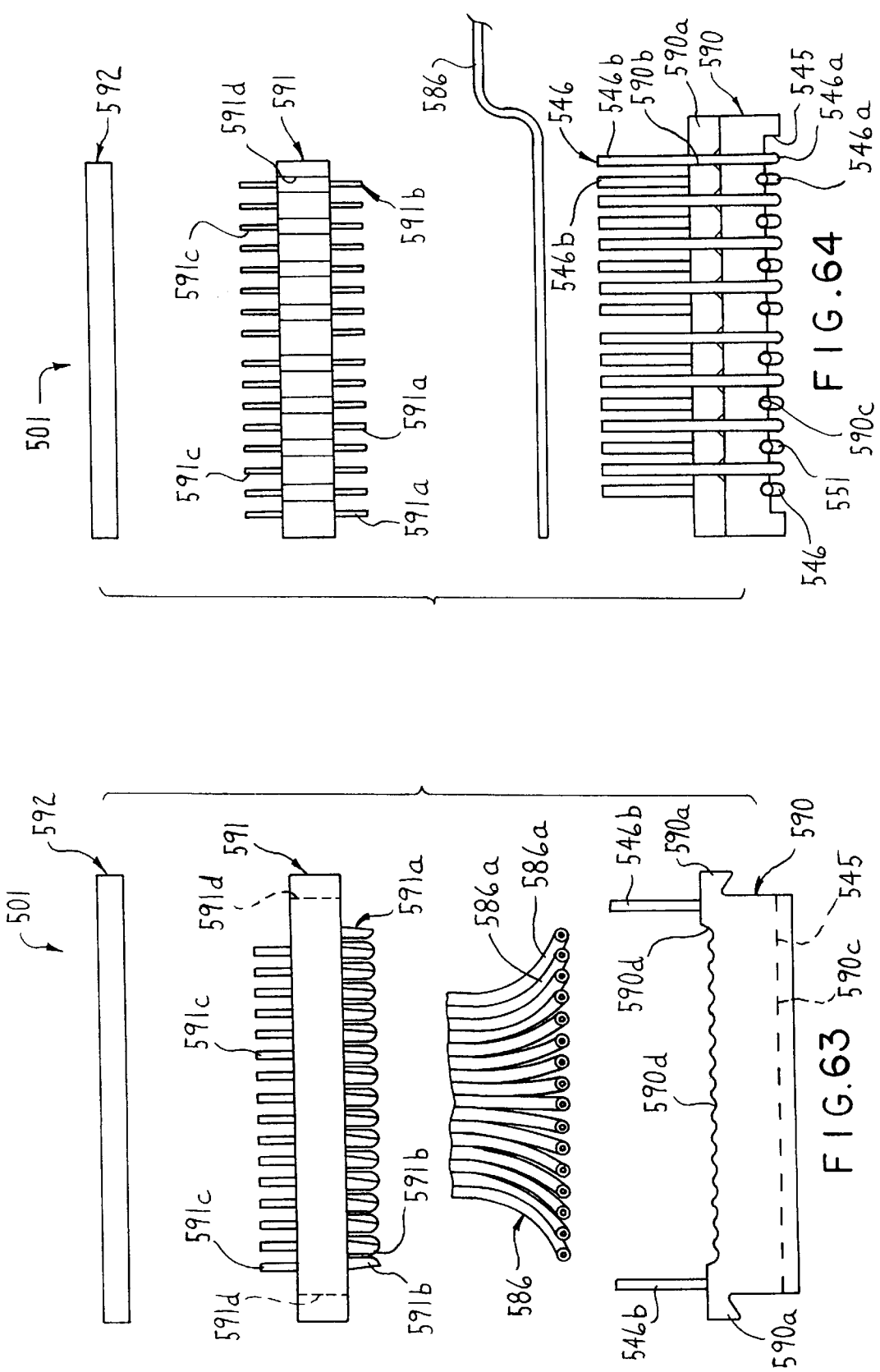

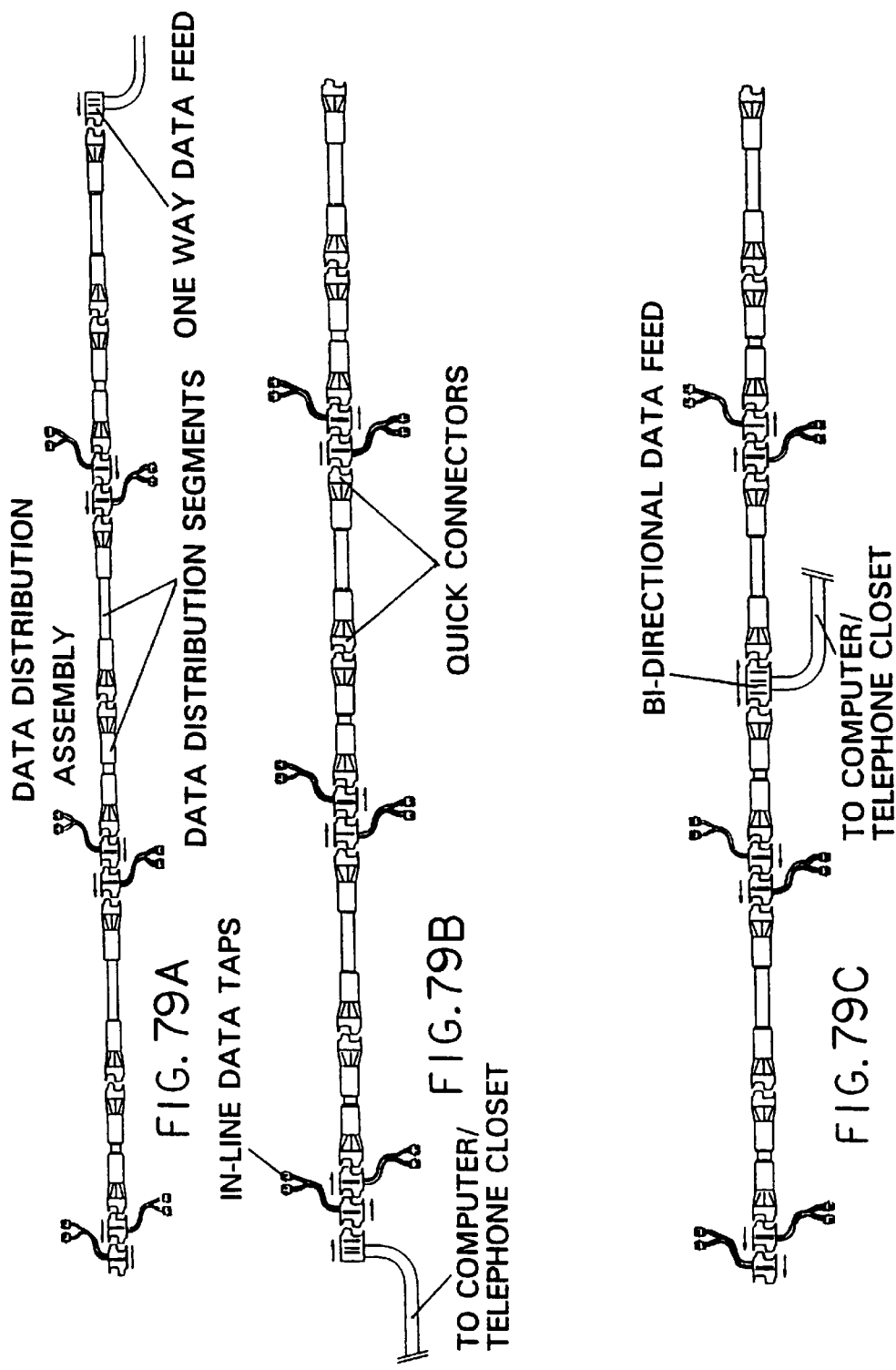
FIG. 79 DATA DISTRIBUTION ASSEMBLY WITH IN-LINE DATA TAPS

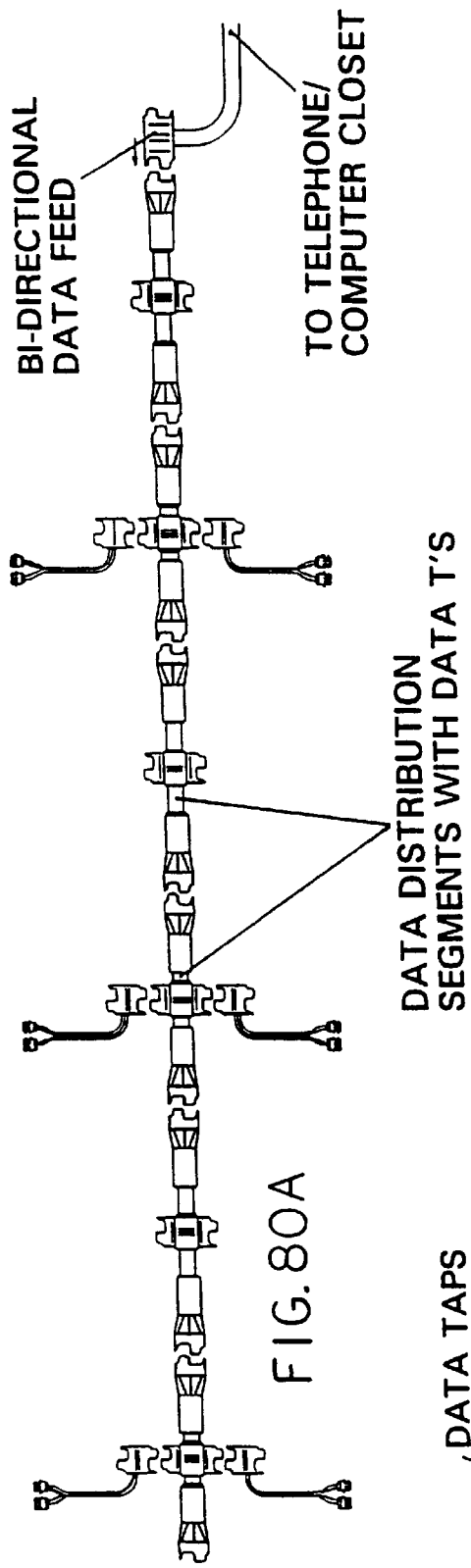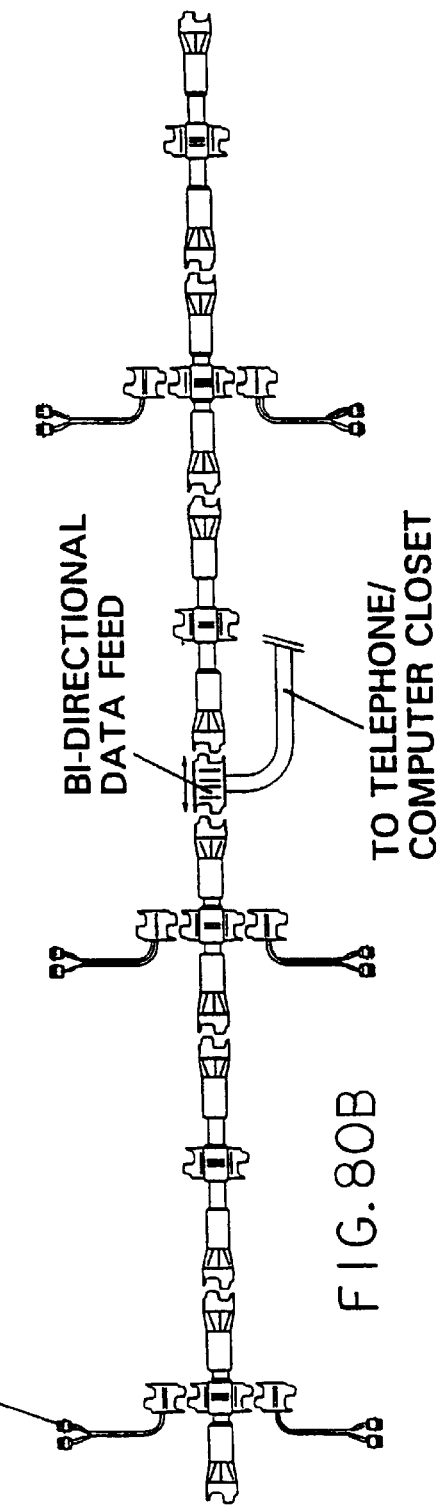
FIG. 80 DATA DISTRIBUTION ASSEMBLY WITH DATA T'S
FIG. 80A
FIG. 80B

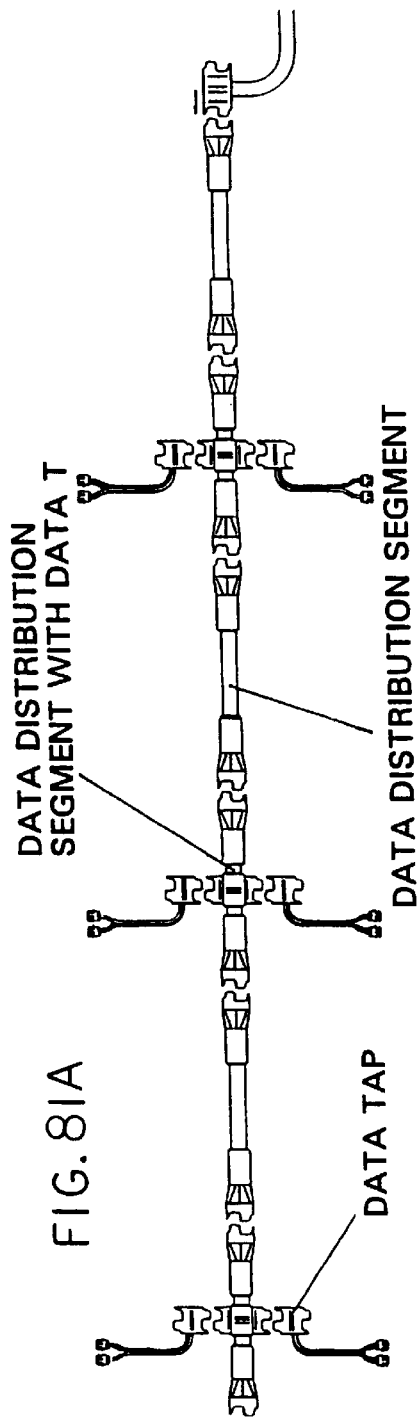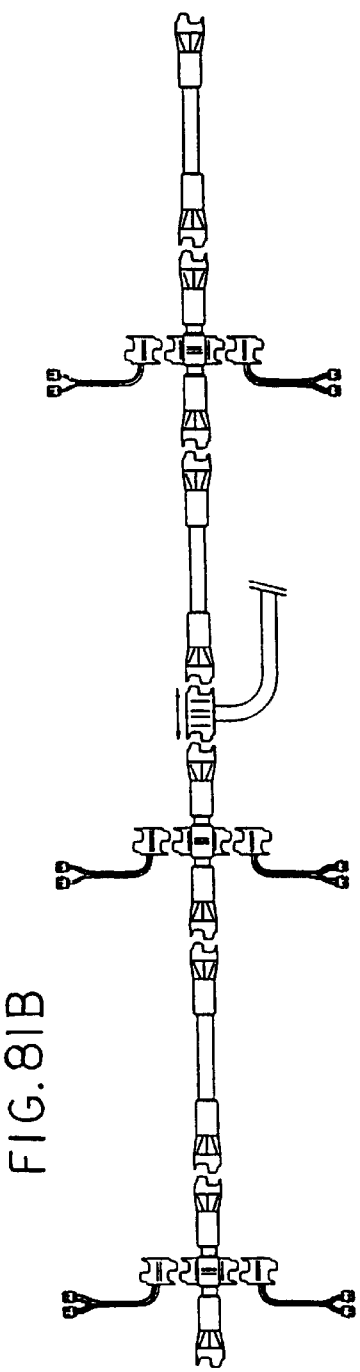
FIG. 81 COMBINATIONAL DATA DISTRIBUTION ASSEMBLY
FIG. 81A
FIG. 81B

FIG. 82 EXTENDED LENGTH DATA DISTRIBUTION SEGMENTS

FIG.83  DATA DISTRIBUTION SEGMENT

FIG.84  IN-LINE DATA TAP

FIG. 85 DATA DISTRIBUTION SEGMENT WITH DATA T
FIG. 85A
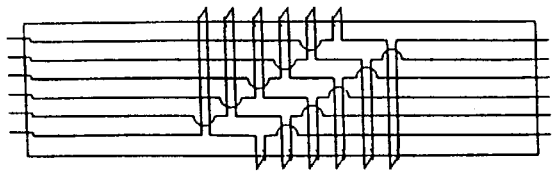
FIG. 85B
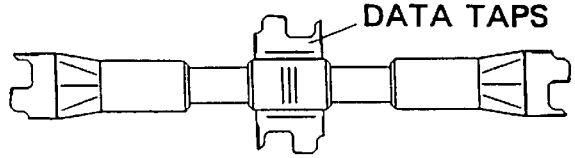
Ts FOR ATTACHMENT OF DATA TAPS
FIG. 86 DATA TAP
FIG. 86A
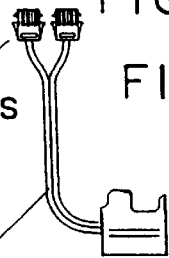
TWO MODULAR JACKS
TWO 4 PAIR UTP CABLES
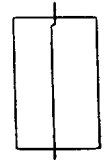
FIG. 86B
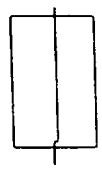
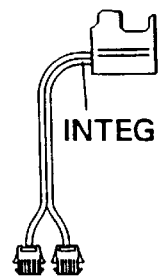
INTEGRAL STRAIN RELIEF FIG. 87 ONE WAY DATA FEED
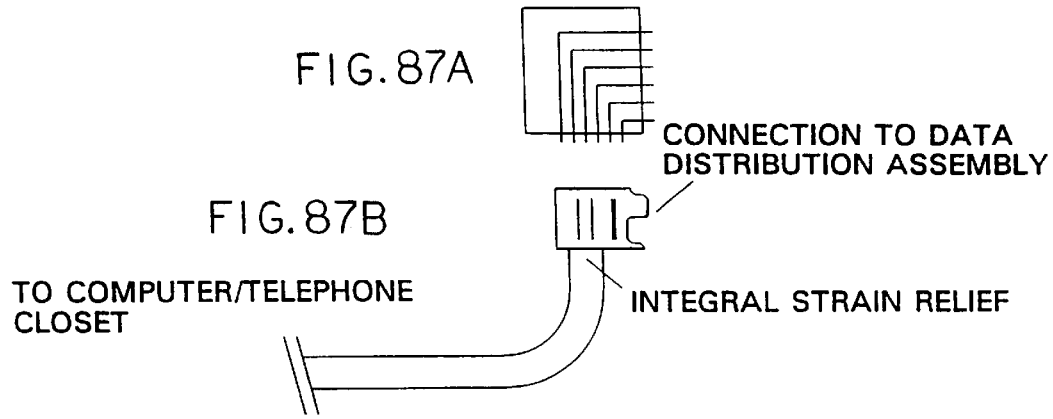
FIG. 88 BI-DIRECTIONAL DATA FEED
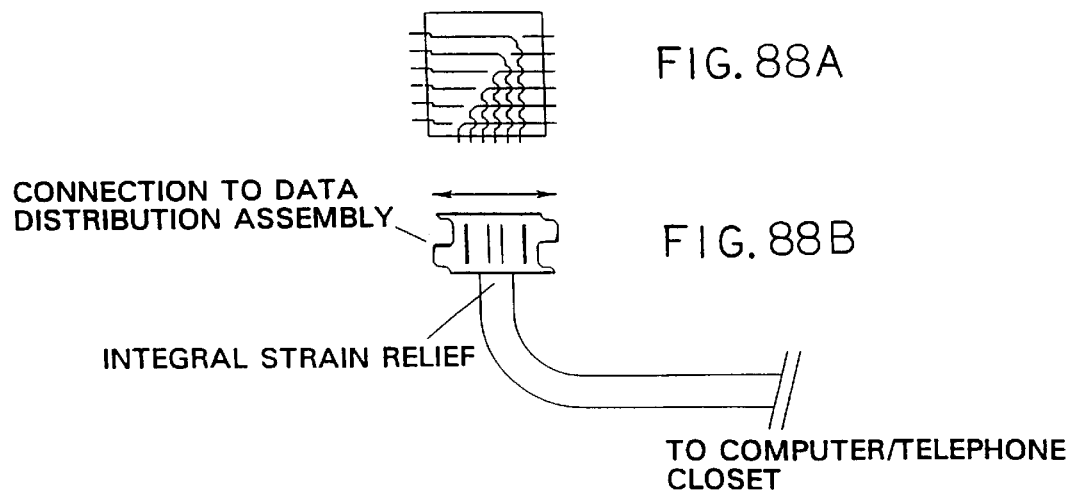

FIG. 89 DATA DISTRIBUTION SEGMENT WITH DATA TAP ATTACHED
FIG. 89A
DATA PATH DISCONTINUED IN THIS DIRECTION
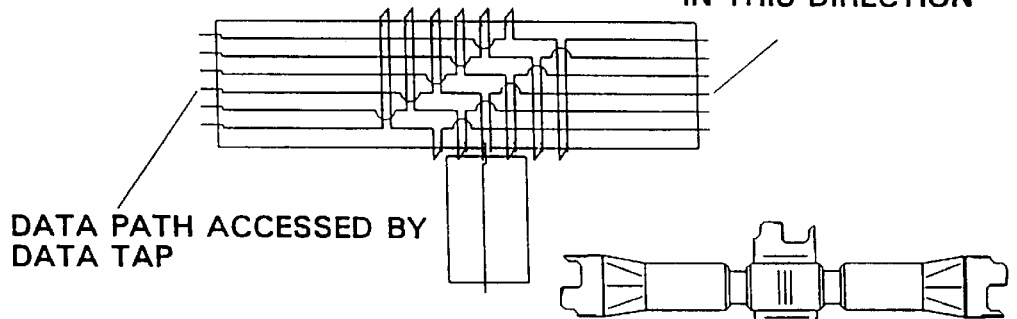
DATA PATH ACCESSED BY DATA TAP
FIG. 89B

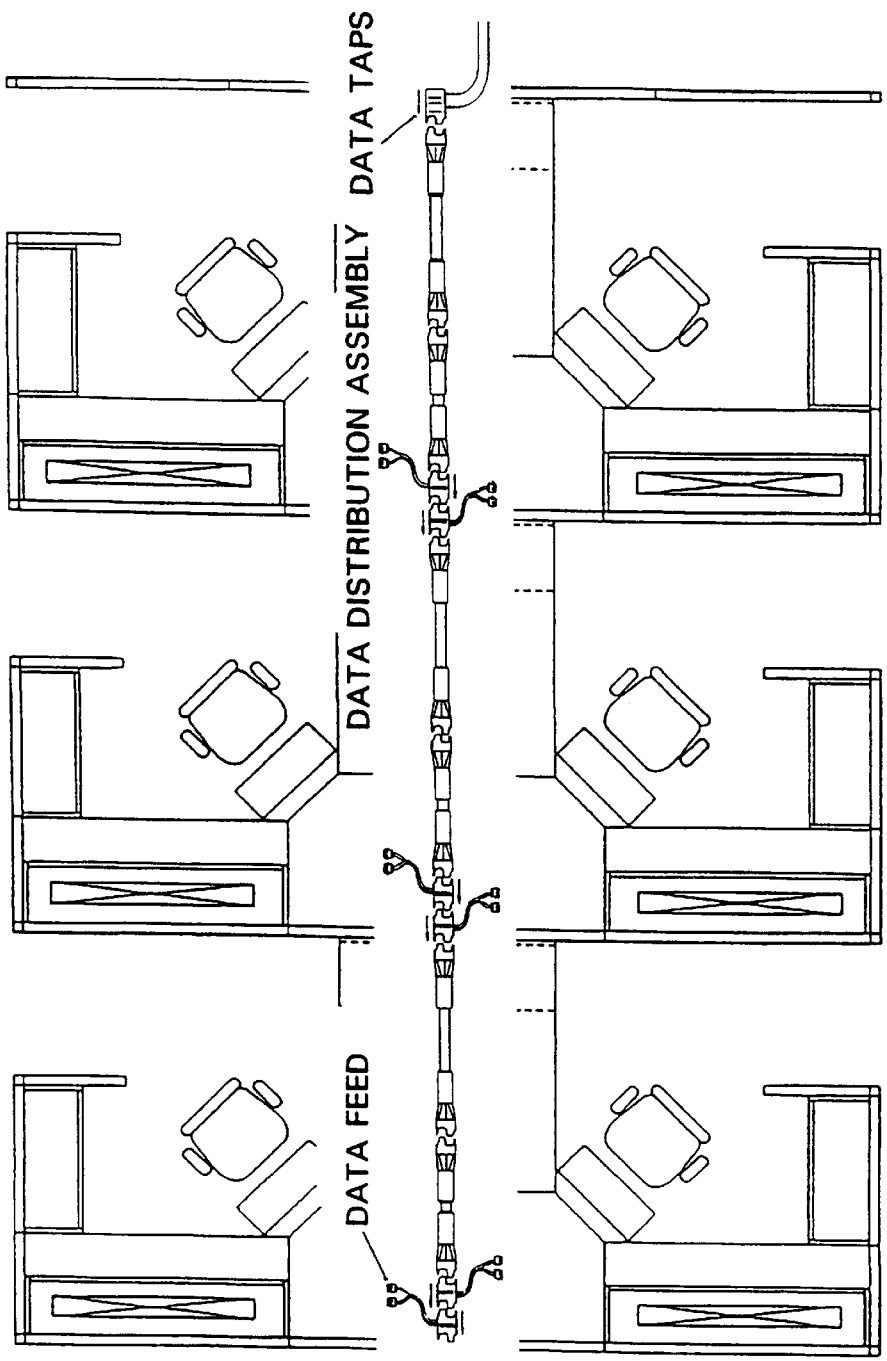
FIG. 90 MODULAR CABLING SYSTEM, TYPICAL LAYOUT

MODULAR COMMUNICATION CABLING ARRANGEMENT

CROSS REFERENCE TO RELATED APPLICATIONS

This is a continuation-in-part of copending U.S. patent application Ser. No. 08/814,280, filed Mar. 10, 1997 which is a file wrapper continuation of U.S. patent application Ser. No. 08/447 176, filed May 19, 1995, now abandoned, which is a continuation-in-part of U.S. patent application Ser. No. 08/377,743, filed Jan. 25, 1995, now abandoned.

FIELD OF THE INVENTION

This invention relates to a communication cabling system for use within a building and, more specifically, to an improved modular communication cabling system which is desirable for use with office furniture particularly interior space-dividing wall panels to permit a plurality of communication links to be readily supplied to a plurality of workstations to permit selection of links to take place at the workstation, which modular system also significantly simplifies both initial installation and reconfiguration.

BACKGROUND OF THE INVENTION

Commercial buildings typically provide large open floor areas intended for use as offices and the like, and the end user typically determines the most efficient use of the floor space for his own needs, and selects how the floor space is to be divided into smaller working spaces through the use of portable wall panels or the like. To optimize the usage of the space while retaining significant flexibility with respect to such usage and reconfiguration, most modern offices utilize what is conventionally referred to as "systems" furniture for dividing large floor space areas into smaller workstations. This "systems" furniture typically utilizes interior upright space-dividing panels which serially connect together through two-panel straight or angled connections, or through suitable three- or four-panel connections, to define a large plurality of individual workstations. Such panels are typically less than floor-to-ceiling height, and cooperate with other furniture components to define an equipped workstation. These components may involve worksurfaces, file cabinets and the like which mount directly on and are supported by the wall panels, or freestanding furniture components such as tables and file cabinets, and commonly a combination of both wall-mounted and free-standing components are utilized. These workstations must provide access to both electrical power and communication cabling. The problems associated with the supplying of electrical power to the workstations has been greatly simplified by the development of modular electrical systems which cooperate with and readily mount on the panels, and which can be readily reconfigured, so as to provide significant flexibility and simplicity with respect to the supplying of electrical power to the individual workstations. Such modular electrical systems for use with office furniture, particularly interior space-dividing wall panels, are now conventional and have been extensively utilized for over 15 years. The supplying of communication cables to workstations defined by such panel systems, however, continues to be a formidable problem in the office furniture environment.

More specifically, the conventional and widely utilized practice at the present time is to provide office systems with conventional communication cables which are all connected back to a main wiring closet. That is, a large number of conventional communication cables are connected to control equipment in the wiring closet, and the cables are then fed through floor conduits or ceiling clearance spaces to various work areas, at which point the cables are then fed into interior channels or raceways which extend along the panels, typically along the tops or bottoms of the panels. The cables typically terminate in a standard connector, such as a multipair amphenol connector which then has a mating part connected thereto for permitting selection of a desired communication link, and this mating part in turn has a standard four-pair communication cable joined thereto and terminating in a conventional communication jack which mounts in the side of the panel, typically either at the base or at worksurface height. With such arrangement, however, and particularly in view of the extensive use of communication equipment within the work space, which equipment will typically include a telephone, a computer and possibly other equipment such as a facsimile machine, and the additional requirement that computers be interlinked with one another or with a common mainframe, the supplying of communication cables (i.e., communication links) from the wiring closet to the individual workstations creates significant labor and installation difficulties since the large number of cables must typically be installed after the furniture system has been fully assembled at the job site, and the number of such cables and the length thereof as they extend from the wiring closet to the individual workstations create a significant jungle of cables so that initial layout and installation is both time consuming and costly. Further, such systems greatly impede the overall flexibility of the system with respect to hook-up to the various communication links, particularly for computers, and also greatly restricts or at least greatly increases the difficulty of modifying or reconfiguring either the communication system or the furniture system. Any significant modification of either the communication or furniture system requires significant removal of the communication cables and, after the furniture system has been reconfigured, substantially a wholly new installation of the communication cables from the wiring closet to the individual workstations is required. The current communication cabling systems, even though they have been widely utilized for many years and continue to be utilized, nevertheless greatly minimize the advantages associated with furniture systems of this type, particularly with respect to the ability to easily install, modify or reconfigure such furniture systems when provided with a communication system thereon.

To improve on the conventional communication systems currently in use, various attempts have been made to provide at least limited modularity so as to provide some simplification with respect to the installation of communication connections to a plurality of workstations. The current suggestions, however, provide only minor advancements with respect to the problems associated with the current systems and do not provide the degree of selection and flexibility desired or required so as to greatly simplify the installation and the reconfiguration of such systems on furniture, particularly wall panels. The known attempts, to the best of the inventors' knowledge, have not achieved significant commercial acceptance or utilization. Examples of these prior attempts are illustrated in U.S. Pat. Nos. 5,272,277, 5,160,276 and 4,928,303.

Accordingly, it is an object of this invention to provide an improved modular communication system particularly for use on office furniture including wall panels, which improved system overcomes many of the significant problems and disadvantages which are associated with conventional communication cabling systems and which have been tolerated for a long period of time in view of the lack of a desirable solution thereto.

More specifically, it is an object of this invention to provide an improved modular communication cabling system which is particularly desirable for mounting on or within furniture wall panels which define a plurality of workstations, with the modular system incorporating a plurality of communication links which can be selectively tapped off at various workstations to facilitate connection to communication equipment such as telephones, computers and the like.

A further object of the invention is to provide a modular communication system, as aforesaid, which permits prefabrication of a minimal number of modules which make up the system, which modules can be easily and efficiently mounted on the panels and interconnected at the job site so as to greatly simplify the initial installation of the communication system, and at the same time greatly simplify subsequent modification or reconfiguration of either the communication system or of the paneling system. If desired, some of the modules can be mounted on the panels at the factory and shipped to the job site, so that remaining modules are then easily and efficiently installed at the job site so as to interconnect the system.

A still further object of the invention is to provide an improved modular communication system, as aforesaid, which includes modules permitting easy selection of at least one communication link for supply to a workstation, with the selection of the various links of the system and the supplying thereof to the individual workstations being easily and efficiently accomplished at the job site and at the individual workstations after the furniture system has been assembled.

Still a further object of the invention is to provide an improved modular communication system, as aforesaid, which includes the capability of permitting a large plurality of communication links to extend throughout the entire length of the modular system, and which includes a tap-off feature which, when it selects one of the links for tap-off to a selected workstation, causes this link to be dead downstream of the tap-off location.

According to the invention, there is provided an improved modular communication system which is particularly desirable for use on or in association with furniture, and particularly interior space-dividing wall panels which are serially-connected together to define a plurality of adjacent workstations. The modular communication system is defined by a plurality of prefabricated modules, one of which is an elongate main distribution module which is mountable within a raceway which is associated with the panel, for example at the bottom thereof, and extends horizontally longitudinally of the panel length. This elongate main distribution module, in one embodiment, has a length which approximately corresponds to the panel length, and additionally has terminals or connectors at opposite ends so that a plurality of such main distribution modules can be serially-connected so as to extend along a plurality of serially-connected panels which define a plurality of adjacent workstations. The main communication modules define a plurality of communication links (i.e., paths), with each link preferably being defined by eight conductors (i.e., four pairs) such being a standard and well recognized communication link. The modular communication system also includes tap-off modules which cooperate with the main distribution modules to permit one (two in the preferred embodiment) of the communication links to be tapped off at a workstation so as to permit electronic equipment (such as a telephone and/or a computer) to be joined thereto. The tap-off module cooperates with the system so as to permit only the selected link or links to be tapped off and accessible at the workstation, with the remaining links of the system being transmitted throughout the serially-connected main communication modules for tap-off of other links at other locations or workstations.

In the modular communication system, as aforesaid, the tap-off module and its cooperation with the main communication modules, in a preferred embodiment, enables the installer to make a selection decision as to which link or links will be accessible at the workstation, with these selected links then being dead or disconnected downstream of the tap-off point, thereby simplifying not only the initial installation of the system and the hookup of equipment within various workstations to different communication links, but also the subsequent reconfiguration of the communication system or of the overall furniture system.

The modular communication system, as aforesaid, also preferably includes an in-feed module which connects to the serially-connected main distribution modules so as to supply the plurality of communication links thereto, with the in-feed having a main trunk cable or the like connected thereto for connection back to the telecommunication closet. The in-feed module can be positioned for cooperation with the main distribution modules to permit some of the plurality of communication links to flow in one downstream direction therefrom, and the other of the plurality of telecommunications links to extend downstream in the opposite direction therefrom.

In the improved modular communication system, in a preferred embodiment as disclosed hereinafter, the system provides 16 telecommunication links which extend throughout the system, and the tap-off preferably accesses two links to facilitate the supplying of two different links to each of eight different workstations, with one of the links for each workstation preferably being for voice communication (i.e., a telephone) and the other link preferably being for data communication (i.e., a computer).

Other objects and purposes of the invention, and variations thereof, will be apparent upon reading the following specification and inspecting the accompanying drawings.

BRIEF DESCRIPTION OF THE DRAWINGS

FIG. 1 is a diagrammatic side elevational view showing several wall panels serially-connected together and mounting the improved modular communication system in the raceway thereof.

FIG. 2 is a diagrammatic end elevational view of one of the panels.

FIG. 5 is a diagrammatic plan view which illustrates panels disposed to define a plurality of adjacent workstations.

FIG. 6 is a perspective view of the main distribution module as associated with the communication system of this invention according to one embodiment thereof.

FIG. 7 is a line diagram which illustrates the telecommunication transmission links and conductors associated with the cable of the main distribution module.

FIG. 8 illustrates connector units as provided on adjacent ends of two distribution modules joined together to define the connector assembly.

FIG. 9 is a plan view showing the top or abutment surface associated with the connector unit at one end of the main distribution module.

FIG. 10 is a line diagram corresponding to FIG. 9 but illustrating the transmission links and contact groupings associated with the connector unit.

FIG. 17 is a perspective view which illustrates a tap-off module and its cooperation between the connector assembly and a face plate as mountable on a panel or the like.

FIG. 18 shows the exposed face of the tap-off plug and its positional relationships to the access port.

FIG. 19 illustrates an in-feed module as connected between the connector units of adjacent distribution modules for supplying a plurality of telecommunication links to the system.

FIGS. 20 and 21 are perspective views which are respectively similar to FIGS. 8 and 19 but which illustrate variations with respect to the modular communication system.

FIG. 22 is a diagrammatic view showing the connector unit of FIG. 20 connected to an end cap or an end in-feed module.

FIG. 32 is a side cross sectional view of the connector assembly taken along line 32—32 in FIG. 26 illustrating the interior of an access port.

FIG. 33 is a perspective view of a preferred embodiment of an elongate distribution cable.

FIG. 37 is a perspective view of a double-sided variation of the spacer insert.

FIG. 38 is a single-sided variation of the spacer insert.

FIG. 39 is a single-piece variation of the spacer insert.

FIG. 42 is a side cross sectional view of the connector assembly of FIG. 26 illustrating the spacer insert mounted on the top connector unit and the plug part inserted from the left side.

FIG. 43 is a side cross sectional view of the connector assembly of FIG. 42 with the plug part inserted from the opposite or rightward side.

FIG. 51 is a diagrammatic elevational view similar to FIG. 24 but illustrating an alternative arrangement for the modular communication system.

FIG. 52 is a top view of the communication system of FIG. 51.

FIG. 53 is a side cross sectional view illustrating a plug part for a tap-off module disposed, prior to insertion, in alternative positions on the left and right side of the connector assembly.

FIG. 63 is an exploded front elevational view of the cartridge components of FIG. 62.

FIG. 64 is an exploded side elevational view of the cartridge components.

FIGS. 79A through 90 are diagrammatic plan views which illustrate the modular communication system of this invention, specifically variations and possible arrangements thereof, wherein:

FIGS. 79A, 79B and 79C show three arrangements of the data distribution assembly (i.e., the modular communication system) employing in-line data taps (i.e., tap-off modules), with FIGS. 79A and 79B showing arrangements wherein a one-way data feed (i.e., an in-feed module) connects to either end of the system, and FIG. 79C shows the data feed being bi-directional and connected intermediate the length of the system;

FIGS. 80A and 80B illustrate the data distribution assembly similar to FIGS. 79A–79C except that the distribution segments (i.e., the distribution module) incorporate intermediate tap-off connectors referred to as data T's, with FIG. 80A showing the data feed at one end of the system and FIG. 80B showing the data feed intermediate the length thereof;

FIGS. 81A and 81B illustrate similar views of the data distribution assembly showing in FIGS. 81A and 81B various combinations of the features of FIGS. 79A–79C and 80A–80B;

FIGS. 85A and 85B relate to the distribution segment incorporating a data T therein, with FIG. 85B showing the structure thereof and FIG. 85A being a line diagram of the internal telecommunication links;

FIGS. 86A and 86B relate to a data tap of the type which cooperates with a data T, with FIG. 86A showing the structure of the tap and FIG. 86B being a line diagram of the telecommunication link which passes therethrough;

FIGS. 87A and 87B relate to the one-way data feed, and specifically FIG. 87B illustrates the structure thereof and FIG. 87A illustrates the telecommunication links associated therewith;

FIGS. 88A and 88B illustrate a bi-direction data feed, and specifically FIG. 88B shows the structure thereof and FIG. 88A shows the telecommunication links associated therewith;

FIGS. 89A and 89B diagrammatically illustrate the connection of a data tap to a distribution segment, and specifically FIG. 89B shows the data tap connected to the data T, and FIG. 89A is a line diagram showing the telecommunication links and the coupling of the data tap to one of the links; and FIG. 90 is a diagrammatic plan view which illustrates several workstations disposed on opposite sides of a spline panel arrangement (the latter eliminated from the figure for purposes of clarity), with one arrangement of the communication system being disposed so as to extend generally along the spline panel arrangement for providing communication access to the adjacent workstation.

Figure 3:
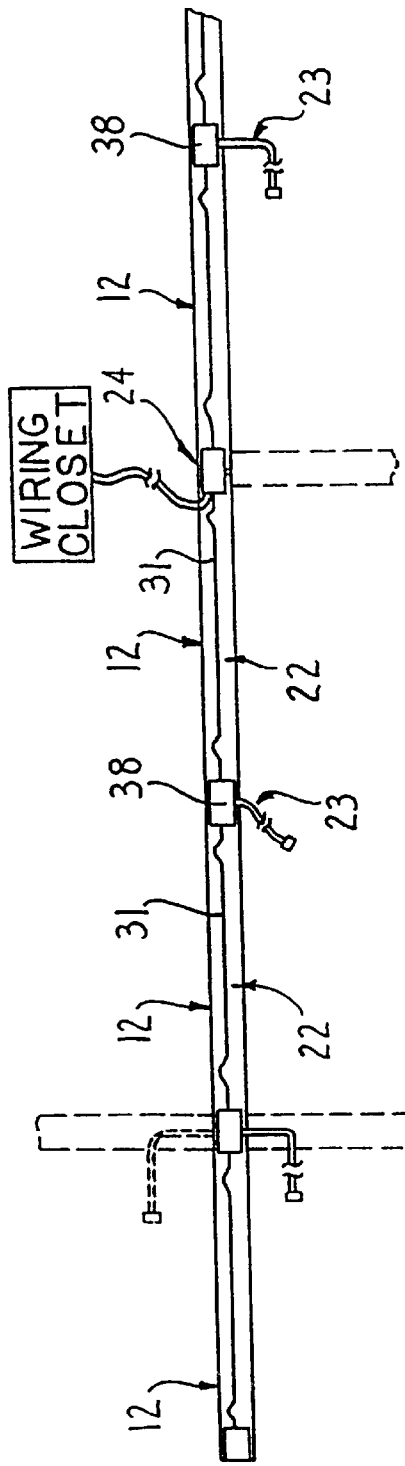
FIG. 3 is a diagrammatic view taken generally along line 3—3 in FIG. 1, but also illustrating branch panels in dotted lines.

Certain terminology will be used in the following description for convenience in reference only, and will not be limiting. For example, the words "upwardly", "downwardly", "rightwardly" and "leftwardly" will refer to directions in the drawings to which reference is made. The word "forward" will be used to designate the direction of the telecommunication link as it extends from the closet to the user equipment. The words "inwardly" and "outwardly" will refer to directions toward and away from, respectively, the geometric center of the system and designated parts thereof. Said terminology will include the words specifically mentioned, derivatives thereof, and words of similar import.

DETAILED DESCRIPTION

Referring to FIGS. 1–3, there is diagrammatically illustrated a furniture arrangement 11 which particularly includes a wall system formed by a plurality of interior space-dividing panels 12 supported in upright relationship relative to a floor. The panels 12 can be horizontally serially aligned and connected so that vertical end edges 13 thereof are disposed adjacent one another. The panels 12 define, generally between the vertically enlarged side surfaces thereof, a horizontally elongate channel or raceway 14 which extends throughout the lengths of the panels, such raceway 14 in the illustrated embodiment being located along the bottom of the panel, but it will be recognized that such raceway can be at other locations in the panel such as along the top or at worksurface height. A pair of removable access covers 15 are provided for normally closing off opposite sides of the raceway 14.

As illustrated by FIG. 5, the wall panels are typically arranged to define at least partially enclosed work areas 16, these commonly being referred to as workstations, and for this purpose a plurality of panels 12 in FIG. 5 are serially and horizontally connected in aligned relationship to define a wall structure which effectively functions as a spline. A further plurality of panels, designated 12' in FIG. 5, are branched transversely off the main spline at selected intervals therealong, commonly eight feet intervals, to permit formation of a plurality of adjacent workstations 16 on one or both sides of the spline panels 12. These workstations 16 are provided with conventional furniture components therein. For example, the workstation can be provided with conventional worksurfaces 17 and cabinets 18 which mount on and are supported by the panels, or alternatively or in conjunction therewith the workstation can be provided with freestanding furniture components such as tables, desks, cabinets and the like.

Each workstation is typically provided with a telephone T, and also commonly with a computer C, for use by the occupant of the workstation. Such equipment are typically connected to outlets or jacks which in turn couple to communication cables which extend through the panels and thence normally through floor or ceiling passages back to the telecommunication (i.e., wiring) closet.

In accordance with the present invention, and as diagrammatically illustrated in FIGS. 1 and 3, there is provided a modular communication system 21 which is designed to be accommodated within and extend longitudinally throughout a plurality of serially-connected panels, such as lengthwise through the raceways 14, so as to permit a plurality of telecommunication paths or links to extend in parallel throughout the length of the modular system 21, with the modular system 21 permitting selected individual telecommunication paths or links to be tapped off at predetermined locations lengthwise therealong so as to permit individually selected telecommunication links to be accessible within a plurality of different workstations for connection to the communication equipment associated with the respective workstation.

The modular communication system 21, in the illustrated and preferred embodiment as described in greater detail hereinafter, defines sixteen different telecommunication links which have the capability of extending longitudinally throughout the length of the system, with these sixteen links preferably being disposed with eight distinct groupings each including two distinct links. Each telecommunication link is defined by eight conductors (i.e., four pairs), such being a recognized standard for telecommunication connectors. Each grouping of two telecommunication links can thus be tapped off for access at a selected workstation, whereby the modular communication system 21 can readily and efficiently service eight workstations, and can be readily installed into the wall panel arrangement 11 and reconfigured with minimal installation effort, time and labor.

Figure 4:
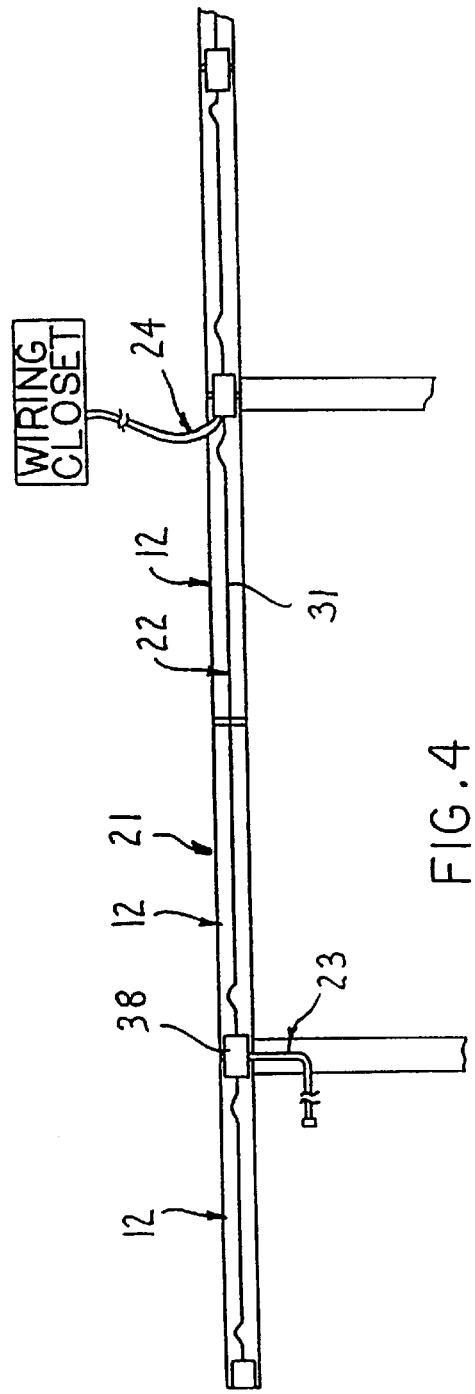
FIG. 4 is a view similar to FIG. 3 but illustrating a variation.

Considering now the details of the modular communication system 21, and as diagrammatically illustrated in FIGS. 1 and 3, the system in one variation includes a main distribution module 22 which is elongated and preferably has a length which is generally similar to the basic panel length (this typically being four feet) as shown in FIG. 3, or a length similar to typical workstation width (this being two panel lengths, or typically eight feet) as shown in FIG. 4. The length of each main distribution module, however, may be any desired length such as the length of an entire office rather than panel size. A plurality of such modular distribution modules 22 are connected together in series and extend lengthwise throughout the raceways 14 so as to be accessible from the plurality of workstations which are at least partially defined by the panels. Tap-off or output modules 23 are also provided for selective connection to the main distribution modules, which tap-off modules 23 plug into the main distribution modules in such fashion as to selectively access and tap off at least one, and in the illustrated embodiment a grouping of two, telecommunication links for connecting these two links to conventional jacks (i.e. outlets) provided for access in the selected workstation for connection to equipment such as a telephone and a computer. These tap-off modules and their connection to the main distribution modules is such as to cause the selected links, downstream of the tap point, to be dead. The system 21 also has an in-feed module 24 which connects to the series of interconnected distribution modules 22 for permitting the plurality (sixteen in the illustrated embodiment) of telecommunication links to be supplied to the modules 22 for transmission throughout the length of the system. This in-feed module 24 has a supply cable connected thereto through which the plurality of telecommunication links are supplied, and the other end of this supply cable connects back to the telecommunication closet. For convenience in installation, this supply cable will typically be of a predetermined length so as to terminate in a connection such as a conventional push block connector, which in turn will then join to one end of one or more elongate supply cables (containing a total of 64 pair) which extends back through floor or ceiling passages for connection to equipment disposed in the telecommunication closet.

The elongate main distribution module 22 in this variation, as illustrated in FIG. 6, includes an elongate distribution cable 31 which is provided with connector units 32 and 33 secured to opposite ends thereof. The connectors units 32 and 33 are preferably and in the illustrated embodiment identical, since rotation of the rightward connector 32 in a vertical plane through an angle of 180° will result in its orientation being identical to the leftward connector unit 33.

The elongate distribution cable 31, which in actuality may be formed by two or more cables grouped together, defines a plurality of telecommunication paths or links 34 extending therethrough, there being sixteen such links in the illustrated and preferred embodiment as seen in FIG. 7. These 16 links define eight distinct groupings 35, each containing two distinct telecommunication links such as designated 36-1 and 36-2, one link normally being used for voice communication and the other for data communication. Each of these links 36-1 and 36-2 is defined by eight conductors 37 which cooperate to define a conventional four-pair link having the capability of providing four different signal transmitting pathways, such four-pair telecommunication links being conventional.

The connector units 32 and 33 when joined together define a connector assembly 38. Each of the connector units 32 and 33 (FIGS. 6 and 9) includes a generally hollow housing 41 connected to the end of the distribution cable 31. The housing 41 has a generally flat abutment wall 42 which is adapted to abut against a similar such wall formed on an opposed mating one of said connector units, and this abutment wall 42 terminates in side edges 43 which extend longitudinally along opposite sides of the housing, which edges define the intersection between the abutment wall 42 and the side walls 44.

Each housing 41 has a plurality of boxlike recesses 45 which open inwardly from the abutment wall 42, with these recesses opening outwardly through the respectively adjacent side wall 44. In this embodiment, housing 41 has eight such recesses 45 therein, four such recesses being disposed generally within a lengthwise row positioned adjacent each side of the housing 41, with the recesses 45 in each row opening outwardly through the respectively adjacent side wall 44.

Each recess 45 (FIGS. 9 and 10) has positioned therein, and mounted on the housing 41, a grouping of electrical contacts or terminals 46 which function as a connector. The contact grouping 48 is divided into two substantially identical subgroups 47 which are disposed in side-by-side relation. The contact group 48 includes therein sufficient contacts 46 to define two telecommunication links, this being sixteen contacts in the illustrated embodiment, with each subgroup 47 being defined by eight contacts. Each recess 45 has the contacts thereof respectively connected to sixteen conductors associated with one of the groupings supplied to the housing 41 from the distribution cable 31. Since this latter cable provides eight groupings of two telecommunication links each, each said grouping is electrically connected to a respective one of the contact groups associated with a respective one of the recesses 45. The connection between the contacts and the conductors of the distribution cable can be direct, such as by extending the distribution cable inwardly into the housing so that the conductors thereof are directly connected to the respective contacts, or in the alternative the housing 41 can be provided with a printed circuit board mounted interiorly thereof, which printed circuit board possesses an appropriate conductive trace pattern thereon for connecting all of the contacts in the various recesses to the respective individual conductors associated with the distribution cable 31. Since the internal connections between the recess contacts and the distribution cable can be accomplished using many different conventional techniques, further description thereof is believed unnecessary.

Figure 11:
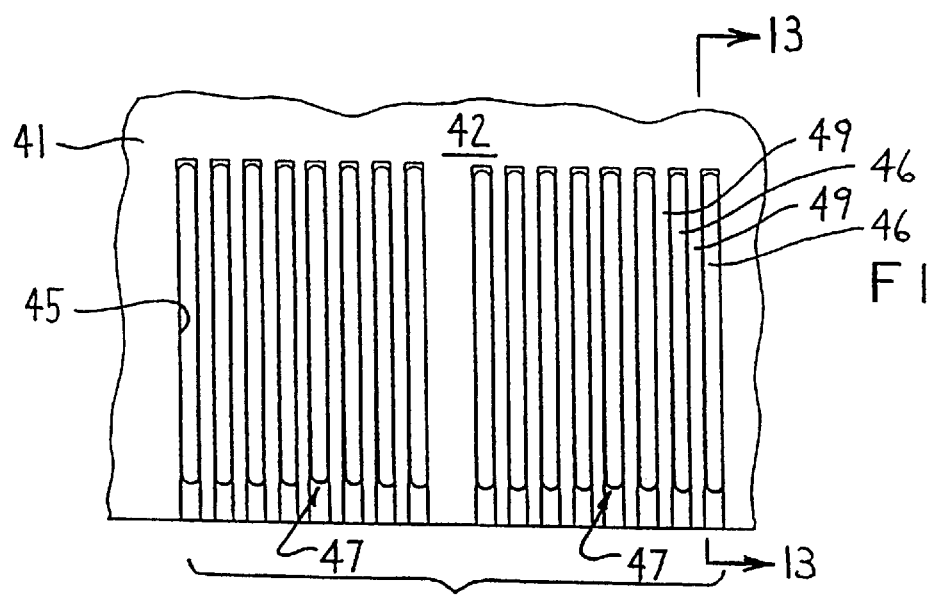
FIG. 11 is an enlarged, fragmentary top view showing one of the contact groupings associated with the connector unit.
Figure 12:
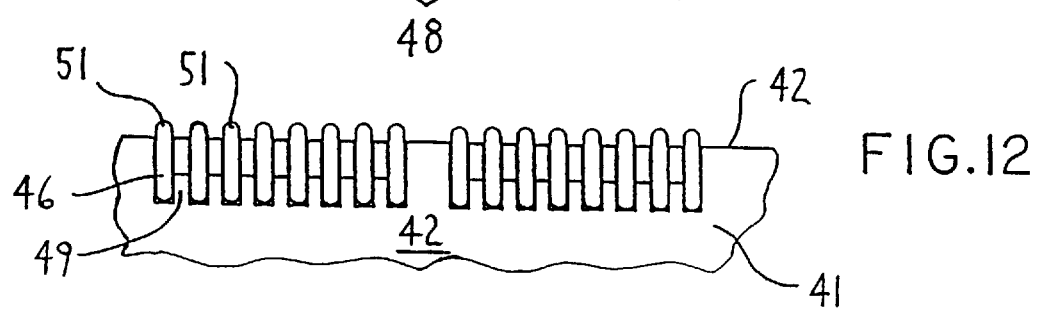
FIG. 12 is a fragmentary front view of the arrangement shown in FIG. 11.
Figure 13:
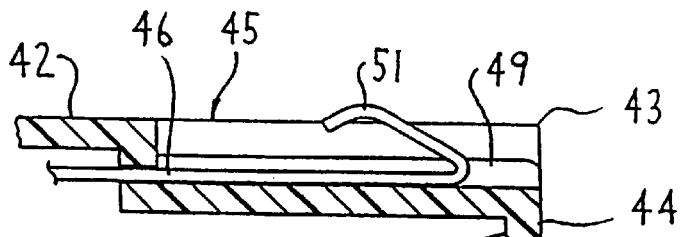
FIG. 13 is a fragmentary sectional view taken along line 13—13 in FIG. 11.

As illustrated by FIGS. 11–13, the walls of the housing 41 which define each recess 45 preferably include a series of parallel insulative ribs 49 which extend in parallel relation inwardly from the side wall 44 and project toward the abutment wall 42, with each pair of ribs accommodating therebetween one of the contacts 46 so as to maintain adjacent contacts in spaced and insulated relationship from one another. Each contact also includes a resilient upper part 51 which, when in a relaxed or nondeflected condition, projects slightly outwardly beyond the outer surface of the respective abutment wall 42.

While the accompanying drawings illustrate the contact grouping 48 associated with only one of the recesses 45, it will be appreciated that this is solely for simplicity of illustration, and that each of the recesses 45 has a substantially identical contact group 48 associated therewith.

Figure 14:
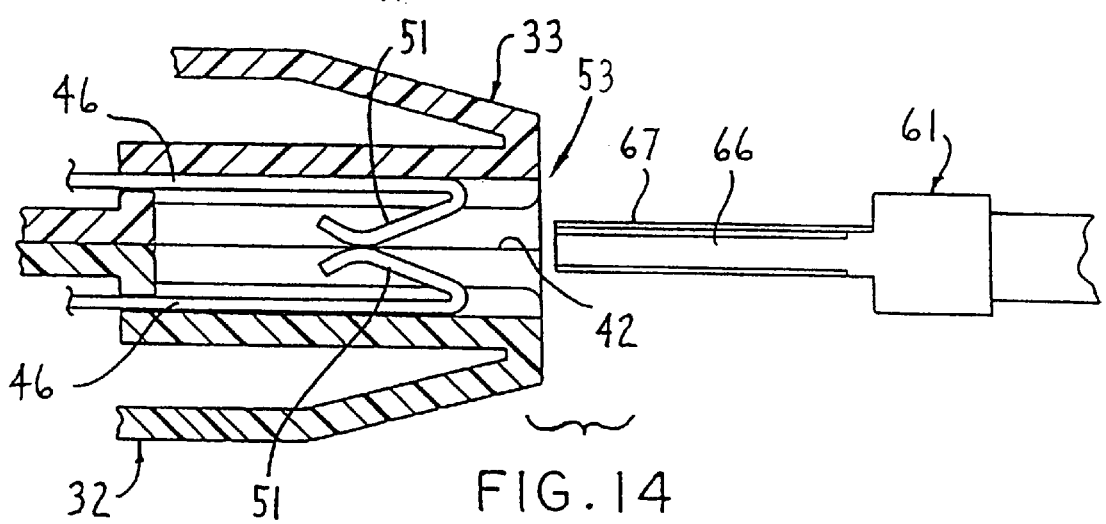
FIG. 14 is a view similar to FIG. 13 but wherein connector units are assembled together to show the engaged contacts associated with the access port, and additionally showing a tap-off plug disposed for insertion into the access port.
Figure 15:
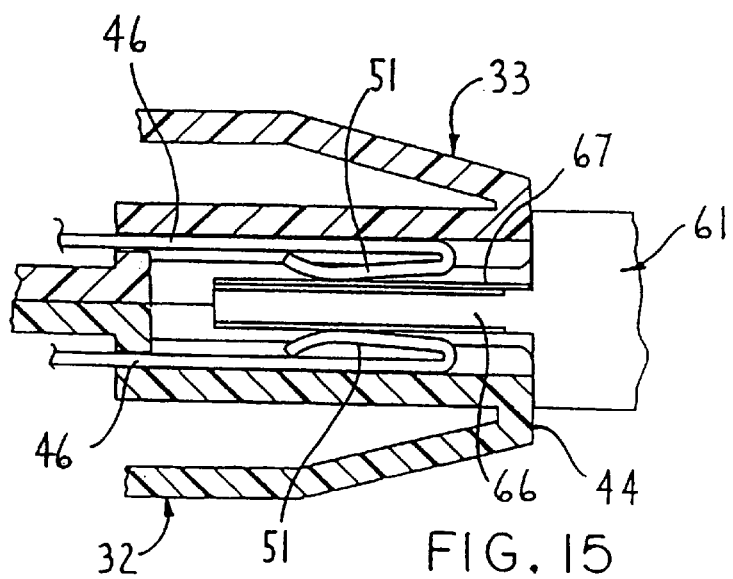
FIG. 15 is a view corresponding to FIG. 14 but showing the tap-off plug positioned in the access port.

When two of the main distribution modules 22 are to be connected together in series, then the connector units 32 and 33 as provided on adjacent ends of the two modules 22 are positioned in opposed overlapping relationship so that the abutting surfaces 42 thereon are disposed in directly opposed and abutting engagement with one another substantially as illustrated in FIGS. 8 and 14, whereupon the two connector units are then suitably fixedly secured, such as by a plurality of fasteners such as screws. This provides a fixed connector assembly 38 at the junction of the serially arranged modules 22, although it will be appreciated that each module 21 retains whatever flexibility is inherently possessed by the elongated distribution cable 31.

Figure 16:
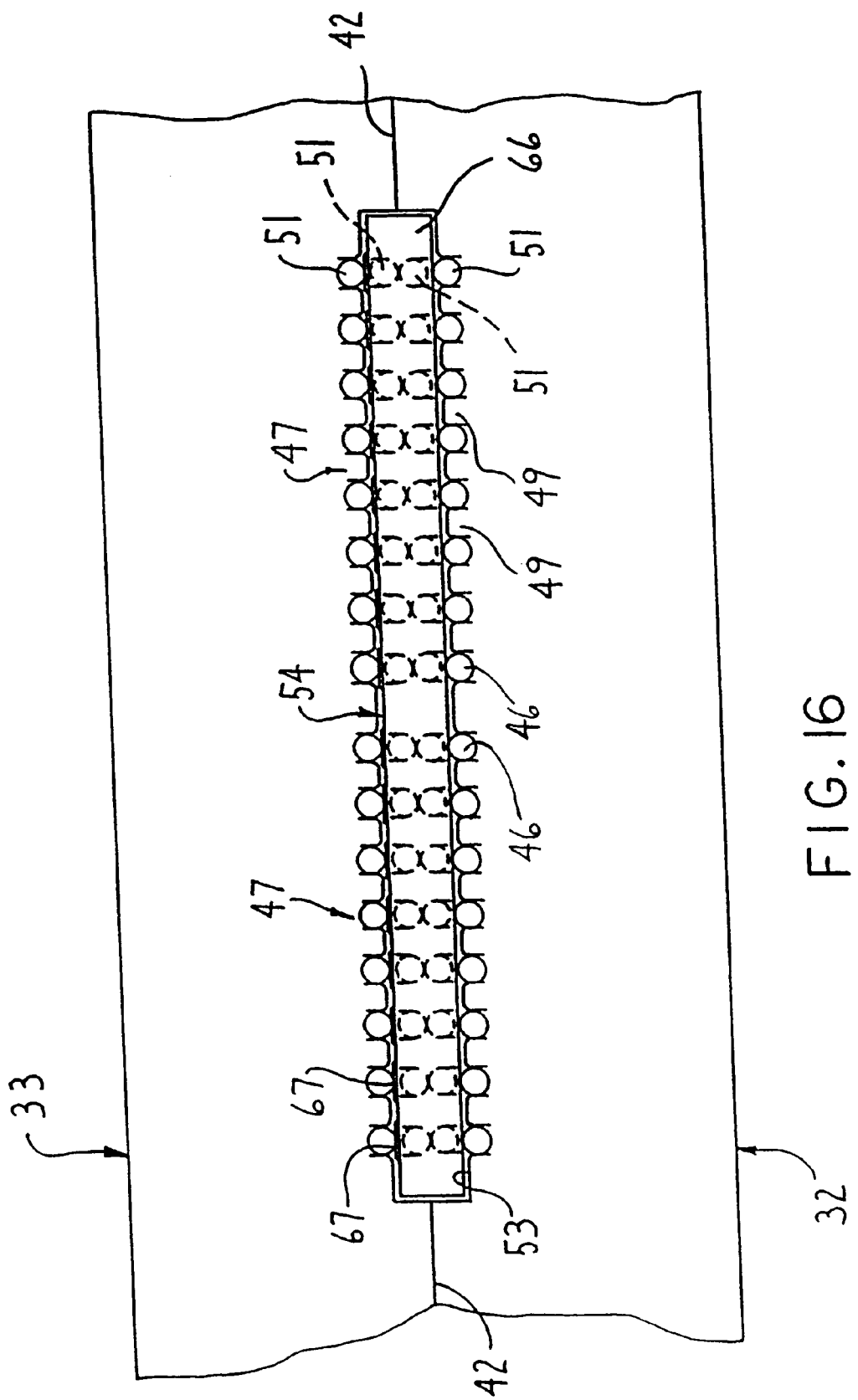
FIG. 16 is an enlarged view looking into the opened end of the access port and showing the contacts therein in solid lines when engaged with the tap-off plug, and additionally showing the contacts in dotted lines in their position prior to insertion of the access plug.

When the identical connector units 32 and 33 are disposed in opposed mating relationship and are fixedly connected together as illustrated in FIG. 8, the individual recesses 45 formed in the connector unit 32 are disposed in directly opposed relationship and mate up with the corresponding respective recesses formed in the other connector unit 33, which two opposed and cooperating recesses cooperate to define a generally blocklike chamber which is wholly enclosed except for the access opening 53 at one end thereof, which opening is in the side wall of the assembled housing. During the assembly of the connector units 32 and 33 together, particularly when the abutment faces 42 contact one another, this causes the outwardly protruding resilient parts 51 of the opposed contacts to directly and individually contact one another, thereby causing these opposed resilient contact parts 51 to be deflected inwardly into the respective recess so that the contacts associated with the contact groupings in the opposed recesses remain in resiliently biased engagement with one another substantially as illustrated in FIG. 14. These engaged contacts, however, are accessible through the access opening 53 defined in the side wall. Each pair of opposed and cooperating recesses 45, the opposed and engaged contact groups therein as illustrated in FIG. 14, and the access opening 53 associated therewith, cooperate to define a port or socket 54 (FIG. 16) for permitting access to the two telecommunication links defined by the engaged contact groupings of the respective port.

In this embodiment there are four access ports 54 (FIG. 8) disposed horizontally in sidewardly-spaced relationship along one side of the coupled connector units 32 and 33, and four additional such access ports 54 disposed horizontally in spaced relationship along the other side thereof. The connector 38 thus provides a total of eight such ports 54 each accessing a different grouping of two telecommunication links. This is graphically illustrated in the drawings, specifically FIG. 10, wherein the access ports 54 are designated 54-1 through 54-8. When not being used for either in-feed or tap-off purposes, each of these access ports 54 is preferably closed by means of a small closure plug (not shown) which is preferably constructed of an insulative material and fits partway into the access opening and can be snugly held therein for closing off the port. Such plug can be easily manually removed when desired.

Considering now the tap-off module 23 (FIG. 17), it is designed to plug into any one of the ports 54-1 through 54-8 as associated with any of the connector assemblies 38. This tap-off module 23 includes a plug or connector part 61 which is adapted for insertion into one of the ports 54. This plug part 61 has one end of an elongate flexible cable 62 coupled thereto, which cable at the other end has at least one jack, and in the illustrated embodiment there being two such jacks 63 and 64, mounted thereon. The cable 62 includes a plurality of conductors extending therethrough, specifically sixteen conductors (eight pairs) in the illustrated embodiment, thereby defining two telecommunication links.

One of the links connects to the plug-in socket 65 associated with one jack 63, and the other link connects to the socket 65 associated with the other jack 64. These jacks 63–64 and the sockets defined therein are conventional, and cooperate in a conventional manner with the plug associated with the telecommunication cable which connects to a telephone, computer and the like.

As to the plug part 61 of the tap-off module (FIGS. 14–17), it includes a generally flat blade or plate 66 which projects outwardly from an enlarged head 69, whereby the blade 66 can be slidably inserted into the port or socket 54 to the extent that the head 69 seats against the housing of the connector assembly. The blade 66, on at least one side face thereof, has a grouping of contacts 67 which are illustrated as being formed as tracings, such as on a printed circuit board. The contacts 67 are defined by exposed portions of the tracings while the remaining portions of the tracings are covered and extend rearwardly to the cable 62. The grouping of contacts or tracings 67 includes two subgroups, each containing eight contacts or tracings, with all of these tracings or contacts being generally parallel but sidewardly spaced apart.

When the blade 66 is slidably inserted into the access port 54, the blade resiliently deflects the opposed contact parts 51 and effects separation thereof as the blade is inserted therebetween. At the same time, however, the tracings 67 engage the contact parts 51 associated with only one side (either the top or the bottom) of the access port 54, whereas the opposite side of the blade engages the contacts on the opposite side of the access port, which blade is constructed of an insulative material and effectively opens this side of the telecommunication link. The tracings 67 preferably extend to the very end of the blade 66 so as to engage the contact parts 51 shortly before the blade causes the opposed contact parts 51 to separate from one another, thereby preventing any momentary disruption or break in the telecommunication link. The individual tracings are in turn connected to the individual conductors associated with the cable 62 so as to transmit one of the selected telecommunication links to the jack 63 and the other to the jack 64. These jacks in turn typically mount within openings provided in a conventional face plate 58 as illustrated in FIG. 17, which plate 58 typically mounts on the side face of the panel at any user convenient location, such as in the vicinity of worksurface height.

The tap-off module 23 can also be vertically inverted so that the tracings thereof are in a downwardly facing position such that, when inserted into the access port 54, they make contact with the lower contact grouping in the port, and in such case the upper contact group is engaged with the insulative plate 66 and are effectively deactivated or dead. The selection of the orientation of the plug part 61 for insertion into the access port 54 is determined based on the location of the input to the communication system (i.e., the input from the closet). In this regard, referencing FIGS. 17 and 18, if the input from the wiring closet connects to the serially-connected distribution modules 22 rightwardly from the connector assembly 38 to which the tap-off module is being connected, such designation of the input being indicated by arrow A, then the plug part 61 is oriented so that the tracings 67 face upwardly so that insertion of the plug part causes the tracings to engage the upper contacts, whereby the two telecommunication links are supplied to the jacks 63 and 64. These two telecommunication links themselves have defined positions in the access port 54, one being on the left side and designated L1, the other on the right side and designated L2, these being respectively for "voice" and "data" for example. The visible head of the plug part can similarly be defined with V and D designations which correspond to the two subgroups of tracings defined on the face of the blade, and in this instance the cable 62 is preferably defined by two distinctly different cable parts 62A and 62B, which parts can be of different colors for example, with these two cable ports being connected respectively to the jacks 63 and 64. When the input to the system is rightwardly as indicated by the arrow A, then the plug part 61 is oriented such that the arrows 59 thereon are directed toward the input of the telecommunication links (i.e., in the direction of the arrow A) thus causing the tracings 67 to be uppermost and engaged with the upper contacts associated with the connector unit 32 so that these two telecommunication links L1 and L2 are respectively used as the V and D links for respective connection to the jacks 63 and 64. The installer thus knows to install the jack 63 in the "voice" opening of the face plate 58, and the jack 64 in the "data" opening of the face plate.

However, if the input of the telecommunication links is connected to the series of distribution modules 22 leftwardly of the specific connector assembly 38, such as indicated by arrow B, then the tap-off module 23 is vertically rotated 180° so that the arrows 59 now point in the direction of arrow B, and this again results in V and D designations thereon facing upright and being visible to the installer, except that the V and D designations are now respectively associated with the cables 62B and 62A. This informs the installer that the jack 64 must now be positioned within the "voice" socket of the face plate 58, and the jack 63 positioned within the "data" socket of the face plate. At the same time, since the tracings 67 face downwardly, they thus contact the lowermost contact grouping, namely the grouping associated with the connector unit 33, when the plug part is inserted into the access port. The upper grouping of contacts engages the insulated plate 66 so that the links L1 and L2 are dead downstream of the tap off. Since the downwardly facing orientation of the tracings 67 causes the leftward subgroup of tracings as connected to the cable 62B to engage the contacts associated with the links L1, which link can be the designated "voice" link if desired and as explained above, this enables the tap-off module to be plugged into the port 54 in either an upwardly or a downwardly facing orientation, depending upon the location of the port 54 relative to the inlet or in-feed, while at the same time maintaining the identification and orientation of each individual link so as to permit proper external hookups thereto.

In order to connect the communication system of this invention to the telecommunication closet, the system includes the in-feed module 24 which preferably connects to any one of the connector assemblies 38 as disposed either throughout the plurality of series-connected distribution modules 22, or at one free end thereof. This in-feed module 24 includes a relatively thin and flat hollow housing 71 (FIG. 19) which connects to one end of a main communication supply cable 72, which cable is provided with a remote end for connection to an elongate cable which extends from the telecommunication closet. This main cable contains therein a plurality of conductors which define a predetermined number of communication links corresponding to the number of links in the modular communication system 21, this being 128 conductors (i.e., 64 pairs) cooperating to define sixteen telecommunication links in the illustrated embodiment.

The hollow housing 71 is adapted to be fixedly secured or sandwiched between the opposed abutment walls 42 defined on the connector units 32 and 33. For this purpose, the hollow housing 71 has generally parallel top and bottom walls 73, each of which has eight blocklike recesses 74 formed therein, four along each side thereof, whereby the eight recesses in terms of their size and location identically correspond and mate with the eight recesses 45 formed in the abutment wall 42 of each connector unit 32 and 33. Each recess 74 also mounts therein a contact grouping 75 which in the illustrated embodiment includes sixteen contacts which define two telecommunication links each being defined by eight separate contacts, whereby the contact grouping 75 is structurally and functionally identical to the contact grouping 48 described above. The individual contacts of each contact group 75 as associated with each recess 74 are all connected internally of the housing 71 to one of the conductors associated with the cable 72.

The in-feed module 24 is secured to the modular communication system by positioning the housing 71 in abutting contact between the opposed abutment surfaces 42 on the connector units 32 and 33, and then fixing these three housing units together, such as by screws. This results in forming eight upper access ports 54 between the upper connector unit 33 and the housing 71, four of these access ports being along each side of the assembly, and each of these access ports being connected to and accessing two telecommunication links which are distinctly different from the telecommunication links which are provided at the remaining seven upper access ports.

A further set of eight lower access ports, four on each side, are provided between the lower connector unit 32 and the bottom side of the housing 71. This lower set of access ports is in all other respects identical to the upper set, and each port of the lower set also accesses two telecommunication links which are distinct from the telecommunication links which are available through the remaining seven lower access ports. However, each upper access port and a corresponding one of the lower access ports (normally the lower access port which is disposed directly vertically below the corresponding upper access port) each access the same two telecommunication links, such being illustrated by the link designations L1 and L2 in FIG. 19.

When the in-feed module is connected between the connector units 32 and 33 as illustrated by FIG. 19, then one of each pair of identical access ports has a deactivating plug 76 inserted therein, which plug includes a thin blade 77 constructed of an insulative material which is slidably inserted into and effects separation of the opposed resilient contact parts so as to effect deactivation of the telecommunication link therebetween. This selection as to the positioning of the deactivating plug 76 is made by the installer. For example, referencing FIG. 19, if the installer wants links L1 and L2 to extend leftwardly, then the installer inserts a deactivating plug 76 into the uppermost port, whereby these L1 and L2 are deactivated at this point and cannot extend rightwardly. Similarly, if the installer wants the links L3 and L4 to project rightwardly, then the installer inserts an insulating plug 76 into the lowermost port so that the links L3 and L4 are prevented from extending leftwardly. This same determination is made with respect to all eight groupings of links such that an insulating plug is inserted into each cooperating upper and lower pair of access ports. The remaining eight access ports, namely those which do not have a deactivating plug therein, are normally provided with an outer cover so as to close off the port.

If desired, one or more of these remaining ports, rather than receiving covers, can have a tap-off module 23 plugged therein, which plug-in operation will be the same as described above. When a tap-off module 23 is plugged into one of the access ports of the cooperating pair associated with the in-feed module, then the other access port of the pair is provided with a deactivating plug 76 therein.

Referring now to FIGS. 20 and 21, there is illustrated a further variation of the modular communication system described above, in which variations of corresponding parts are designated by the same reference numerals with the addition of a prime (') thereto.

In this variation, the main communication module 22' is constructed the same as the module 22 described above except that the end connectors 32' and 33', which again are identical, are of a generally pyramidal construction terminating in a free end which is of generally square cross section and defines thereon an endwise facing abutment surface 42'. This latter surface has eight recesses 45' formed therein each containing a contact grouping which defines two telecommunication links. In this variation two of the recesses 45' open inwardly in sidewardly-spaced relationship from each of the four sides of the housing. In all other respects the two connector units 32' and 33' again join together in the same manner as described above so as to define eight access ports, two on each side of the connector assembly (i.e., two accessible from each side, two from the top, and two from the bottom).

Similarly, the in-feed module 24' has a housing 71' which again sandwiches between the abutting faces 42', with each side of the in-feed housing 71' having eight contact-containing recesses, two accessible through each side edge. When the housing 71' is sandwiched between the connector units 32' and 33', there is thus defined two sets of eight access ports, with one access port of each set being identical (in terms of connecting to the same telecommunication links) as the longitudinally aligned access port of the other set, in the same manner as described above relative to FIG. 19.

With the arrangement of FIGS. 20 and 21, the same number of access ports 54 are provided, only some of these are now accessible from the top and bottom, rather than only from opposite sides as in the earlier variation. This arrangement of FIGS. 20 and 21, however, always ensures that the adjacent distribution modules 22' are properly aligned and connect together since the connector units 32' and 33' have no "up" and "down" or "right" and "left" orientation.

As to the connector units 32 and 33 provided on the distribution module 22, since it is possible that the opposed units 32 and 33 might both be uppermost or lowermost when it comes time to join them together, this only requires that one module 22 in its entirety be rotated 180° about its longitudinal axis, and this results in the opposed units 32 and 33 again assuming a top and bottom relationship so as to permit the units to be connected together.

Thus, the distribution modules 22 or 22' are nonhanded in that they do not have right and left characteristics, and this greatly simplifies the overall installation of the communication system on the wall panels, as well as the connecting of adjacent distribution modules 22 or 22' together. In fact, the modules 22 or 22' can be positioned within or loosely mounted on the bottom of the panel at the factory if desired.

Figure 23:
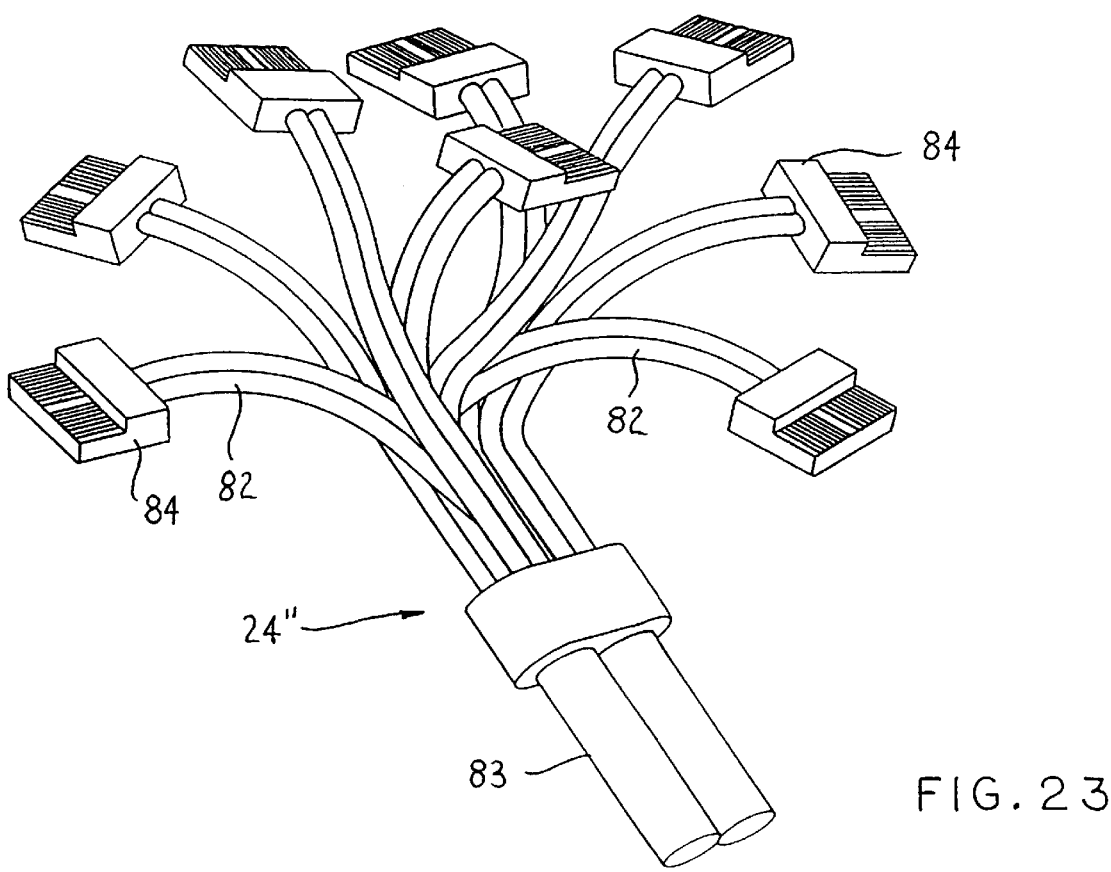
FIG. 23 is a perspective view which illustrates another variation of an in-feed module.

Referring now to FIG. 23, there is illustrated a modified in-feed module 24" which can be utilized so as to plug directly into the connector assembly 38 (FIG. 8) or 38' (FIG. 20). In this modification, the in-feed module 24" terminates in eight flexible cables 82 which project a limited distance beyond a sheath 83, and each of these cable 82 in turn connects to a port connector 84. Each cable 82 defines therein sixteen conductors which define two telecommunication links, and the port connector 84 in turn defines thereon sixteen traces which also define the same two links. In fact, the cable 82 and port connector 84 are identical to the cable 62 and plug 61 associated with the tap-off module 23 described above. The eight port connectors 84 are appropriately plugged into the eight ports 54 defined in the connector assembly 38 (FIG. 8) or 38' (FIG. 20), thereby supplying all eight telecommunication links to the system. Each of the port connectors 84 is manually oriented by the installer in the appropriate direction so as to determine whether the telecommunication link defined by the port connector is to extend rightwardly or leftwardly from the connector assembly.

Since the plurality of main distribution modules 22 which are serially interconnected by the connector assemblies 38 define an elongate arrangement which typically terminates in a connector unit 32 at one end and a connector unit 33 at the other end, these terminating connectors are preferably protected by providing each with a suitable end cap, which end cap can be the housing 41 which is fastened to the terminating connector unit so as to close off the recesses and the contact groupings thereof. This end housing 41 need not be provided with contacts associated with the recesses thereof.

In addition, while FIGS. 19 and 21 illustrate the in-feed module connected to the system at an intermediate connection between adjacent distribution modules 22 or 22', nevertheless in some instances it may be necessary or desirable to connect an in-feed module to one end of the system, such as at the terminating connector unit 32 or 33 as provided at the free end of the system. In such case, the in-feed module shown in FIGS. 19 or 21 can again be sandwiched between the terminating connector unit and the end cap described above. Alternatively, a modified in-feed module can be provided which, instead of being provided with a two-sided head as illustrated by FIGS. 18 and 20, can instead be provided with a one-sided head identical to the connector unit 32 and 33, whereby this in-feed module connects directly to the terminating connector unit 32 or 33 provided at the free or terminating end of the system.

For example, and referring to FIG. 22, there is illustrated the connector unit 33' at the free end of the system, which connector unit can have an end cap 81 secured thereto. Alternately, if in-feed is desired at this location, the end cap can be constructed generally similar to the housing 71' except that it will be provided with eight recesses and associated contact groupings on only side thereof, the other side being closed, and will have the main supply cable 72" coupled thereto for in-feeding the plurality of telecommunication links to the system.

Reference will now be made to FIGS. 24–50 which illustrate a further and preferred variation of the modular communication system of this invention that has access ports open on the opposite ends thereof. In this embodiment, the main distribution module 122 includes connector units 132 and 133 joined to opposite ends of the flexible distribution cable 131 which defines plural (i.e. sixteen) telecommunication links as described above relative to cable 31. The preferred connector units 132 and 133 are similar to the connector units 32 and 33 illustrated in FIGS. 1–8 above although the access ports of the preferred embodiment as provided for in-feed and tap-off of communication links are arranged in a single row of eight access ports accessible from both sides of the connector assembly.

This embodiment further includes an in-feed module 124 formed similar to the in-feed module 24" of FIG. 23 in that module 124 also includes a plurality of connector plugs for engagement with the ports of the connector assembly 138. In addition, the connector plugs of both the in-feed module 124 and tap-off module 123 are standardized and utilized in conjunction with spacer inserts (described hereinafter) which are placed within selected access ports to break the electrical circuit in one direction as occurs in the above-described embodiments.

It should be understood that the component parts of this preferred embodiment (FIGS. 24–50) are similar to those parts (reference numerals 11 to 84) previously described and accordingly, the same reference numerals are used although incrementally increased by 100 to differentiate the further embodiments described herein. For example, the different embodiments of the main distribution module are identified by reference numerals 22, 122, 222, etc.

Figure 24:
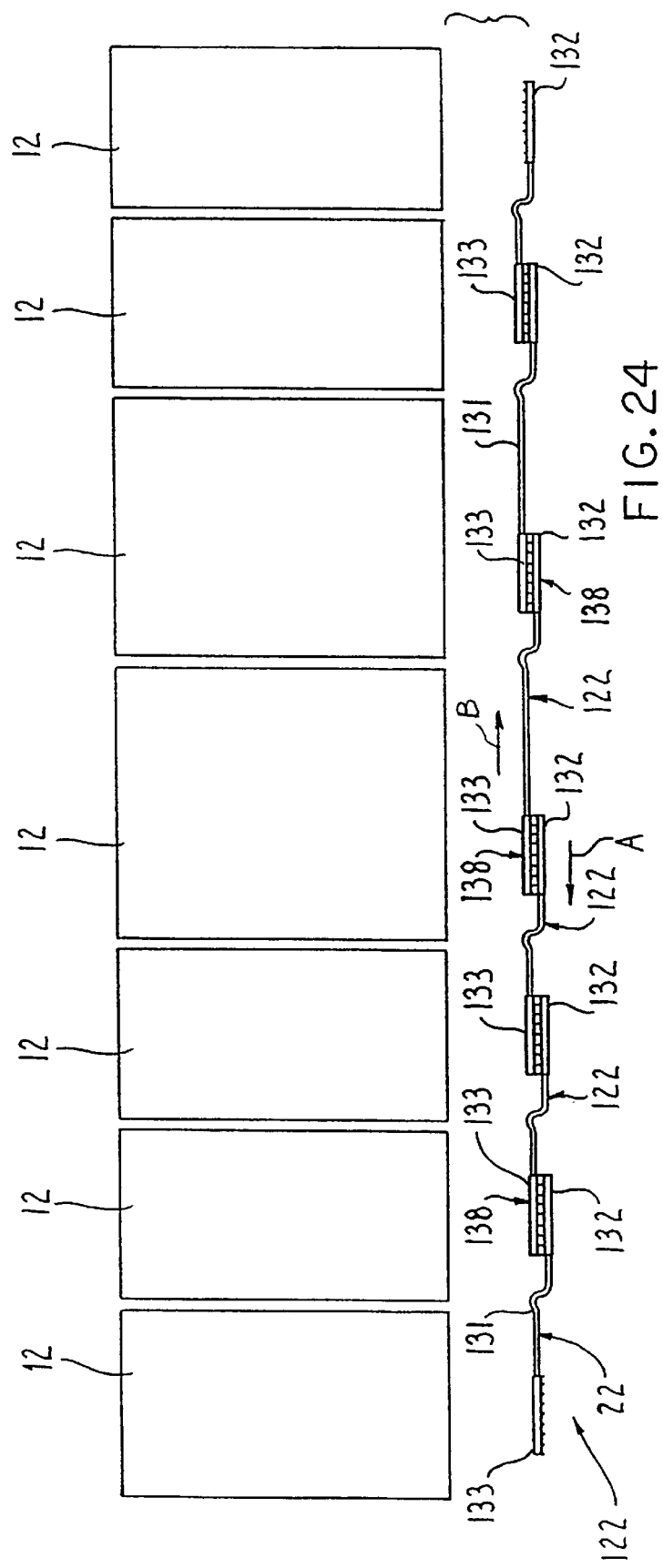
FIG. 24 is a diagrammatic side elevational view showing several furniture components (i.e. wall panels) and associated main distribution modules of one embodiment of the improved modular communication system having a single row of the access ports.
Figure 25:
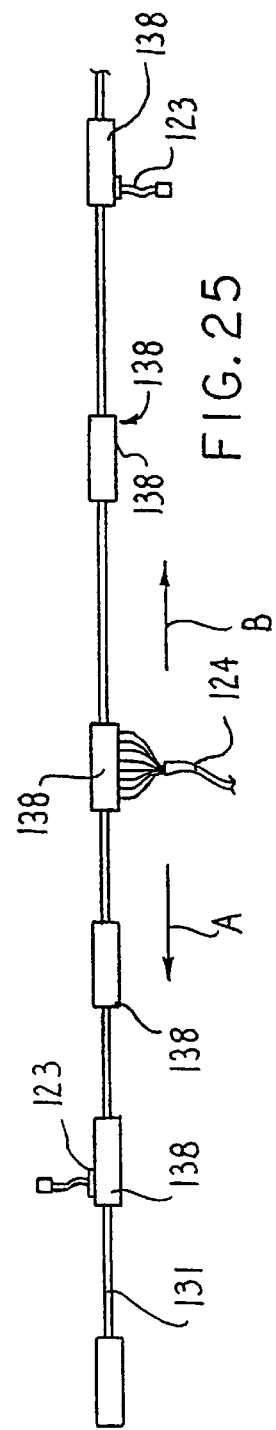
FIG. 25 is a diagrammatic plan view of the main distribution modules of the embodiment illustrated in FIG. 24.

More specifically, this embodiment includes a predetermined number of main distribution modules 122 which are serially-connected as can be seen in FIGS. 24 and 25. In particular, the modular communication system 121 is illustrated diagrammatically with the main distribution modules 122 enlarged and removed from the associated furniture panels or components 12 for illustrative purposes.

Each main distribution module 122 includes elongate connector units 132 and 133 at opposite ends of the elongate distribution cable 131. Each individual main distribution module 122 is, in the illustrated embodiment, associated with one of the panels 12 and is securable within the raceway 14 thereof (not illustrated in FIGS. 24 and 25). To facilitate assembly of the furniture components 12, each main distribution module 122 preferably is offset in the raceway a standardized distance such that one connector unit 132 projects out of the raceway of the associated panel 12 and into the raceway of the serially adjacent panel 12. The standardized offset therefore facilitates installation of varying size furniture components 12 by positioning the connector units 132 and 133 within the raceway intermediate the ends of the respective wall panels and away from any support structures which may be located proximate the edges thereof. During installation of the panels 12, the main distribution modules 122 are serially-connected one with the other so as to electrically connect the groupings of telecommunication links, i.e. the voice and data links, for transmission of signals longitudinally along the length of the panels 12.

With the preferred embodiment of the invention the in-feed module 124 may be readily connected at a selected location along the length of the serially-connected main distribution modules 122, for example at the center panel as illustrated diagrammatically in FIG. 25. Similar to the embodiments previously described, the in-feed module 124 permits selected communication links to be directed to a particular workstation either leftwardly or rightwardly as indicated by respective reference arrows A and B so as to thereafter permit selective accessing and tapping-off of the voice and data links to adjacent workstations by tap-off modules 123. As a result, the in-feed location, can be determined after installation of the main distribution modules without preplanning.

Figure 26:
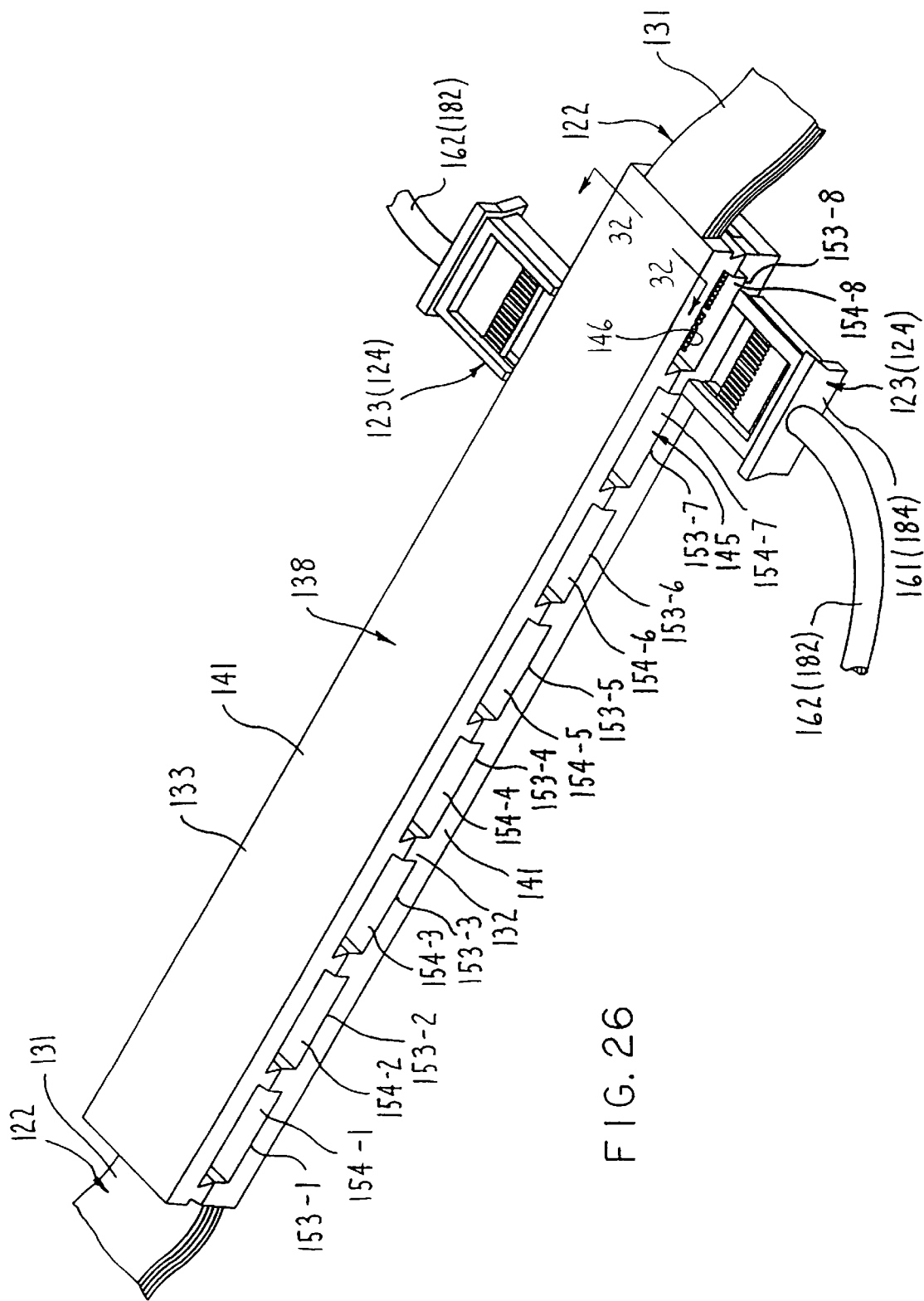
FIG. 26 is an enlarged partial perspective view illustrating a connector assembly of FIG. 24.
Figure 27:
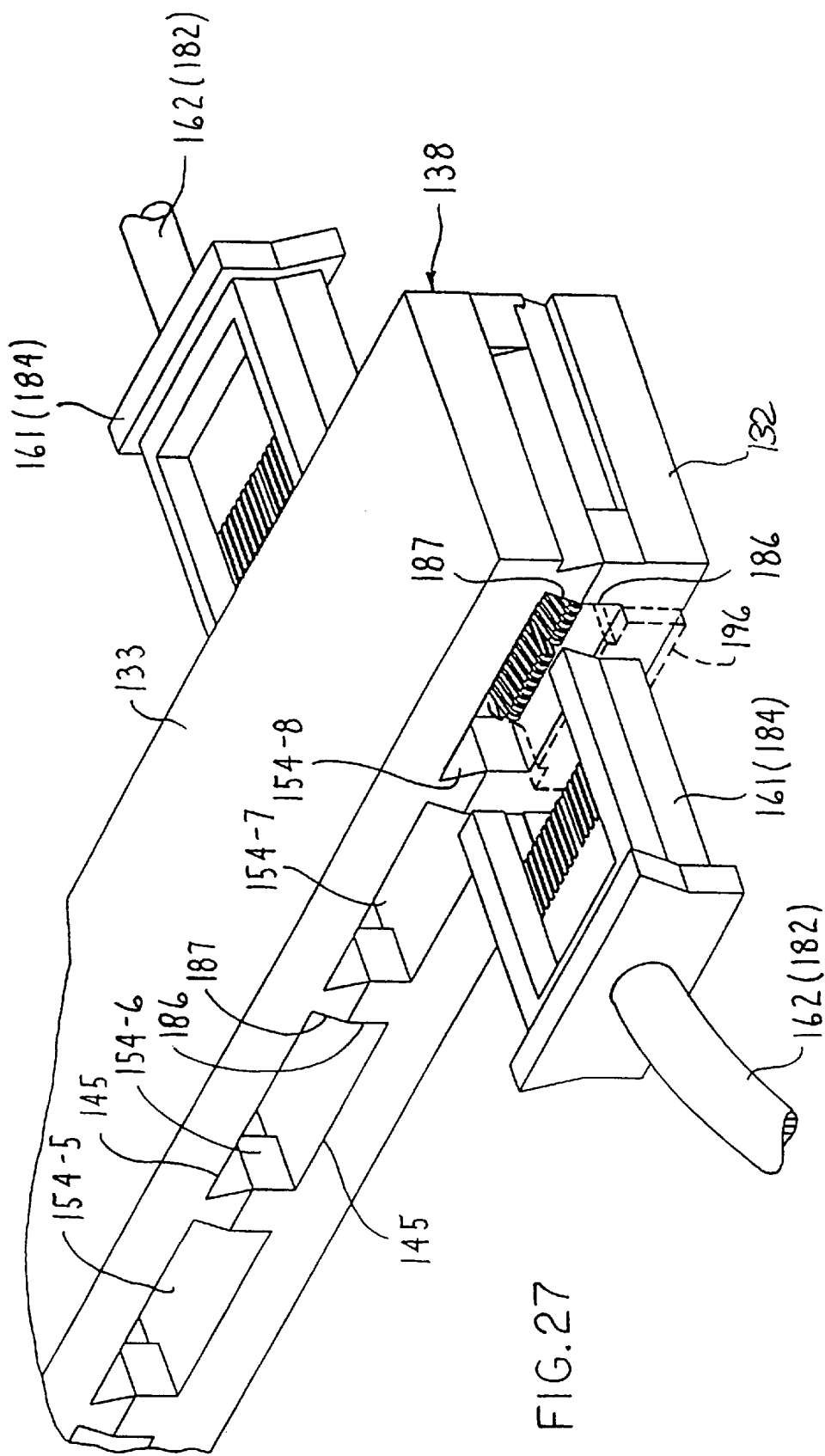
FIG. 27 is an enlarged partial perspective view of one end of the connector assembly of FIG. 26 as viewed from the front side.
Figure 28:
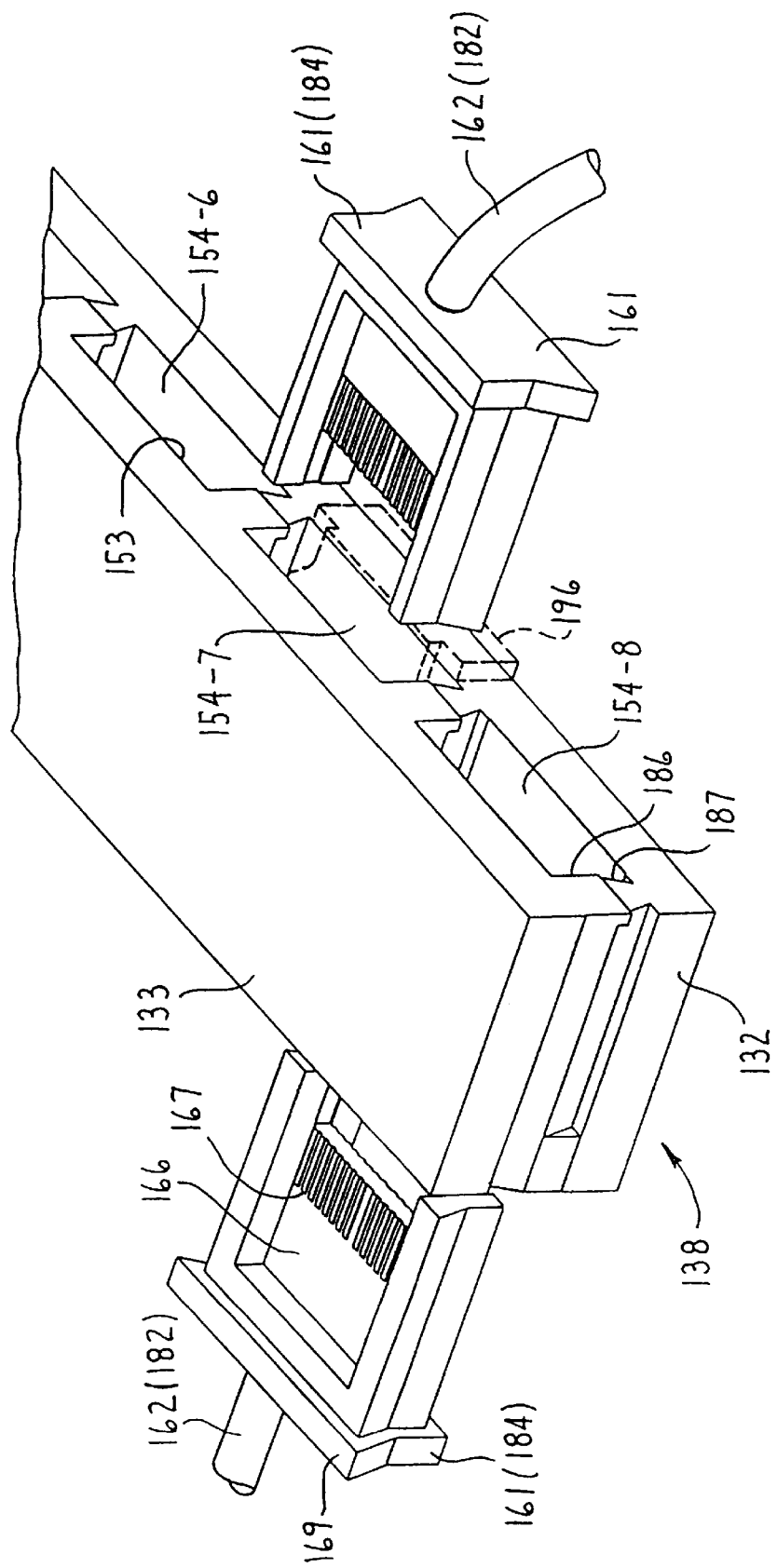
FIG. 28 is an enlarged partial perspective view of the connector assembly of FIG. 26 as viewed from the backside.

Referring to FIGS. 26–28, the connector unit 132 of one main distribution module 122 is serially mated to an opposing connector unit 133 of a serially adjacent main distribution module 122. When mated together, the opposing connector units 132 and 133 define a connector assembly 138 having a plurality of, and preferably eight, access openings 153-1 to 153-8 through both side walls 144 of the connector assembly 138. The access openings 153-1 to 153-8 are part of access ports 154-1 to 154-8 which are each adapted to receive therein a plug part 161 of one of the aforesaid tap-off modules 123 or, alternatively, a connector part 184 of the in-feed module 124.

The lower connector unit 132 includes an elongated platelike insulative housing 141 (FIGS. 29–30) having an upward facing abutment surface 142. The housing 141 defines a plurality of longitudinally-spaced recesses 145 which open laterally through both of the opposite side walls 144 and which also open upwardly through the abutment surface 142. In this preferred embodiment, eight such recesses 145 are provided which are arranged longitudinally in a lengthwise row along each of the connector units 132 and 133. To accommodate greater or lesser numbers of workstations, the number of recesses 145 and if necessary, the length of the housing 141 may be increased or decreased to vary the number of access ports 154 defined thereby.

Figure 29:
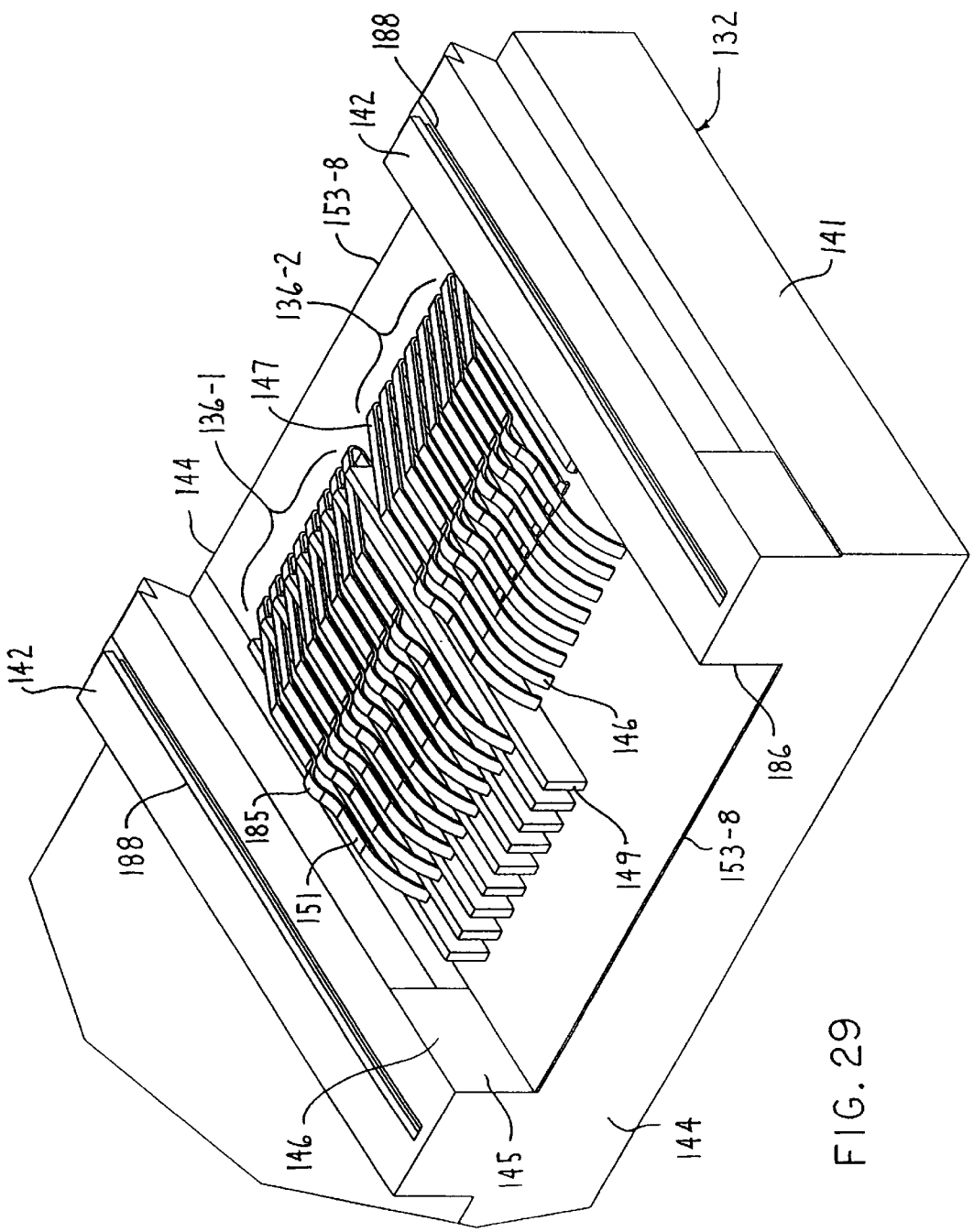
FIG. 29 is an enlarged partial front perspective view of one connector unit of the connector assembly of FIG. 28.

Referring to FIG. 29, each recess 145 has positioned therein a plurality of resilient electrical contacts 146, preferably sixteen, which define two subgroups of conductors 147, i.e. the two telecommunication links 136-1 and 136-2. Here again, one of the subgroups 147 defines a telecommunication link for voice and the other subgroup 147 adjacent thereto defines a telecommunication link for data. Since access openings 153-8 are provided at opposite ends of the recess 145, instead of only at one end as described with respect to the embodiment of FIGS. 1–8, the resilient contacts 146 are accessible from both sides of the connector unit 132 for selective connection to the tap-off and in-feed modules 123 and 124 respectively.

In addition, each recess 145 preferably includes a series of insulative ribs 149 in parallel relation which each are accommodated between pairs of the contacts 146. A number of these ribs 149 are shown removed for clarity. The electrical contacts 146 preferably have a U-shape, the resilient parts 151 of which are cantilevered above a surface of the access port 154. The resilient upper part 151 of each contact 146 also includes an arcuate or dimple portion 185 which projects slightly outwardly above the respective abutment surface 142 when in the relaxed nondeflected condition to facilitate contact with the other connector unit 133 being mated thereto. While FIG. 41 and the accompanying drawings only depict the electrical contacts 146 provided in one of the eight recesses 145, this is done solely for simplicity of illustration, and it should be understood that each recess 145 is provided with substantially identical groups of contacts 146 that preferably define the voice and data links.

Figure 30:
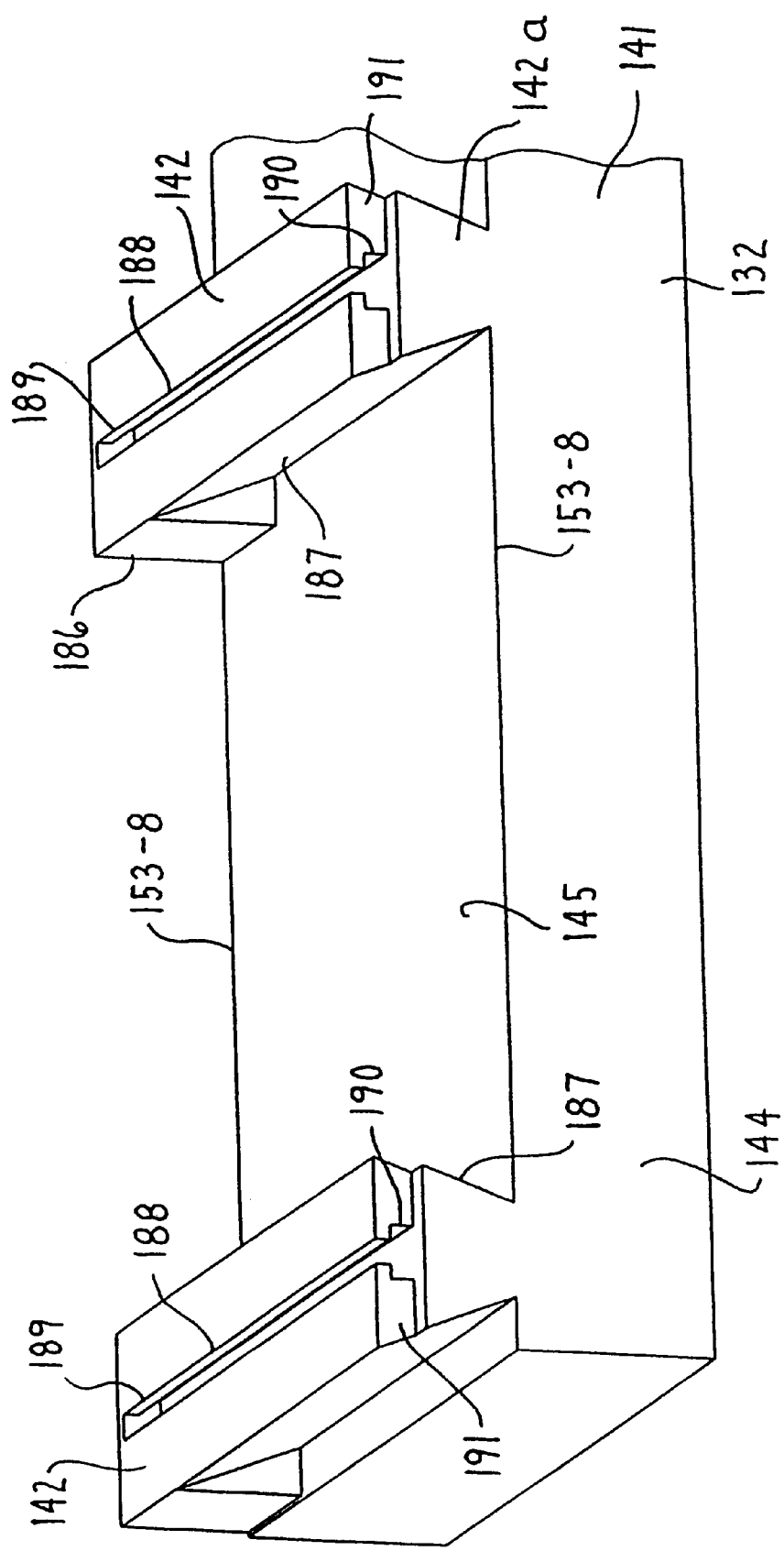
FIG. 30 is an enlarged partial rear perspective view of the connector unit of FIG. 29 with the electrical contacts removed.
Figure 31:
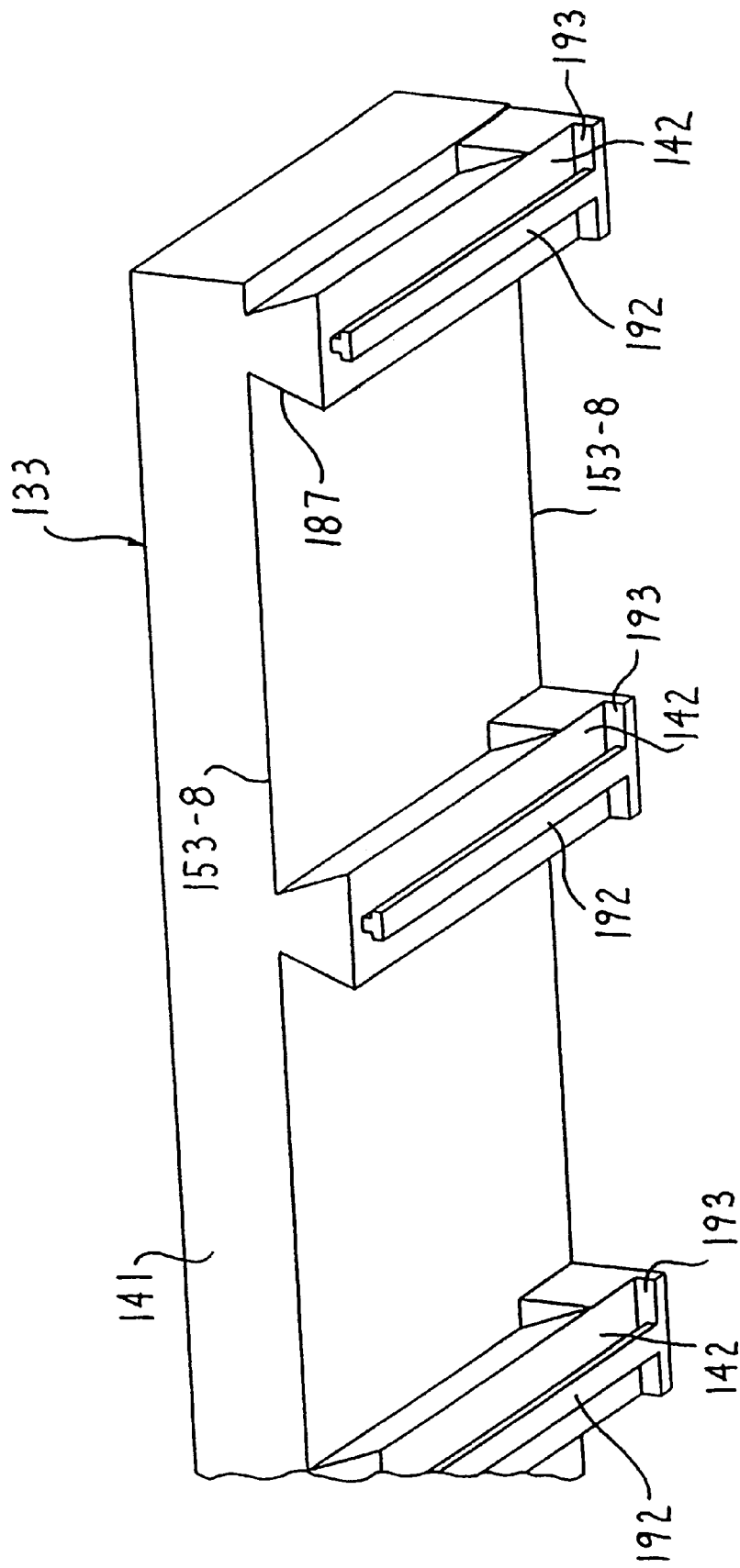
FIG. 31 is an enlarged partial perspective view illustrating an upper connector unit of the connector assembly of FIG. 26.

Referring to FIGS. 29–31, to facilitate correct orientation of the plug parts 161 of the tap-off modules 123 or the connector parts 184 of the in-feed module 124 upon insertion through the access openings 153, the recess 145 includes a first portion 186 of rectangular cross section which defines the access opening 153 at one end of the recess 145. The recess 145 also includes a second portion 187 of upwardly and inwardly converging trapezoidal cross section which defines the opposite access opening 153. The trapezoidal portion 187 extends across a majority of the width of the recess 145 before merging into the rectangular portion 186.

The recesses 145 of the connector unit 132 are formed substantially the same as the connector unit 133, such that when the connector units 132 and 133 are mated together, the rectangular portion 186 of one connector unit cooperates with the trapezoidal portion 187 of the other connector unit, and vice versa. As shown in FIG. 27, the cooperating rectangular and trapezoidal portions 186 and 187 define a shape for the access opening 153 which is symmetrical relative to a vertical axis. The access opening 153, however, on the other side of the connector assembly 138 as shown in FIG. 28 also has the same shape although it is inverted 180° about a horizontal axis extending longitudinally along the connector assembly. Thus, each access opening 153 provides access to a respective socket 154-1 to 154-8, as defined by the recesses 145, and is shaped to accommodate a "keyed" tap-off module 123 or in-feed module 124 for insertion therein in a predetermined orientation. The specific structure and function of the keying is discussed hereinafter with respect to the specific structures of the tap-off and in-feed modules 123 and 124.

To facilitate mating of the connector units 132 and 133 one with the other, a tongue and groove arrangement or in other words a male/female arrangement preferably is provided as the fastening method. Referring to FIGS. 30 and 31, the connector unit 132 (as viewed from one side) includes a transverse slot 188 which is formed in the housing 141 and is open along its length outwardly through the abutment surface 142. The transverse slot 188 extends between a closed end 189 near one side wall and an open end 190 which is disposed near the opposite side wall. The slot 188 is disposed in a housing abutment wall 142a which defines one side of the recess 145. This transverse slot 188 is provided with an inverted T-shaped cross section, and the open end 190 terminates at an inwardly recessed shoulder 191.

The other connector unit 133 (as viewed from the other side in FIG. 31) includes a transverse tongue 192 which has a T-shaped male cross section corresponding to the female cross-section of the transverse slot 188. This tongue projects downwardly from the abutment surface 142. The transverse tongue 192 terminates at an abutment wall 193 and is dimensioned such that when the transverse tongue 192 is inserted into the transverse slot 187 laterally through the open end 190, the recessed shoulder 191 of the lower connector unit 132 abuts and seats against the abutment wall 193 of the mutually adjacent connector unit 133 whereby the connector units 132 and 133 are mated and fixedly secured together.

Referring now to FIG. 32, when the connector units 132 and 133 are connected one with the other, the arcuate portions 185 of the respective resilient parts 151 of the electrical contacts 146 directly and individually press one against the other in resiliently biased engagement to complete an electrical circuit between the electrical contacts 146 of the connector unit 132 and the contacts 146 of the connector unit 133. In particular, the mutually adjacent arcuate portions 185 of the contacts 146 of the connector units 132 and 133 remain in resiliently biased engagement. When in this contacting state, the contacts 164 are in a pass-through condition for the passage of telecommunication signals through the main distribution modules 122.

As illustrated in FIGS. 26 and 33, each main distribution module 122 includes a predetermined length of the elongate distribution cable 131 which is connected at its opposite ends to the respective connector units 132 and 133. The distribution cable 131 may be formed of a plurality of layers of substantially flat ribbon cable. Each layer of ribbon cable is provided with a sufficient number of parallel wires or conductors so as to define one or more communication links. While FIG. 26 diagrammatically illustrates four layers of ribbon cable, the preferred number of layers is eight, with each ribbon cable layer carrying two communication links, and which number of cable layers corresponds to the number of access ports 154 in the connector assembly 138.

Each layer of ribbon cable of the distribution cable 131 terminates at tail portions 194 (FIG. 33) at opposite ends thereof, which tail portions are electrically connected to the electrical contacts 146 of the particular recess 145 associated therewith. More specifically, the individual tail portions 194 of each of the multiple layers of ribbon cable are spaced apart longitudinally relative to the axial length of the distribution cable 131 so that the tail portions 194 are disposed along the axial length of the associated connector unit. Each of the tail portions 194-1 to 194-8 are then connected to the electrical contacts 146 of a respective recess 145. Preferably, each layer of ribbon cable is formed with the same length and is axially staggered to form the elongate distribution cable 131 such that the tail 194-1 at the extremity of one end of the distribution cable 131 (for example, the leftward end) is disposed so as to be the innermost tail portion 194-1 at the opposite end thereof (the rightward end). This ensures that each access opening 153-1 to 153-8 and in particular, the access ports 154 at the various connector locations are capable of providing access to the same pair of communication links along the entire length of the modular communication system 121.

To orient the connector units 132 and 133 of each module 122 so that one connector unit faces upwardly while the other faces downwardly, the elongate distribution cable 131 preferably is provided with a 90° twist at one end thereof about a horizontal longitudinal axis, and is also provided with a −90° twist about the horizontal axis at the other end. In addition to orienting the connector units 132 and 133 for the serial-connection of the main distribution modules 122, this twisting of the distribution cable 131 facilitates the formation of a loop in the intermediate portion of the elongate distribution cable 131 which permits the distribution cable to be seated within the furniture component raceway. In particular, formation of a loop in the distribution cable 131 permits the cable to be snaked around vertical support posts (not illustrated) which commonly are found in the raceways of furniture panels or components. The loop also permits the distribution cable 131 to be axially flexible to ease installation of the modular communication system 121.

To more readily permit bending of the ribbon cable particularly in the area of the looped portion, the layers of ribbon cable preferably are not bonded one with the other but instead are loosely bound together to permit a shearing or sliding movement between the individual layers. The layers may still be banded together at periodic intervals along the length of the cable so long as sufficient shearing movement is permitted. It should be understood that the depiction of the elongate distribution cable 131 has been eliminated from the accompanying figures for illustrative purposes only.

In a variation which is usable where a limited number of common modular components is desired, the opposite ends of each cable layer may be provided with cassettes or cartridges 587 as will be discussed in more detail herein with reference to FIGS. 58–70. Each cassette 587 defines a recess 545 therein that includes contacts 546 connected to the individual conductors of that particular cable layer. The housings 541 are hollow to define a chamber in each which accommodates a plurality of cassettes 587, which when assembled together forms connector units 532 and 533 and can be adapted so as to be keyed to form a main distribution module 522 where the connector units 522 and 533 and cable 531 are functionally the same as the connector units 132 and 133 and elongate distribution cable 131 of the main distribution module 122.

Figure 34:
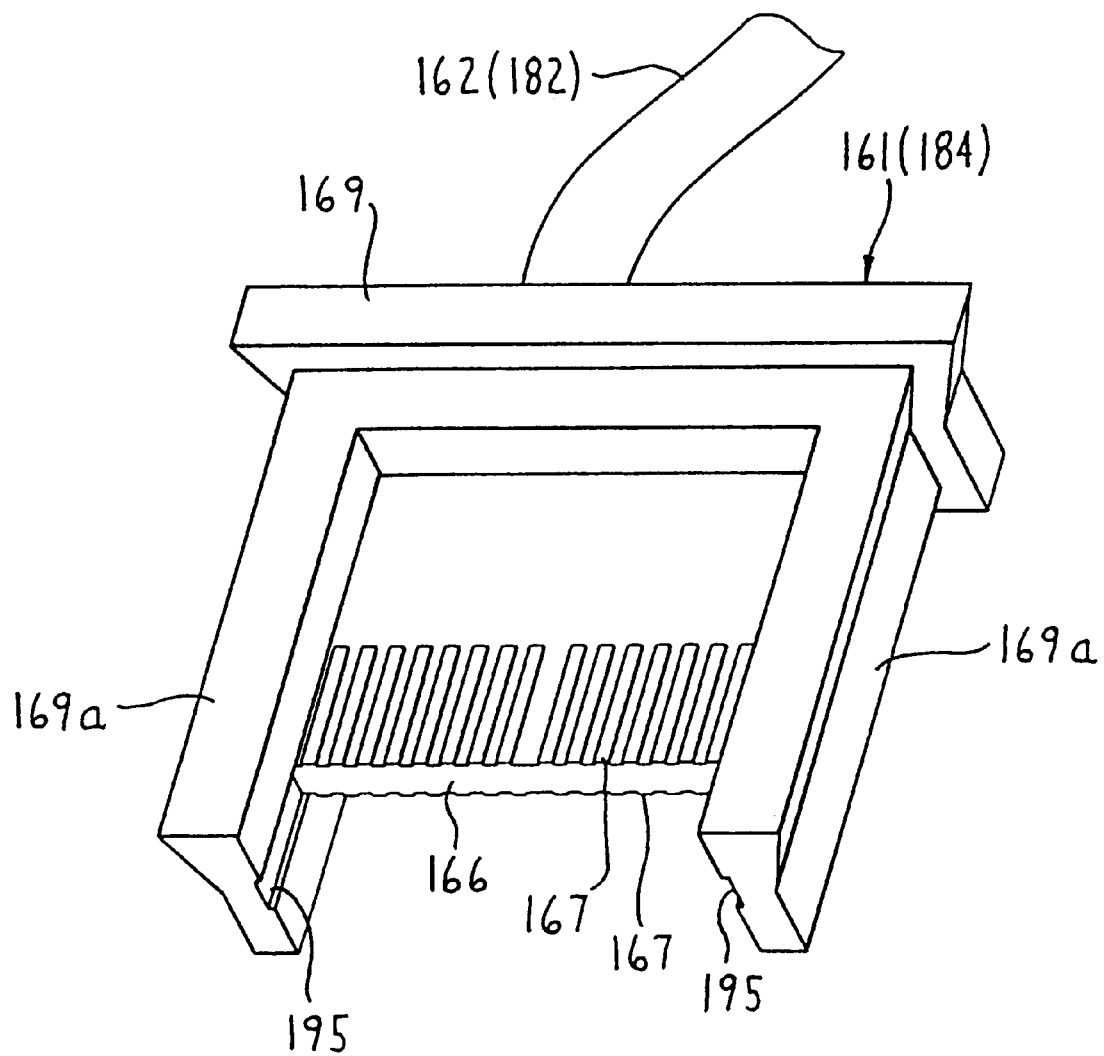
FIG. 34 is a partial perspective view of a preferred embodiment of the plug part for use with the communication system of FIG. 24.
Figure 35:
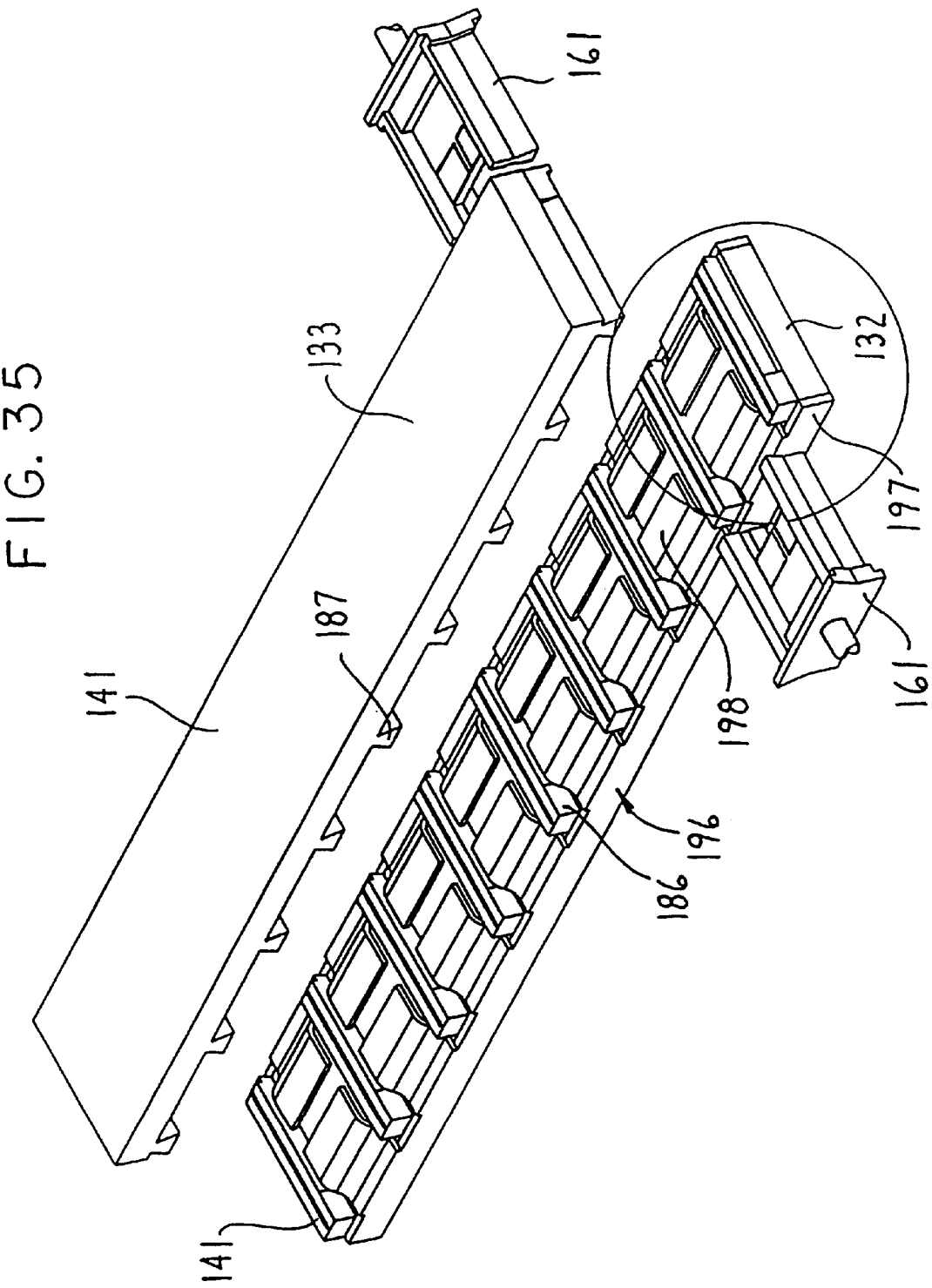
FIG. 35 is an exploded perspective view of the connector assembly of FIG. 26 with the cables removed.
Figure 36:
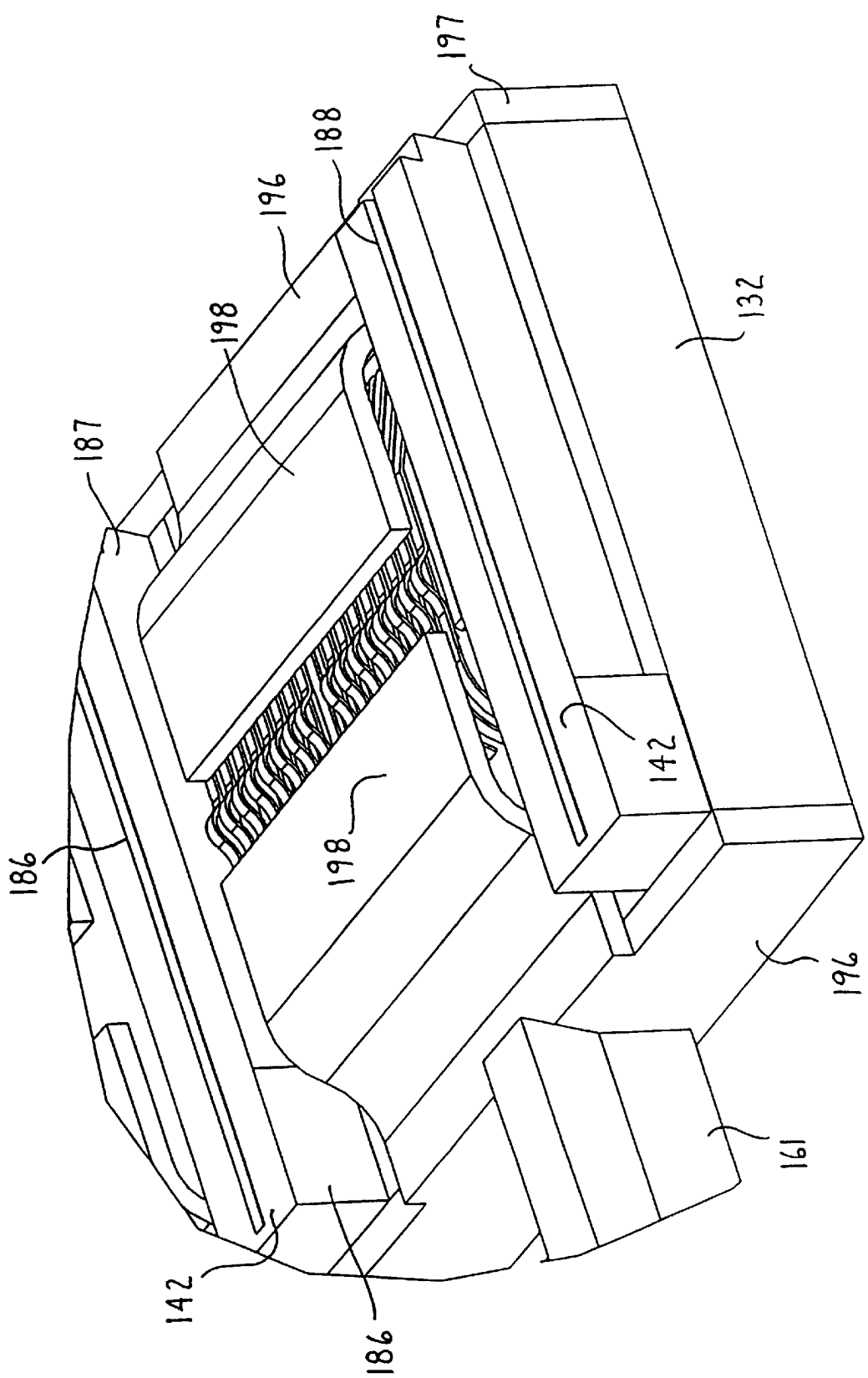
FIG. 36 is an enlarged partial perspective view of the connector assembly of FIG. 35 illustrating an insulative spacer insert and one access port.

Considering now the tap-off modules 123 and the in-feed module 124, and referring to FIGS. 26 and 34, both of the modules include a common plug part 161 (or port connector 184 as previously described herein with respect to FIG. 23). The plug part 61 or connector 184 are adapted to be received through a selected one of the access openings 153-1 to 153-8 (on either side of the connector assembly 138) for engagement with the corresponding access ports 154-1 to 154-8. Each plug part 161 is connected to a tap-off cable 162 which leads to corresponding module jacks (not illustrated), and each port connector 184 is connected to an in-feed cable 182 which lead back to the wiring closet. Each cable 162 or 182 preferably includes sixteen conductors to define two 4-pair telecommunication links (one data, one voice). Since the plug part 161 and port connector 184 are formed substantially the same for both the tap-off and in-feed modules, the following description will hereafter refer to only the plug part 161, although it should be understood that the description applies equally to the port connector 184 of the in-feed module 124.

The plug part 161 includes a U-shaped head part 169 and a blade or plate 166 which includes a set of electrically conductive contacts or tracings 167 on both sides thereof. The tracings 167 are electrically connected to the respective cables 162 (or 182 in the case of an in-feed module 124). The tracings 167 on each side of the plate 166 are positioned and dimensioned so as to be directly and individually connected to the voice and data carrying contacts 146 of the connector units 132 and 133 previously described herein. Preferably, the plate 166 and tracings 167 are formed like a computer circuit board or printed circuit board which plate 166 is then slidably inserted into slots 195 formed in the inside surfaces of opposing parallel side rails 169a of the head part 169.

The side rails 169a of plug part 161 include a substantially rectangular portion and a substantially trapezoidal portion along the exterior surfaces thereof to define a "keyed" shape which is adapted to slidably seat within the correspondingly shaped access openings 153. As previously described, the shape of the access openings 153 is inverted on the opposite sides of the connector assembly 138 such that the plug part 161 may be slidably inserted on one side when in one orientation, but must be rotated 180° in a vertical plane to a second inverted orientation to permit insertion on the opposite side of the connector assembly 138. For example, as illustrated in FIG. 26, the trapezoidal portions on the plug parts 161 when located on the backside of connector assembly 138 are disposed at the bottom thereof for insertion into the associated access opening 153. Conversely, the trapezoidal portions of the plug part 161 illustrated on the front side of the connector assembly 138 are inverted so that the keyed or trapezoidal portions are disposed on the top of the plug part 161. This ensures that the particular group of tracings 167 on the plate 166 which are assigned to carry voice signals, and the adjacent group of tracings 167 which are assigned to carry data signals, continue to carry such signals regardless of which side of the connector assembly 138 that the plug parts 161 are inserted from.

Alternatively with respect to the keying of the access ports, the opposite ends of the access ports 154 may be keyed the same such that the plug part 161 is rotated 180° about a vertical axis.

Referring now to FIGS. 35–43, to selectively tap-off the signals (i.e. links) from the connector assembly 138, insulative spacer inserts 196 are provided in the preferred embodiment for selective insertion in the access ports 154 between the opposing electrical contacts 146 of the connector units 132 and 133. The spacer inserts 196 preferably are formed of a cost-efficient, non-conductive material such as a polymer. Once positioned, the spacer inserts 196 only permit the tracings 167 on one side of the plate 166 to make contact with the electrical contacts 146 upon insertion of the plug part 161 into the respective access port 154. This completes an electrical circuit therethrough while breaking the connection on the opposite side.

The insulative inserts 196 may have two parallel rows, i.e. be double-sided, which each have sidewalls 197 and a plurality of stepped cantilevered projections 198 which extend laterally inwards for seating within the recesses 145. The spacer inserts 196 may be removably connected to the connector units 132 and 133 by any common fastener methods such as a snap-fit arrangement. As illustrated, the double-sided arrangement is retained between two connector units as seen in FIG. 32. The stepped projections 198 are provided with a sufficiently small thickness so that when no tap-off module 123 is provided thereat, the insert 196 permits the arcuate portions 185 of opposing resilient electrical contacts 146 to remain in resiliently biased contact even when the spacer inserts 196 are disposed therebetween.

Preferably, however, the spacer inserts 196 are provided with the single-sided arrangement illustrated in FIG. 38 or the single-piece arrangement illustrated in FIG. 39. By providing the single-sided or single-piece arrangements, the spacer inserts 196 may be selectively inserted into the recesses 145 respectively through the access openings 153 on one side of the connector assembly or through individual access openings 153 without disassembling the connector assembly 138. Removal is accomplished by first disengaging any plug parts 161 therefrom and then simply pulling the spacer insert 196 from the connector assembly. This readily permits rearrangement of the module communication system 121 without requiring disassembly of the components.

Figure 40:
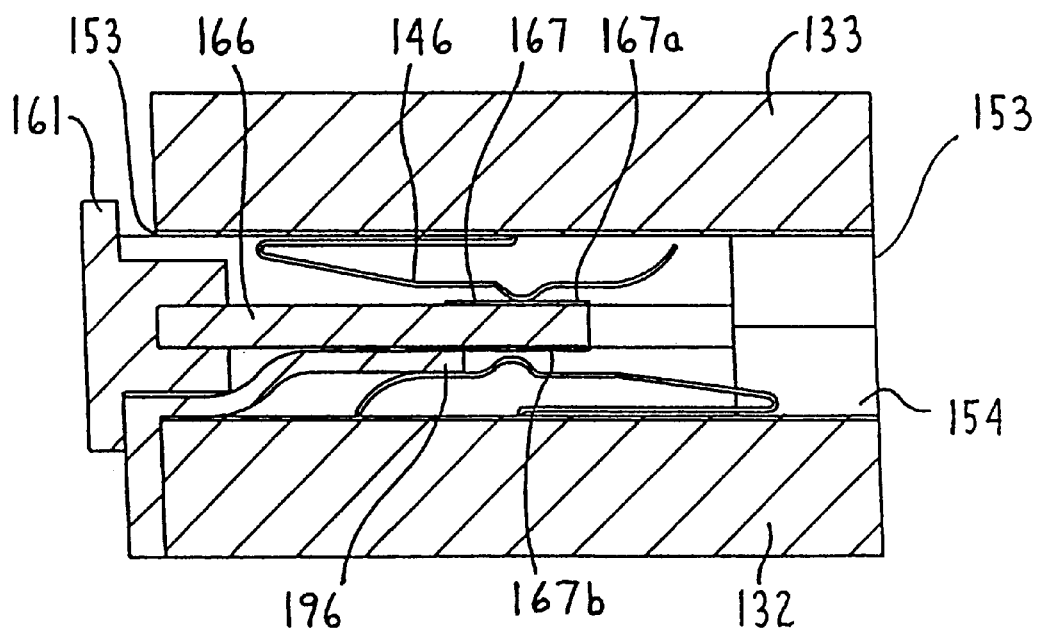
FIG. 40 is a side cross sectional view of the connector assembly of FIG. 26 with a plug part inserted from one side.
Figure 41:
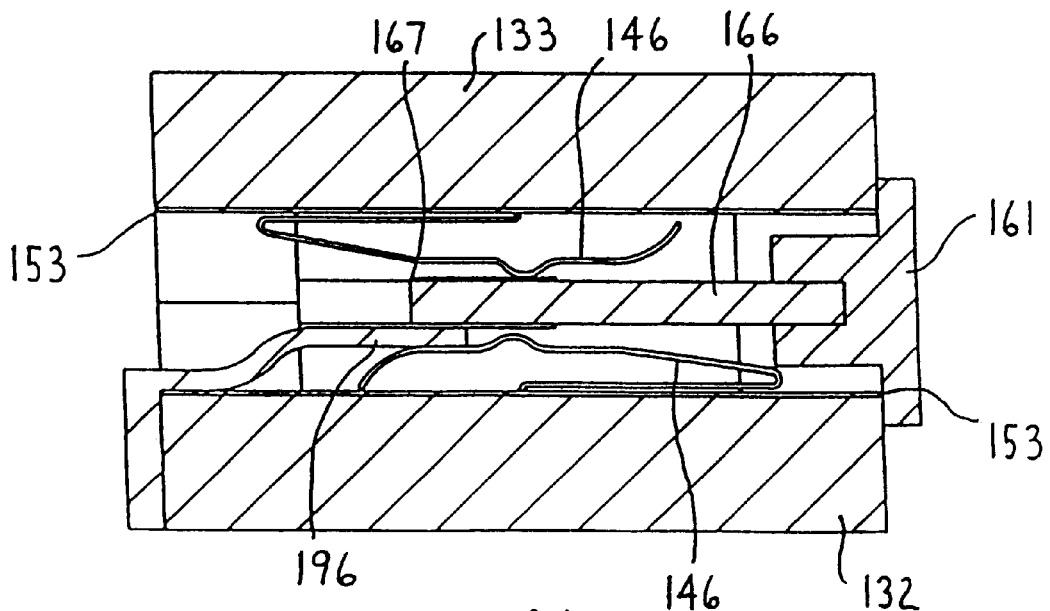
FIG. 41 is a side cross sectional view similar to FIG. 40 but illustrating the plug part inserted into the connector assembly from the other side.
Figure 44:
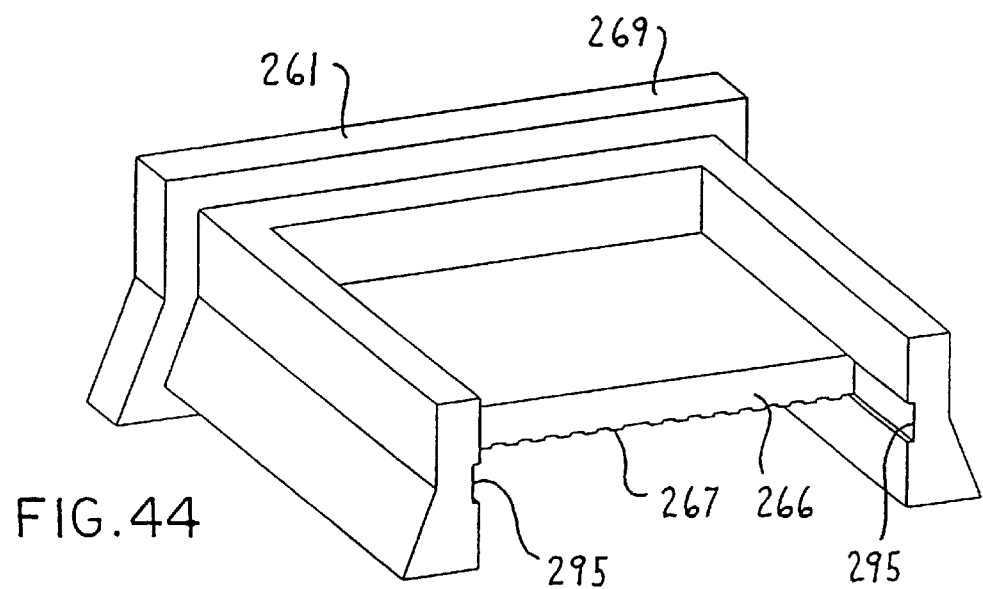
FIG. 44 is a perspective view of a variation of the plug part of FIG. 34.

More particularly, the inserts 196, for example, the single-piece inserts 196 (FIG. 39) illustrated in phantom outline in FIGS. 27 and 28, may be inserted into a selected one of the access openings 153 from either side of the connector assembly. As illustrated in FIG. 44, when the inserts 196 are inserted within the recesses 145, the opposing electrical contacts 146 remain in contact and a circuit is completed thereby. When being inserted into one particular opening 153, the inserts 196 also can be connected to either one of the connector unit 132 (as illustrated in FIGS. 40 and 41) or the connector unit 133 (as illustrated in FIGS. 42 and 43). The inserts 196 should be provided with a sufficient thickness such that when the plug part 161 is received within the access port 154, the insert 196 is deflected which effects separation of one group of contacts 146 from the tracings 167 on the plug part 161.

In determining which connector unit 132 or 133 of assembly 138 the insert 196 is to be connected to, the insert 196 is placed on the particular connector unit through which the electrical circuit will be dead. For example, for a tap-off location, the inserts 196 are connected to the connector unit 132 or 133 on the downstream side thereof, i.e. on the connector unit 132 or 133 which is downstream of the in-feed location since the inserts 196 serve to break the signal paths upon insertion of one of the plug parts 161.

More specifically, when a plug part 161 is inserted within the recess 145, the tracings 167a (FIG. 40) on one side of the plate 166 complete an electrical path between the cable 162 of the plug part 161 and the electrical contacts 146. With this arrangement, the insulative insert 196 separates the opposite electrical contact 146 from the opposite tracings 167b on the plate 166. The signal path is thus completed from the connector unit 133 to the plug part 161, while the signal path downstream therefrom (i.e. in connector unit 132) is broken.

When inserting the plug part 161, the plug part 161 first contacts and presses the insert 196 to break the connection between the opposing contacts 146 before the tracings 167a engage the upstream contacts 146. Upon continued insertion of the plug part 161, the signal path is then completed by engagement of the tracings 167a with the upstream contacts 146. This initial breakage of the signal path during insertion also occurs for an in-feed module.

In addition, upon insertion of the plug part 161 from the other side of the recess 145 as shown in FIG. 41, the plate 166 also extends within the access port 154 to deflect the insert 196. Preferably, the ned of one of the plate 166 and insert 196 includes an inclined surface (not illustrated) which facilitates sliding of the end of the plate 166 and insert 196 thereon. This has the same result of completing an electrical circuit through the tracings 167 on one side of the plate 166 while breaking the electrical circuit on the opposite side thereof.

The insulative spacer inserts 196 are also mounted on the connector assembly to which the in-feed module 124 connects. The individual or single spacers 196 of FIG. 39 are preferably used, and one such spacer is inserted into each port 154 which receives therein an in-feed plug part 184, which plug part 184 can be inserted from either side of assembly 138. If the in-feed link is to be supplied to the bottom connector unit 132 (direction A in FIG. 24), then the insert 196 is mounted in the upper unit 133 similar to FIGS. 42–43. On the other hand, if the in-feed link is to be supplied to upper connector unit 133 for supply in direction B of FIG. 24, then the insert 196 is mounted in the lower unit 132 similar to FIGS. 40–41. This thus enables the in-feed link to be supplied in only one direction, but enables selection of direction A or B by selective positioning of insert 196 for each port 154.

In operation, an installer determines where an in-feed location will be along the length of the distribution modules 122, which are serially-connected one with the other, and also determines the locations of the various workstations with respect thereto. Accordingly, the in-feed module 124 is extended through the panels 12 to the desired connector assembly 138 using the general techniques disclosed herein. Thereafter, the installer inserts the plug parts 184 of the in-feed module 124 into the ports of the assembly 138. Preferably the multiple plug part arrangement for the in-feed module 124 previously illustrated in FIG. 23 is utilized although it should be understood that the plug parts 184 themselves are provided with the preferred construction illustrated in FIG. 34. Typically, the plug parts 184 will be inserted on a single side of the connector assembly 138 as illustrated in FIG. 25, although the preferred embodiment of the invention allows the option of using the access openings 153 on either side of the connector assembly 138.

Routing of the particular communication links in either the A or B directions is accomplished by selectively placing the spacer inserts 196 within the access openings 153-1 to 153-8, which are formed by the assembled connector units 132 or 133, and which inserts 196 are placed on the connector unit opposite to the direction that the telecommunication links will be routed. For example, if one grouping of telecommunication links is to be routed in the direction indicated by arrow A in FIG. 25, the spacer or spacers will be inserted within the access ports 154 and removably fastened to the connector unit 133 as illustrated in FIGS. 42 and 43. Upon insertion of the plug 184 of the in-feed module 124, the circuit is broken through the connector unit 133 while being completed through the connector unit 132.

To route the communication link in the direction of arrow B, the insert 196 would be connected to the connector unit 132 as illustrated in FIG. 40. By using the single-piece inserts 196 (FIG. 39), each of the eight groupings of telecommunication links may be selectively routed in either the A or B directions.

Typically, once the in-feed module 124 is installed, tap-off modules 123 are provided at locations corresponding to the particular workstation areas being served. At a tap-off location, the insert 196 would be connected to the connector unit disposed on the downstream side of the tap-off location. For example, to tap-off on the side of the in-feed location which is indicated by arrow B in FIG. 25, the insert 196 would be connected to the connector unit 133 such that an electrical circuit is completed between the connector unit 132 and the tap-off module 123, while the signal path downstream therefrom is broken by the insert 196 and the space created thereby. The above-described preferred arrangement permits the tap-off module 123 to be inserted through the openings 153 on either side of the connector assembly 138.

Upon changing the in-feed location, an installer would only need to change the orientation of the inserts 196, i.e. move the inserts 196 from one to the other of the opposing mated connector units, and only for those inserts 196 at tap-off locations which are located between the old in-feed location and the new in-feed location. The remainder of the tap-off locations already would be configured correctly. In addition, for changing workstation locations, a user would only need to insert a spacer insert 196 on the downstream connector unit 132 or 133 and then insert a tap-off module 123 on the side closest to the workstation. Thus, minimal reconfiguration of the system is necessary during system changes. At the ends of the modular communication system 121, caps also may be provided on the exposed connector units 132 or 133.

Figure 45:
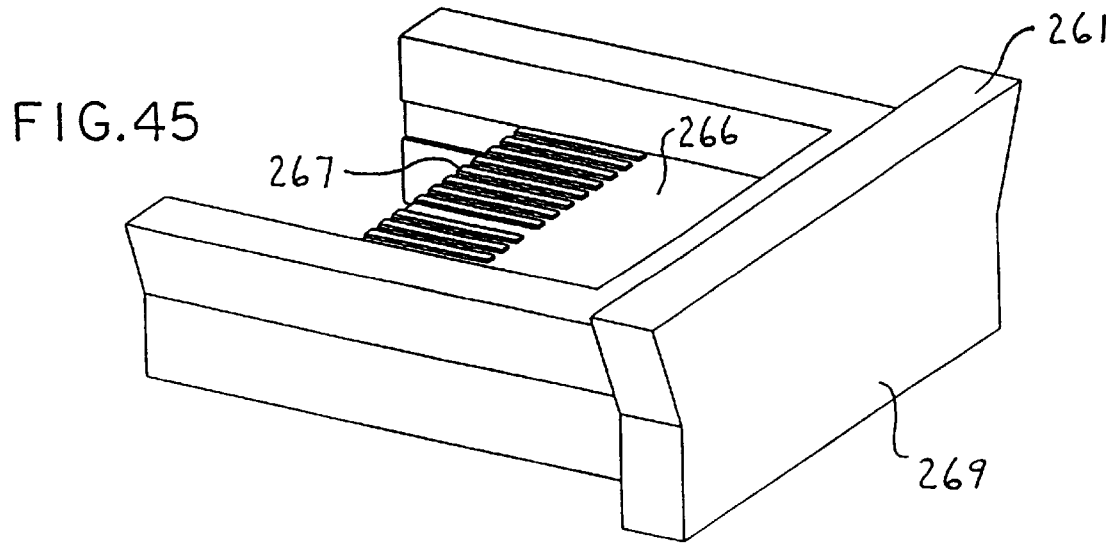
FIG. 45 is a perspective view illustrating the plug part of FIG. 44 from the opposite side.

Alternatively, the modified plug parts 261 may be provided as illustrated in FIGS. 44 and 45, for use with the above-described connector assemblies 138. The plug parts 261 are similar to the plug parts 161 described above although the tracings 167 on one side of the plate 166 are removed. Thus, the plug part 261 would have an insulative surface on one side and tracings 267 on an opposite surface of the plate 266. This alternative arrangement similarly makes or completes an electrical circuit through the tracings 267 while breaking the electrical circuit on the opposite side thereof.

Figure 46:
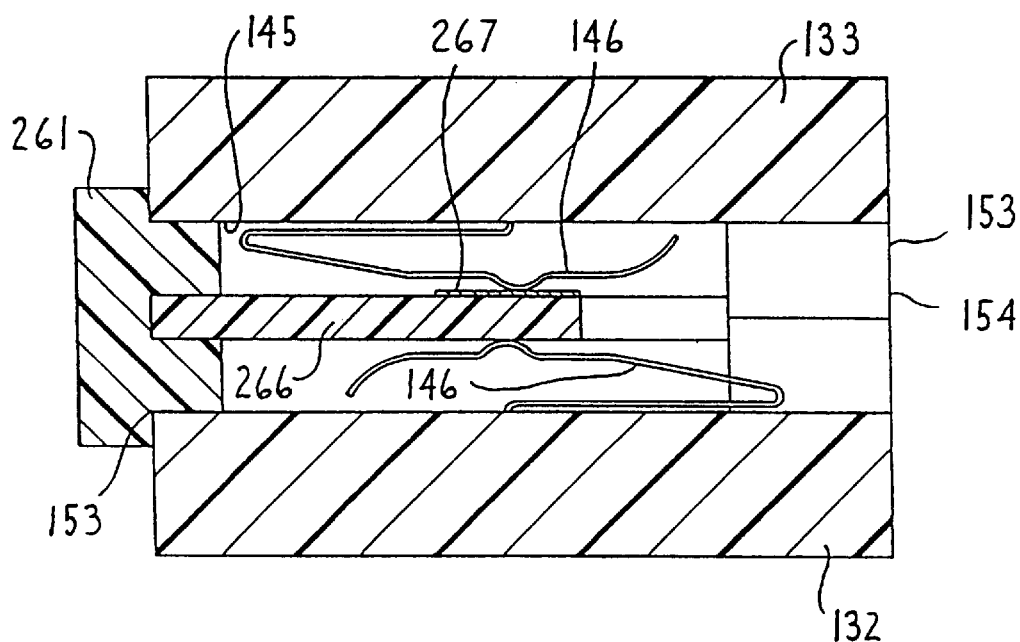
FIG. 46 is a side cross sectional view of the plug part of FIGS. 44 and 45 illustrating the plug part inserted from the left side into the connector assembly.

Upon insertion of the plug part 261 into the access port 154 defined by the connector units 132 and 133 as shown in FIG. 46, the tracings 267 contact the resilient electrical contacts 146 of the connector unit 133 so as to complete an electrical circuit therethrough. Conversely, the opposite side of the plate 266 is an insulative surface which breaks the electrical signal through the connector unit 132 downstream therefrom.

Figure 47:
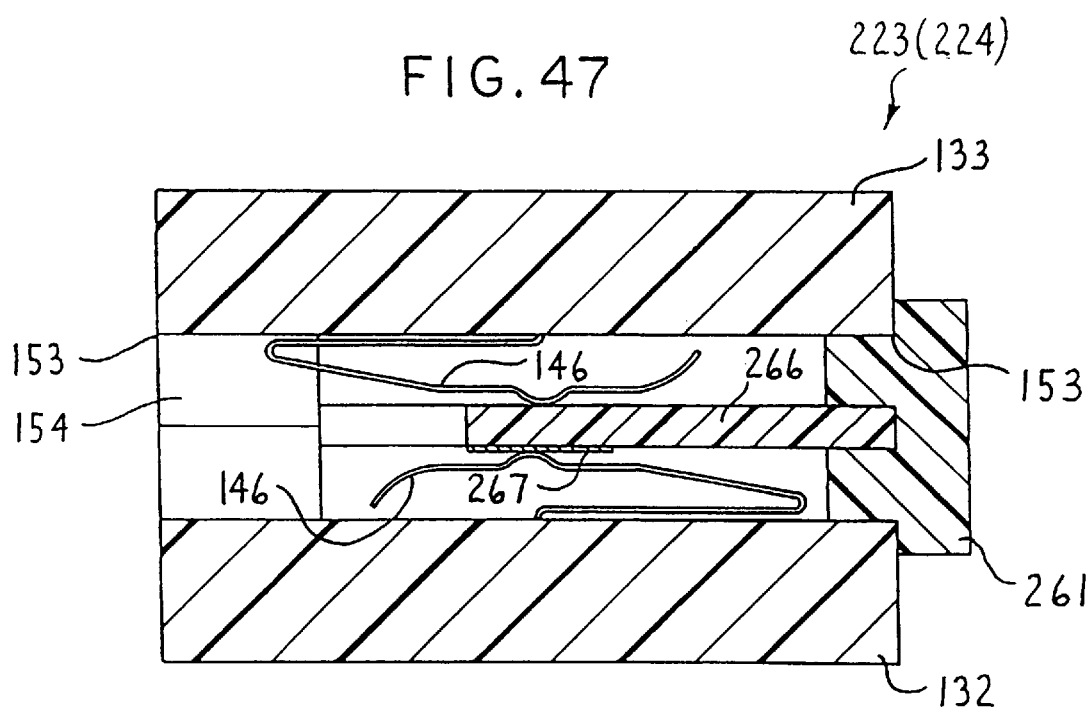
FIG. 47 is a side cross sectional view illustrating the plug part of FIG. 46 inserted from the right side.

As shown in FIG. 47, by rotating the plug part 261 180° through a vertical plane, the plug part 261 can be inserted through the opposite access opening 153. Consequently, the circuit is broken through the connector unit 133 and completed through the other connector unit 132. Thus, depending upon the particular access opening 153 of the recess 145 being used, a circuit can be completed between the plug part 261 and either one of the connector units 132 or 133.

In operation, the plug part 261 could be a plug part of an in-feed module 224 which could be inserted on one side of the connector units 132 and 133 to direct the signal path in one direction and could be inserted on the other side of the connector units to direct the signal path in the opposite direction. The same plug part 261 could also serve as a plug part for a tap-off module 223.

Figure 48:
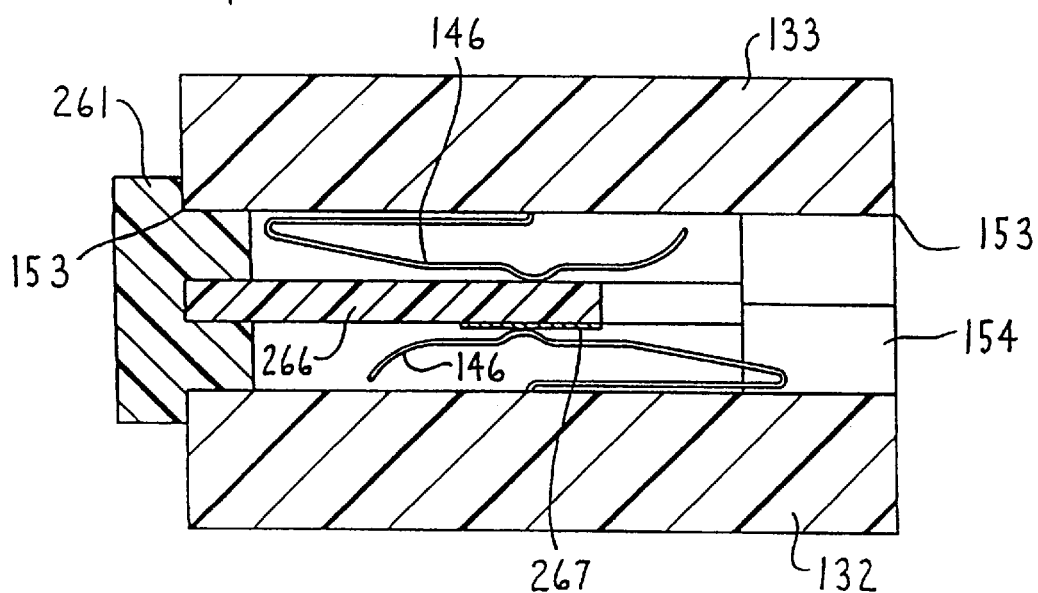
FIG. 48 is a side cross sectional view of a variation of the plug part illustrated in FIGS. 44 and 45 inserted in the connector assembly.
Figure 49:
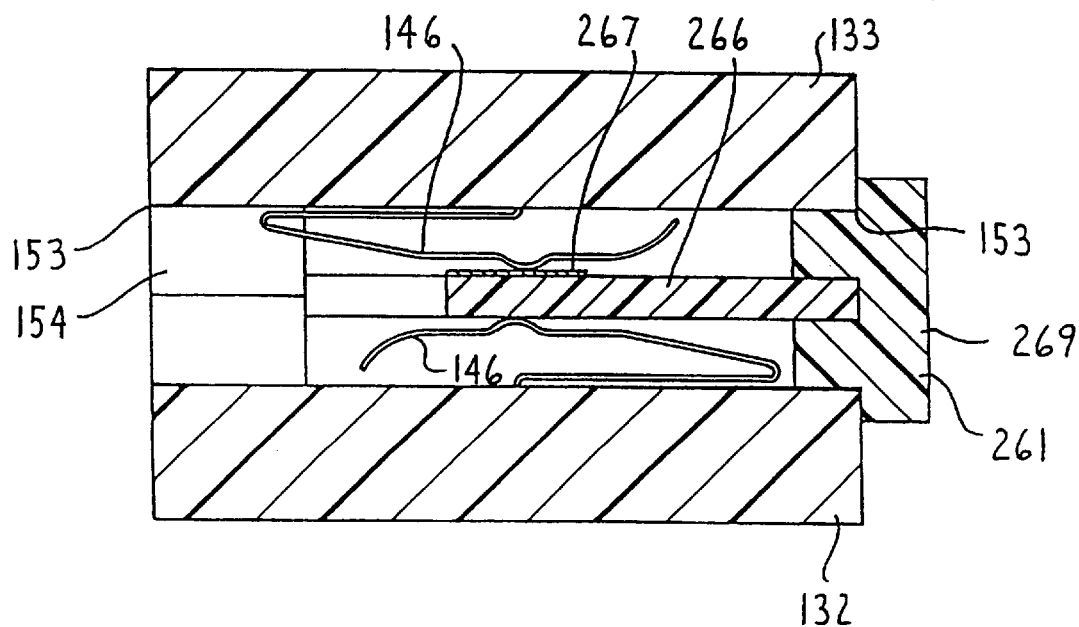
FIG. 49 is a side cross sectional view illustrating the plug part of FIG. 48 inserted from the opposite right side.

Alternatively, as illustrated in FIGS. 48 and 49, the tracings 267 may be provided on the opposite side of the plate 266 to provide a second configuration for a tap-off module 223 or the in-feed module 224 which also provides access from the sides of the connector units. This configuration, however, operates opposite the configuration illustrated in FIGS. 46 and 47.

Figure 50:
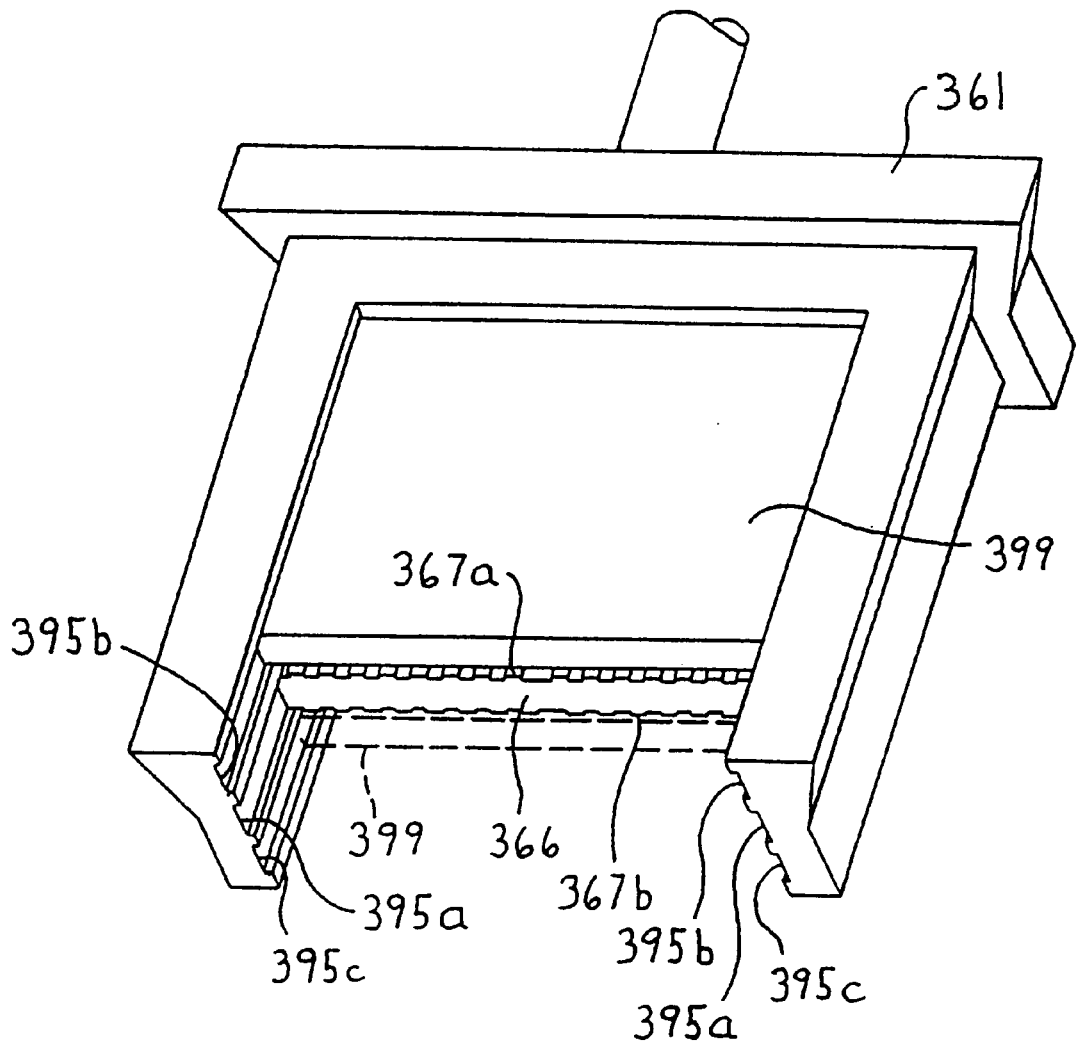
FIG. 50 is a perspective view of a further variation of the plug part.

A further modified embodiment is illustrated in FIG. 50 wherein the plug part 361 functions similar to the aforesaid embodiments. The plug part 361 includes intermediate slots 395a for slidably receiving the plate 366 therein and upper slots 395b and lower slots 395c which extend parallel to the intermediate slots 395a. Instead of providing the connector units 132 and 133 with the spacer inserts 196, the upper and lower slots 395b and 395c are dimensioned so as to slidably receive a spacer insert 399 selectively positioned above (as illustrated in solid lines) or below (as illustrated in phantom outline) the plate 366. By selectively positioning the spacer insert 399 above or below the plate 366, the tracings 347 on one side of the plate 366 are covered thereby while the other side remains exposed for contacting engagement with the electrical contacts 146 upon insertion of the plug part 361 into a selected access port 154. As a result, selected connections may be completed between the electrical contacts 146 and either the sets of the tracings 367a or 367b upon insertion of the plug part 361 into one of the access ports 154, from either side of the assembly 138, such that the in-feed modules selectively route and the tap-off modules selectively tap-off the communication links.

Referring to FIGS. 51–57, the modular communication system 21 may also be arranged such that an in-feed panel 412a is provided at the in-feed location which in-feed panel 412a has a pair of main distribution modules 422 disposed in the raceway thereof. This in-feed panel 412a may take the form of a standard panel provided with a second main distribution module 122.

From this in-feed panel 412a, the main distribution modules 422 extend in the directions indicated by arrows A and B. In the in-feed panel 412a, the free ends of the main distribution modules 422, i.e. the connector units 433, remain disconnected from each other unlike the aforesaid embodiments. Instead the connector units 433 are provided with cover units 481 which are formed similar to connector units 132, yet without the electrical contacts 446 therein. The skilled artisan will appreciate that the other embodiments of the invention can be used this way with cover units.

In the connector units 432 and 433, the electrical contacts 446 are oriented so that the free ends thereof extend in the same direction as can be seen in FIG. 53. The plug part is illustrated as it would appear in both the leftward and rightward positions.

The particular plug parts 461 of the tap-off module preferably are formed as illustrated in FIG. 53 with a small spacer 499a on one side of the plate 466 and a large spacer 499b on the opposite side of the plate 466. The small spacer 499a is disposed closer to the tracings 467 than the large spacer 499b. The plug part 461 is illustrated both as it would be on the rightward side prior to insertion and on the leftward side.

Figure 54:
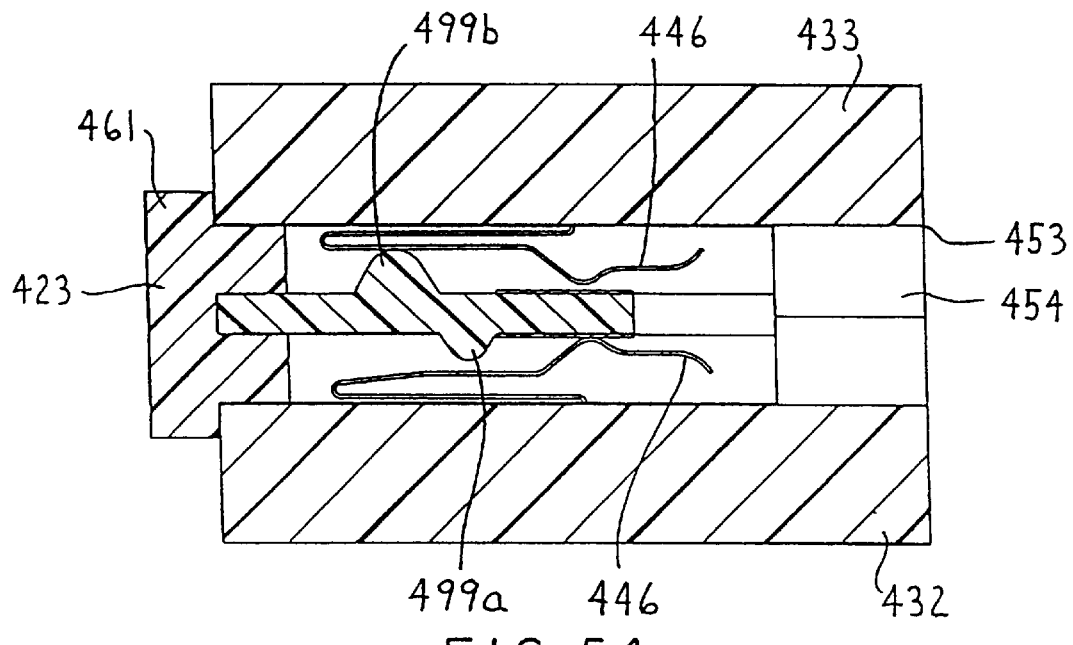
FIG. 54 is a side cross sectional view illustrating the plug part of FIG. 53 inserted from the left side into the connector assembly.
Figure 55:
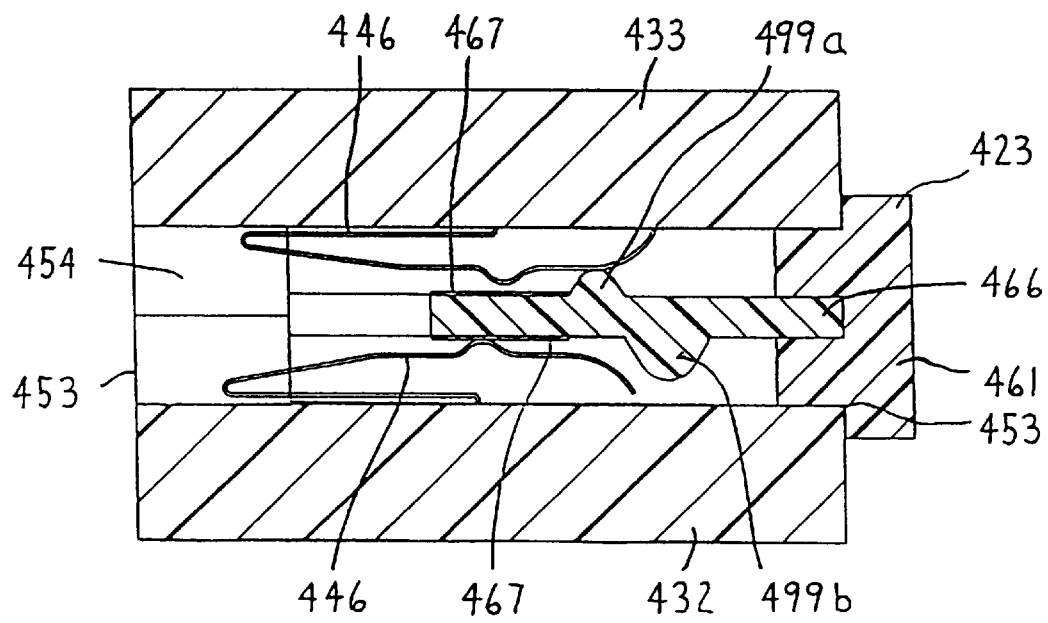
FIG. 55 is a side cross sectional view of the plug part of FIG. 54 inserted from the right side into the connector assembly.

The plug part 461 shown in FIGS. 54 and 55 is formed for use as a tap-off module 423 since the connector units 432 typically are disposed upstream relative to the connector unit 433, and thus receive the telecommunication signals. Thus, the tap-off module 423 is inserted so that a connection is made between the plug part 461 and the connector unit 132 which is carrying the telecommunications signals from the in-feed panel 412a.

Figure 56:
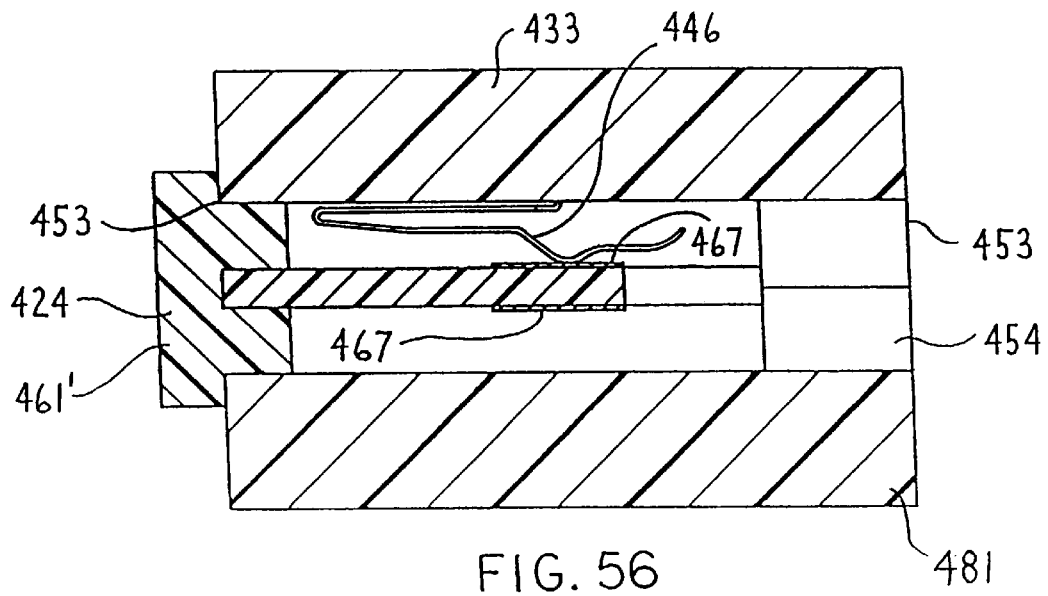
FIG. 56 is a side cross sectional view illustrating a plug part for an in-feed module for the communication system of FIG. 51.
Figure 57:
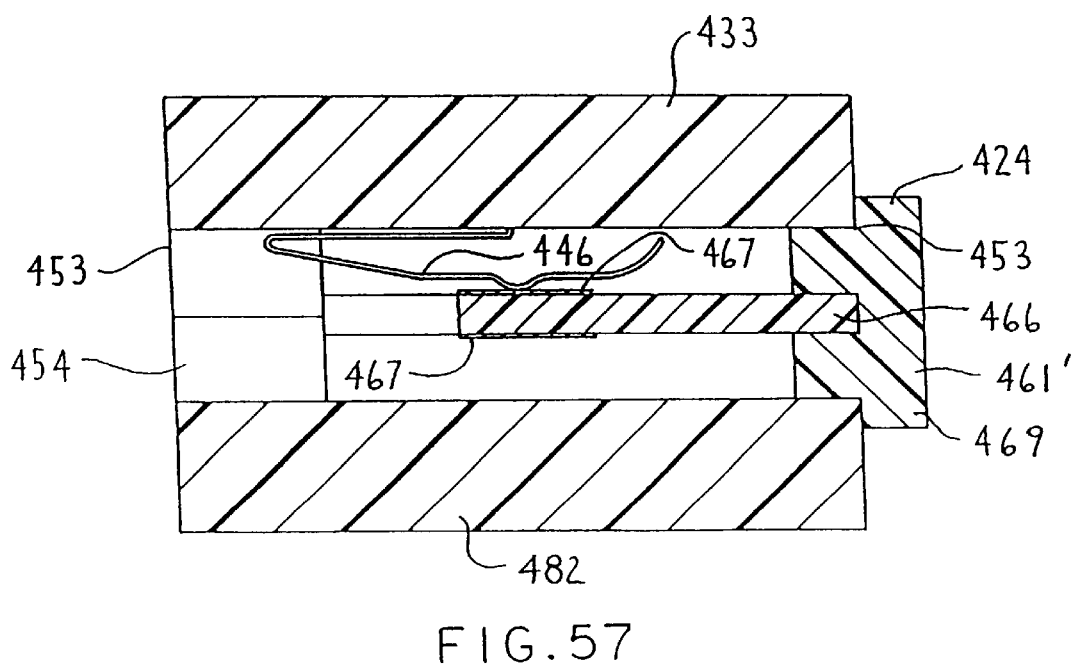
FIG. 57 is a side cross sectional view illustrating the plug part of FIG. 56 inserted from the right side into the connector assembly.

Referring to FIGS. 56 and 57 which illustrate a plug part 461' of an in-feed module 424 for engagement with connector unit 433 on the in-feed panel 412A. This plug part 4611 can be inserted from either side of unit 433, and can also be rotated 180° about the longitudinal extent of its cable so as to properly align and plug into the unit from either side.

Figure 60:
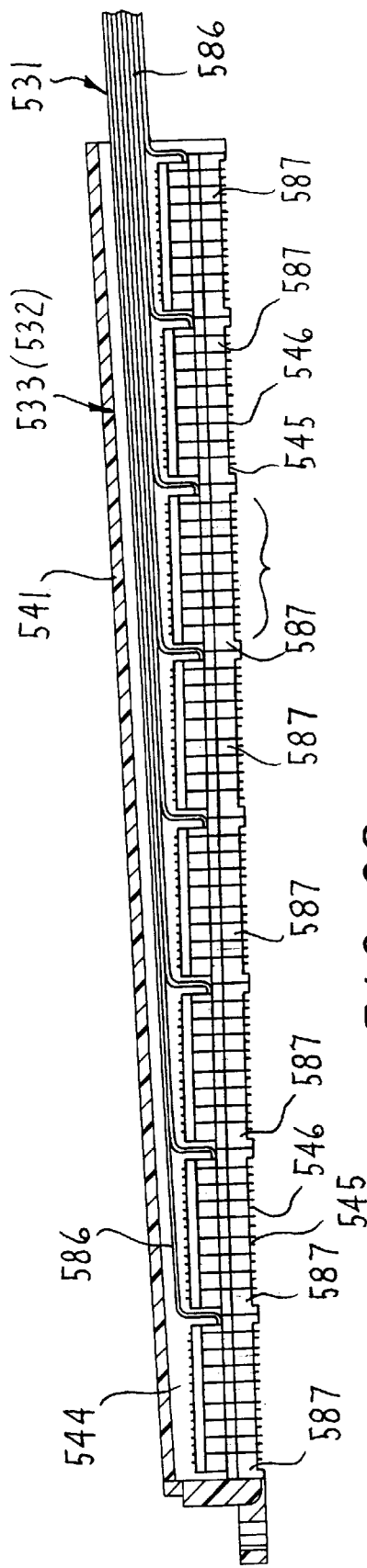
FIG. 60 is a partial side elevational view in cross-section illustrating cartridges of the cable assemblies mounted within an outer housing.
Figure 61:
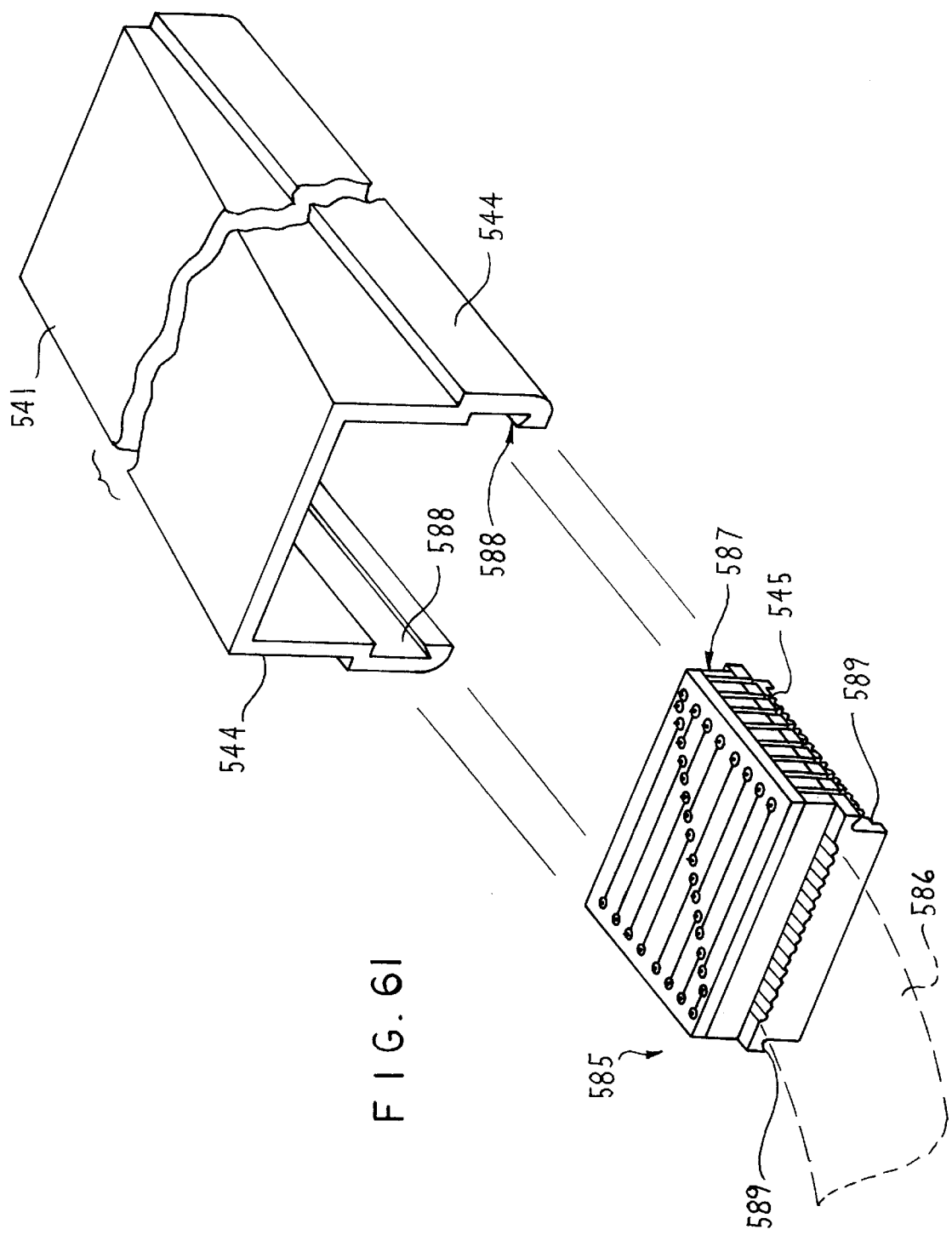
FIG. 61 is an exploded perspective view illustrating one of the cartridges prior to its insertion into the outer housing.
Figure 62:
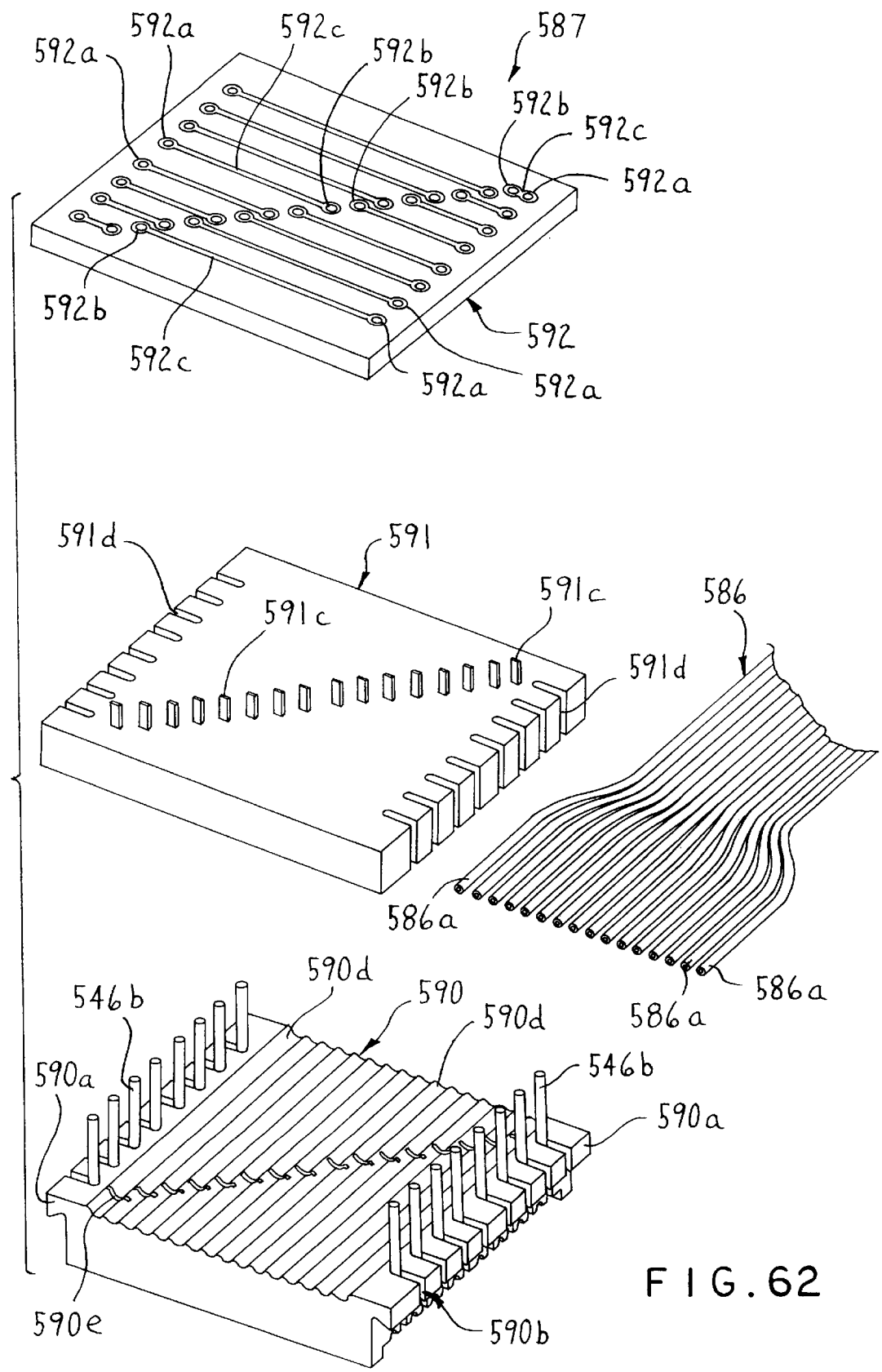
FIG. 62 is an exploded perspective view illustrating the components of the cartridge exploded apart.
Figure 65:
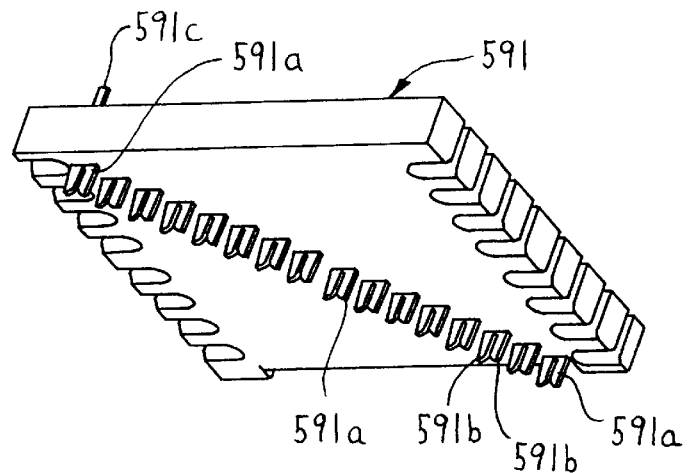
FIG. 65 is a bottom perspective view of the intermediate part of the cartridge components.
Figure 66:
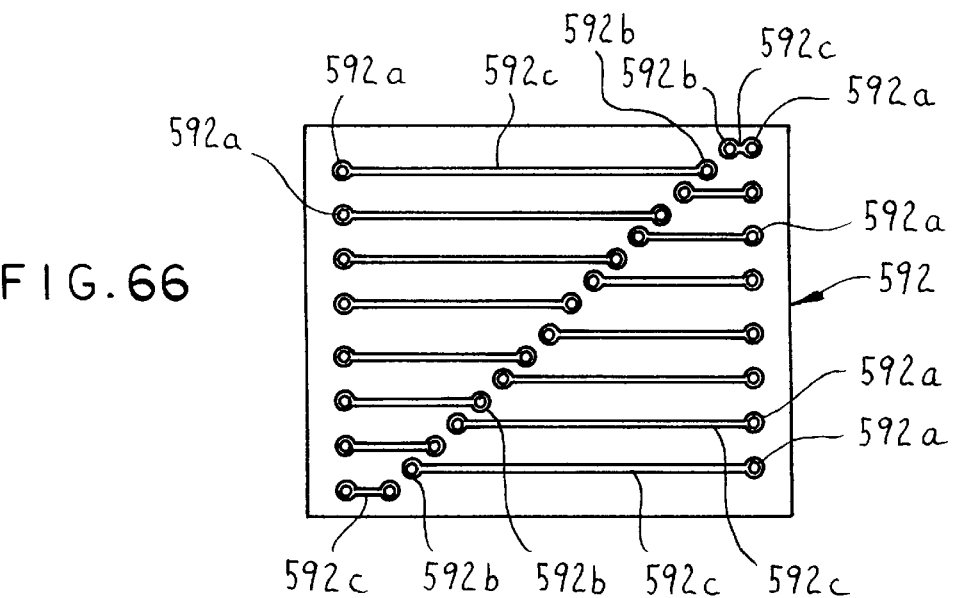
FIG. 66 is a top plan view of a top circuit board of the cartridge components.
Figure 67:
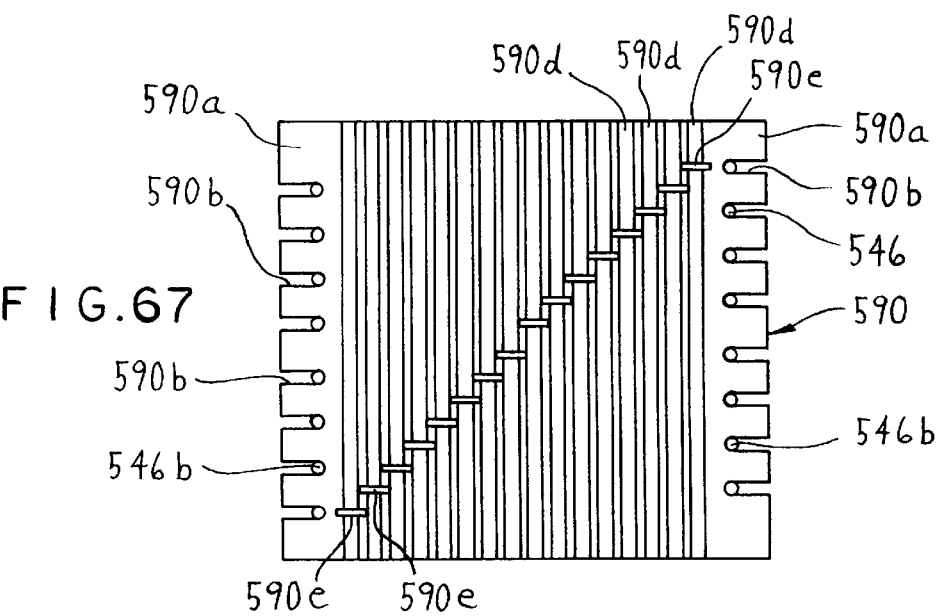
FIG. 67 is a top plan view of a base part of the cartridge components.

Referring to FIGS. 58–70, a further main distribution module 522 is disclosed which provides an alternative modular construction for the main distribution modules 122 discussed above. Referring to FIGS. 58–61, FIG. 58 illustrates three main distribution modules 522 serially-connected together while FIGS. 59–61 illustrate the component parts of one of the distribution modules 522. As discussed hereinafter, these component parts form the connector units 532 and 533 and the cable 531 of the main distribution module 522.

Generally, each main distribution module 522 includes a plurality and preferably eight identical cable assemblies 585 (FIG. 59) which each define at least one telecommunications link such as for voice and/or data. FIG. 59 illustrates the cable assemblies 585 exploded apart. Each cable assembly 585 is formed from a length of flexible ribbon cable or other suitable cable layer 586 and a pair of cassettes or cartridges 587 attached to the opposite ends thereof which each include a recess 545. As discussed above, the recess 545 defines one-half of an access port 554 for accessing the link. The cable layers 586 are laid one on top of the other in a multi-layer stack although each cable assembly 585 is axially offset relative to the adjacent cable assembly 585 as seen in FIG. 59 to allow the cassettes 587 at one end to be laid axially one next to the other in a single row. The cassettes 587 at the opposite end also are laid in a row. Each row of cassettes 587 is enclosed by a plastic hollow housing 541 as can be seen in FIGS. 60 and 61. The housing 541 and the cassettes 587 at one cable end when assembled together form the elongate connector unit 532 or 533 which can be connected to another serially adjacent distribution module 522. Thus, as will be described in more detail hereinafter, each main distribution module 522 is formed of a minimum number of common modular parts, namely, eight identical cable assemblies 585 and two housings 541, that can be readily assembled together.

Despite the specific structural differences between the distribution modules 522 and 122, the distribution module 522 functions the same as the distribution modules 122 since the cassettes 587 of one distribution module 522 define a longitudinal row of access ports 554 when interconnected to a serially adjacent distribution module 522. Further, the distribution module 522 can be readily adapted for use with any of the tap-off or in-feed modules discussed above. In view thereof, the following disclosure will only briefly describe the functional operation of the distribution modules 522 and the tap-off and in-feed modules since the more detailed disclosure above is equally applicable hereto.

As generally seen in FIGS. 59–61, each main distribution module 522 is formed from a pair of the hollow housings 541 and eight identical cable assemblies 585 which are assembled together to define the connector units 532 and 533 and the cable 531. To form the connector units 532 and 533, each cassette 587 is slid axially into an open end of the housing 541 as seen in FIGS. 60 and 61. Accordingly, the cassettes 587 at one end of the cable assemblies 585 are slid one after the other into one hollow housing 541 to define the connector unit 532, while the cassettes 587 at the opposite end of the cable assemblies 585 are also inserted in a row into the other housing 541 to define the other connector unit 533. The individual layers of cable 586 extending between each pair of cassettes 587 thereby lay one atop the other to define the multi-layer cable 531.

Since each cable assembly 585 typically carries at least one but less than all of the links therethrough, the cable assemblies 585 when assembled together thereby define the total number of links which can be transmitted through the main distribution module 522. Thus, while eight cable assemblies 585 are preferably provided which each carry voice and/or data signals therethrough, the number of cable assemblies 585 can be varied to vary the capacity of the main distribution module 522. For example, to increase capacity, the length of the housings 541 can be increased to accommodate more than eight cassettes 587 therein.

More particularly with respect to the specific construction of the distribution modules 522, the housing 541 (FIGS. 60 and 61) has a hollow interior which opens both axially through one end to receive the cartridges 587 into the housing, as well as along one horizontal side thereof to permit a portion of the cartridges 587 to project therethrough for engagement with tap-off and in-feed modules.

To slidably receive the cartridges 587 therein, the opposing side walls 544 of the housing 541 include inward opening longitudinal channels 588 along the length of the housing 541. These channels 588 also open axially at one end to slidably receive and secure the cartridges 587 in the housing 541.

More particularly, the channels 588 open axially from the open end of the housing 541 to receive side edges of the cartridges 587. Preferably the opposite side edges of the cartridges 587 include outwardly projecting flanges 589 which are adapted to slide into the respective channels 588. The flanges 589 each have a generally trapezoidal profile so as to securely engage the channels 588 which have a similar trapezoidal cross sectional shape as seen in FIG. 61.

The housing 541 is long enough to receive at least eight of the cartridges 587 one after the other in a longitudinal row. The length of the housing 541 can also be lengthened to accommodate additional cartridges 587 therein and thereby increase the number of links being carried by the main distribution module 522. Further, a lesser number of cable assemblies could be provided to reduce the number of links.

The second housing 541 at the opposite end of the cables 586 is formed identical to the above-described first housing 541 although it is inverted 180° during assembly so that the open horizontal side of the hollow interior opens upwardly. Since the cable assemblies 585 are axially offset during assembly as seen in FIG. 59, the cartridges 587 at the end are in the same order relative to the respective cartridges 587 at the opposite end when inserted into the second housing 541. In accord therewith, the leftmost cassette 587 in the left connector unit 533 is electrically connected to the leftmost cassette 587 in the right connector unit 532.

Since the bottom horizontal side of the housing 541 is open, the cartridges project therethrough a small limited distance so that opposite open ends of the recesses 545 are accessible sidewardly from the opposite sides of the housing 541.

The housing 541 also increases in thickness along the longitudinal length thereof as seen in FIG. 60. This increasing thickness serves to accommodate the increasing number of layers of cable 586 which extend out of the open end of the housing 541 when all of the cartridges 587 are inserted therein.

More particularly with respect to the cartridges 587 (FIGS. 60 and 61), each cartridge 587 defines a recess 545 on one face which contains a plurality and preferably sixteen resiliently-flexible electrical contacts or terminals 546 arranged in parallel. The contacts 546 are connected to the individual conductors of the corresponding ribbon cable 586 and are accessible from the exterior of the housing 541 for engagement by a tap-off or in-feed module as discussed above. Thus, when one connector unit 532 is engaged with an opposing connector unit 533 to form a connector assembly 538, the recess 545 of each cartridge 587 effectively cooperates with a corresponding recess 545 of an opposing cartridge 587 to define one of the access ports 554. While the recesses 545 are illustrated with a generally rectangular shape which is enclosed on three sides, these recesses also may be formed with keyed shapes similar to FIGS. 26–31 to accommodate the keyed tap-off or in-feed modules 123 or 124.

Figure 58:
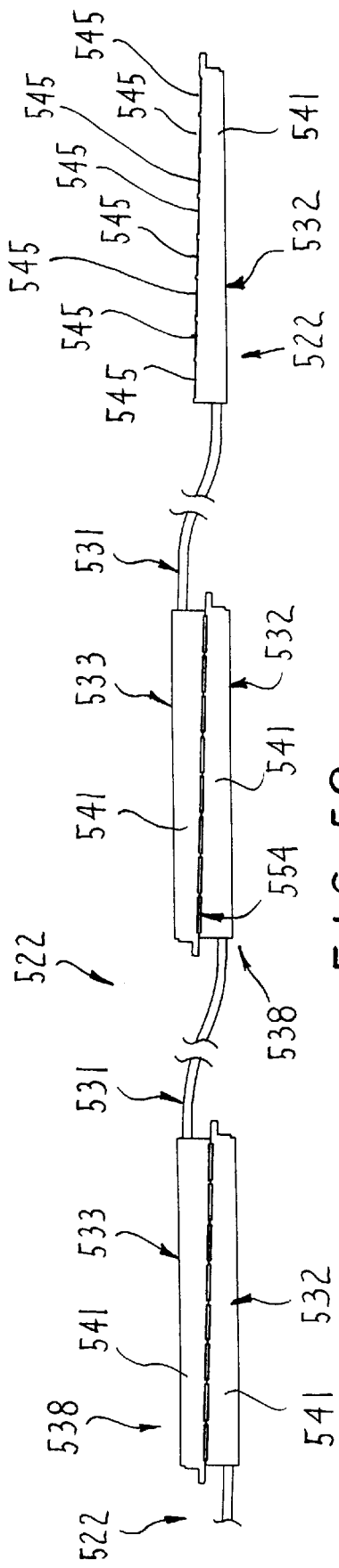
FIG. 58 is a side elevational view illustrating a further embodiment of the telecommunications cabling arrangement.
Figure 59:
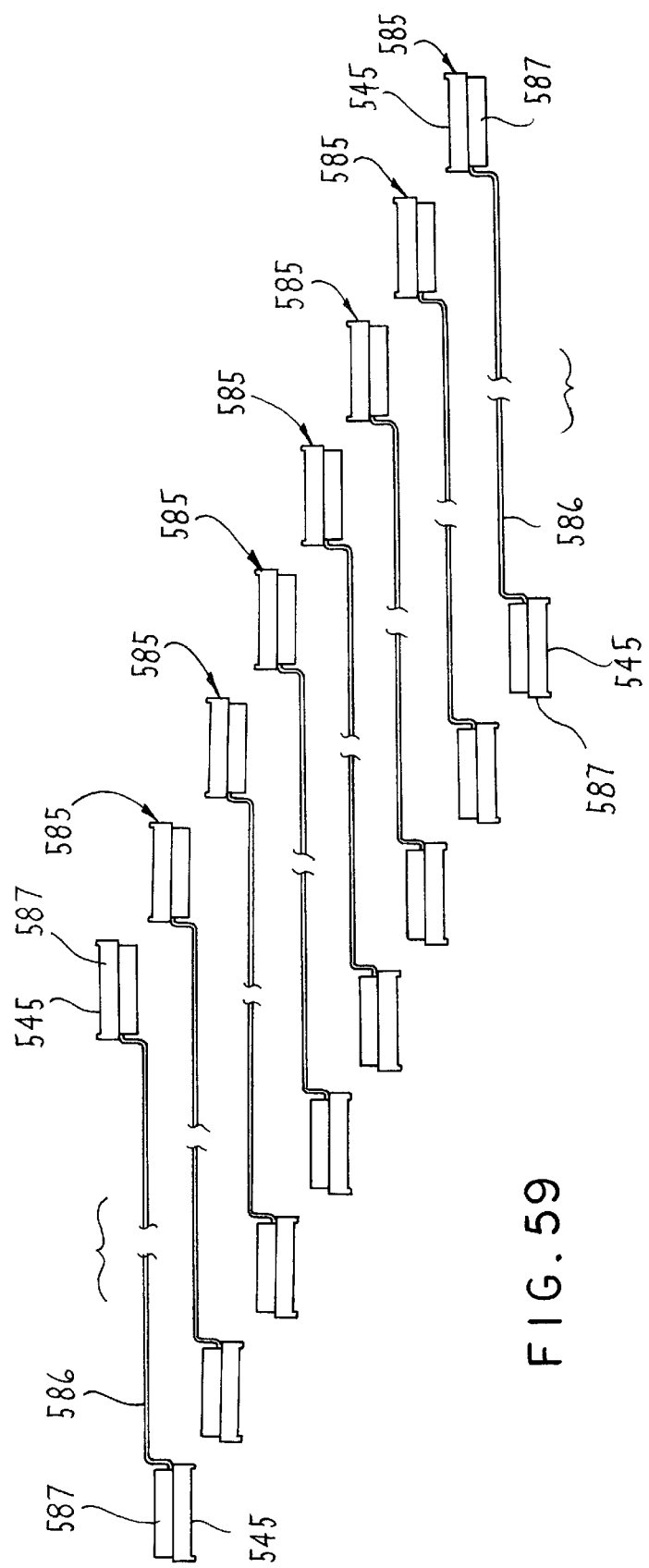
FIG. 59 is an exploded side elevational view illustrating a plurality of cable assemblies which form one of the main distribution modules of the system of FIG. 58.

While the cartridges 587 are illustrated diagrammatically in FIGS. 58, 59 and 61 as solid blocks, each cartridge 587 is a multi-component assembly formed from a base part 590 (FIGS. 62–64) which defines the recess 545, an intermediate part 591 and a top circuit board 592 which all are stacked one atop the other. Sixteen of the electrical contacts 546 also are provided in the recess 545 which are resiliently flexible and have an L-shape defined by a horizontal leg 546a and a vertical leg 546b. When these components are joined together, an electrical circuit is completed between the contacts 546 located in the recess 545 and a corresponding cable layer 586 of the cable 531.

More particularly, the base part 590 is a generally rectangular block of insulative material such as plastic which is formed with horizontal edge flange sections 590a along the opposite side edges thereof. The flange sections 590a have a generally trapezoidal shape as seen in FIG. 63 so as to permit sliding into the channels 588 of the housing 541.

To support the resilient contacts 546, each edge flange 590a includes eight vertical channels 590b which are arranged in parallel and are open on an outer side to permit the vertical legs 546a of the contacts 546 to pass vertically through the base part 590. The contacts 546 are arranged in alternating relation such that half of the contacts 546 are supported by the channels 590b in one flange section 590a and the other half are supported by the opposite flange 590b. Further, the recess 545 includes a plurality and preferably sixteen parallel grooves 590c (FIG. 64) on the bottom surface thereof which support the contacts 546 horizontally. More particularly, the horizontal legs 546a of the contacts 546 seat individually within the grooves 590c and are positioned for contact with tap-off or in-feed modules, while the vertical legs 546b extend through the vertical channels 590b so as to project upwardly therefrom.

The base part 590 also includes a plurality and preferably sixteen parallel grooves 590d on the top surface thereof which extend axially and are oriented perpendicular to the bottom grooves 590c. The top grooves 590d receive the individual wires 586a of the cable layer 586 therein. Each groove 590d also includes a vertical slot or channel 590e which opens upwardly therefrom for engaging the intermediate block 591 as described in more detail hereinafter. The slots 590e are staggered diagonally across the base part 590.

Once the individual wires 586a are seated in the top grooves 590d and the conductors 546 are seated in the side channels 590b, the intermediate block 591 is pressed on top of the base part 590. The intermediate block 591 is formed as a substantially rectangular molded block preferably formed of a plastic material. The block 591 has a staggered diagonal row of connector clips 591a embedded therein which are received with the corresponding diagonal row of slots 590e of the base part 590.

Figure 69:
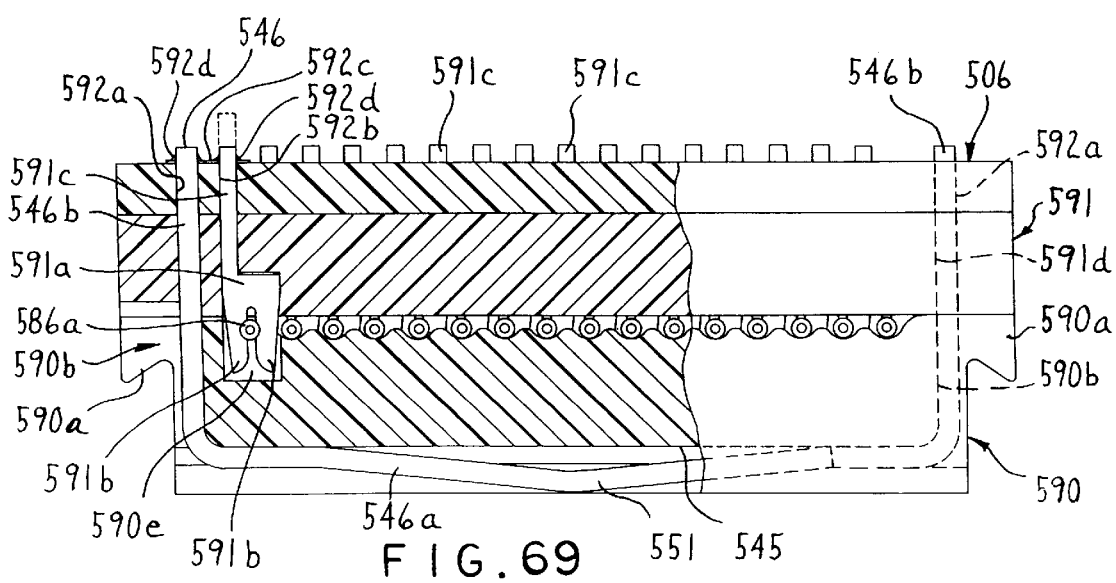
FIG. 69 is a front elevational view of the cartridge of FIG. 68 in partial cross-section.

More particularly, each of the clips 591a includes a pair of spaced apart insulation displacing prongs 591b (FIGS. 65 and 69) which project from the bottom surface of the block 591 and are adapted to be inserted into the corresponding slot 590e of the base part 590. When the intermediate block 591 is seated on the base part 590, the wires 586a are sandwiched therebetween in the grooves 590d. At the same time, the prongs 591b slice through the insulation of the wires 586a so as to make an electrical connection with the electrical conductor or core thereof as seen in FIG. 69.

The clips 591a also include a vertical leg or clip end 591c formed integral with the prongs 591b which projects upwardly from the upper surface of the intermediate block 591. The clips 591a are adapted to be connected to the circuit board 592 as described in more detail hereinafter.

The intermediate block 591 also includes eight vertical channels 591d along each of the opposite side edges thereof. The channels 591d are aligned with the vertical channels 590b on the base part 590 so as to permit the vertical legs 546b of the connectors 546 to project vertically therethrough.

Figure 68:
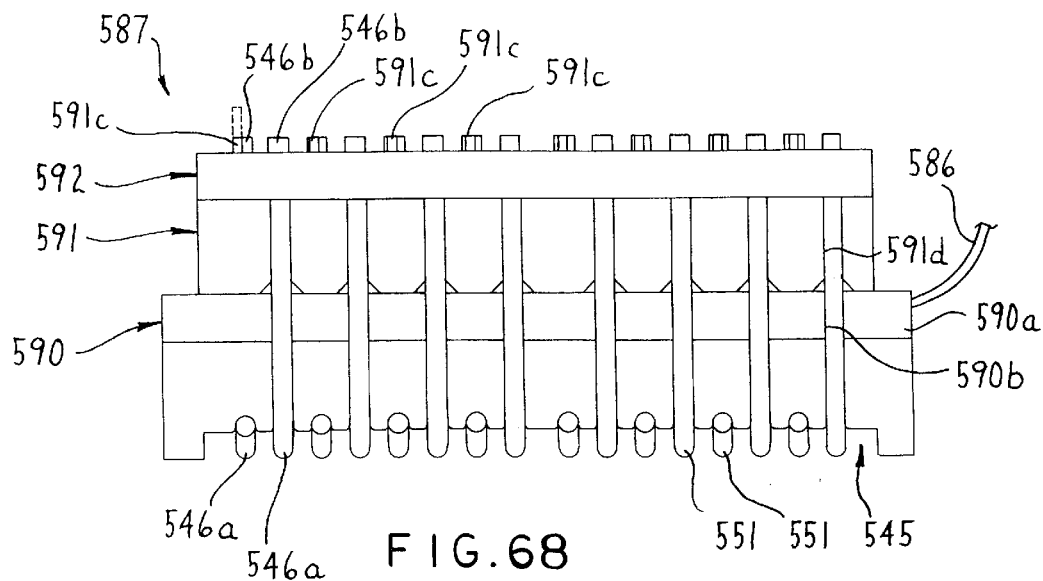
FIG. 68 is a side elevational view illustrating the cartridge components assembled together.

With respect to the circuit board 592, the circuit board 592 completes the electrical circuit between the conductors 546 and the cable wires 586a and in particular, between the vertical contact leg 546b and the vertical clip ends 591c. To connect to the contacts 546, the circuit board 592 includes a plurality of vertical side bores 592a which are longitudinally spaced apart in rows along the opposite side edges thereof. The side bores 592a are vertically aligned with the vertical channels 590b and 591d so as to receive the upper ends of the contacts 546 therethrough as seen in FIGS. 68 and 69.

The circuit board 592 also includes a staggered or diagonal row of central bores 592b which are vertically aligned with the upper clip ends 591c of the clips 591a such that the clip ends 591c project upwardly from the intermediate block 591 and extend through the circuit board 592.

To complete a circuit between the contacts 546 and the clip ends 591c, the top surface of the circuit board 592 includes a plurality of conductive traces 592c which extend laterally or sidewardly from each side bore 592a to a corresponding one of the central bores 592b. Each clip end 591c and vertical contact leg 546b is then soldered in place by rings of solder 592d so as to be electrically connected to the opposite ends of the traces 592c. As a result, the traces 592c electrically connect the vertical legs 546b of the contacts 546 with the upper ends 591c of the clips 591a which themselves are connected to the wires 586a.

Figure 70:
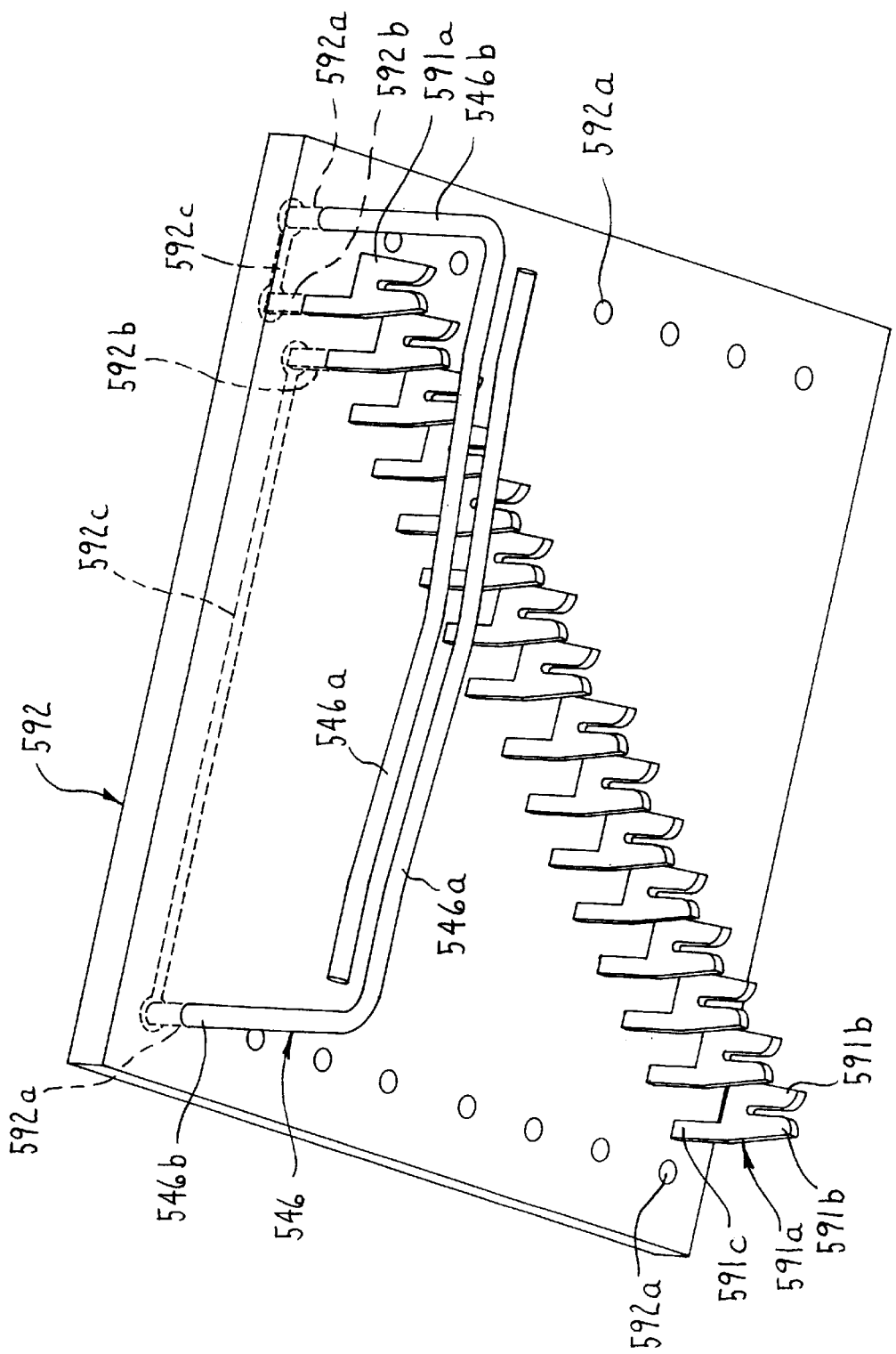
FIG. 70 is a partial bottom perspective view illustrating the components of the electrical circuit formed in the cartridge for connecting each electrical contact to individual wires of a flat cable section.

As diagrammatically illustrated in FIG. 70 wherein the plastic portions of the base part 590 and intermediate part 591 are removed for clarity, the electrical connection between the contacts 546 and the wires 586a is completed through the cassettes 587. More particularly, each wire 586a (not illustrated) is connected to a corresponding one of the clips 591a by the prongs 591b which are adapted to slice through the wire insulation. These clips 591a are also electrically connected to the contacts 546 through the circuit board traces 592c extending therebetween. Thus, an electrical circuit is completed which extends from the wires 586a, through the clips 591a, across the traces 592c and thereafter, to the contacts 546. Once all of the clips 591a have been connected to each wire 586a respectively, the electrical contacts 546 provide access to at least one telecommunications link which is carried by the cable 531.

As a result, the connector units 532 and 533 function substantially the same as the connector units 132 and 133 previously described herein. Once the connector unit 532 of one distribution module 522 and an adjacent connector unit 533 of a serially-adjacent distribution module 522 are connected together, the contacts 546 are engaged with opposing contacts 546 to complete a connection through two mated connector units 532 and 533. Telecommunication links can be either tapped-off or fed into the mated connector units 532 and 533 by an appropriate in-feed or tap-off module which is insertable into one of the access ports 545. Any of the above-described tap-off and in-feed modules can be used with the connector units 532 and 533 discussed above although it may be necessary to modify the connector units 532 and 533 so as to have a keyed or trapezoidal shape for some of these modules.

Figure 71:
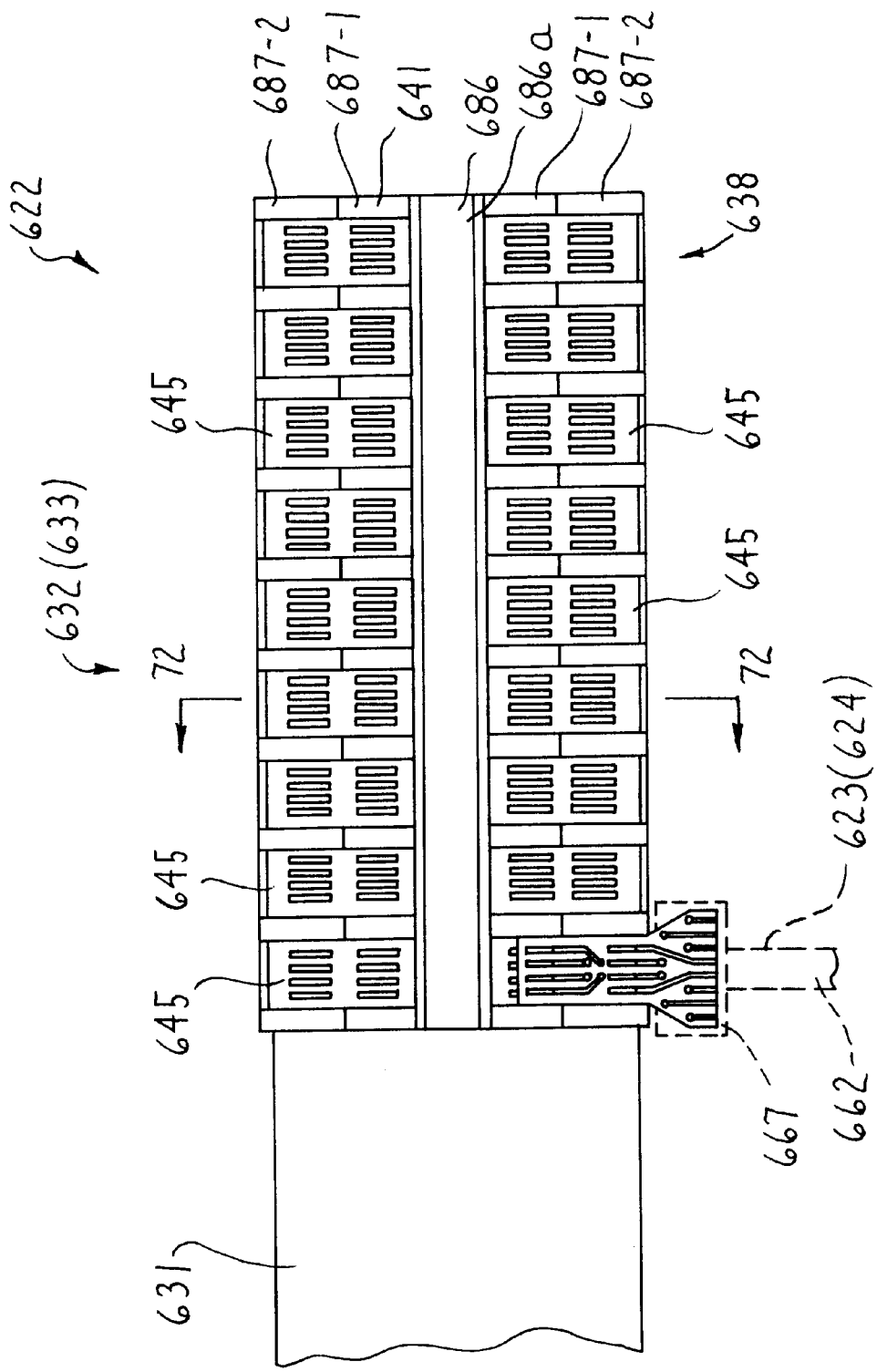
FIG. 71 is a partial top plan view of a further embodiment for the connector units.

Referring to FIGS. 71–78, a still further main distribution module 622 is disclosed which provides another alternative to the main distribution modules 122 discussed above. FIG. 71 diagrammatically illustrates the invention while FIGS. 72–78 illustrate the invention in more detail. In particular, FIGS. 71–78 illustrate modular connector blocks or units 632 and 633 as well as an alternative in-feed or tap-off module 623 or 624 respectively. While differing in the specific construction thereof, the main distribution module 622 is used in the same manner as the previous main distribution modules discussed above. In particular, all of these main distribution modules carry a plurality of telecommunication links therethrough and provide a plurality of access ports into which in-feed or tap-off modules are inserted for selective routing of the telecommunication links. This design, however, has the added advantage of carrying the individual wires of a cable into the connector units 632 or 633 for use as electrical contacts as disclosed in more detail hereinafter.

Generally, the main distribution module 622 uses separate biasing means 685 (FIG. 72) such as a spring to urge the opposing contacts 646 of two mated connector units 622 and 623 into engagement while also providing two parallel rows of contacts 646 in each access port recess 645 instead of a single row as in the previous main distribution modules. Also, each connector unit 622 or 623 is formed from a selected number of separate or modular connector sections which are joined such as by being laminated together to form a single connector unit 632 or 633.

In the main distribution module 622 (FIGS. 71 and 72), a plastic housing 641 is provided which supports the electrical components therein. While the main distribution module 622 can be formed from the housing 641 illustrated in FIGS. 71 and 72, the module 622 also may be formed of an alternative housing 641' (FIGS. 73–74) as will be described in more detail hereinafter. While the housings 641 and 641' are formed somewhat differently with respect to each other, the electrical components therein and in particular, the electrical contacts 646 are substantially identical. Further, the biasing means 685 for supporting the electrical contacts 646 are substantially the same in housings 641 and 641'. Thus, while the following discussion describes the housings 641 and 641' separately, the remaining disclosure with respect to the contacts 646 and the biasing means 685 is applicable to both variations of the housing 641 and 641'.

Figure 72:
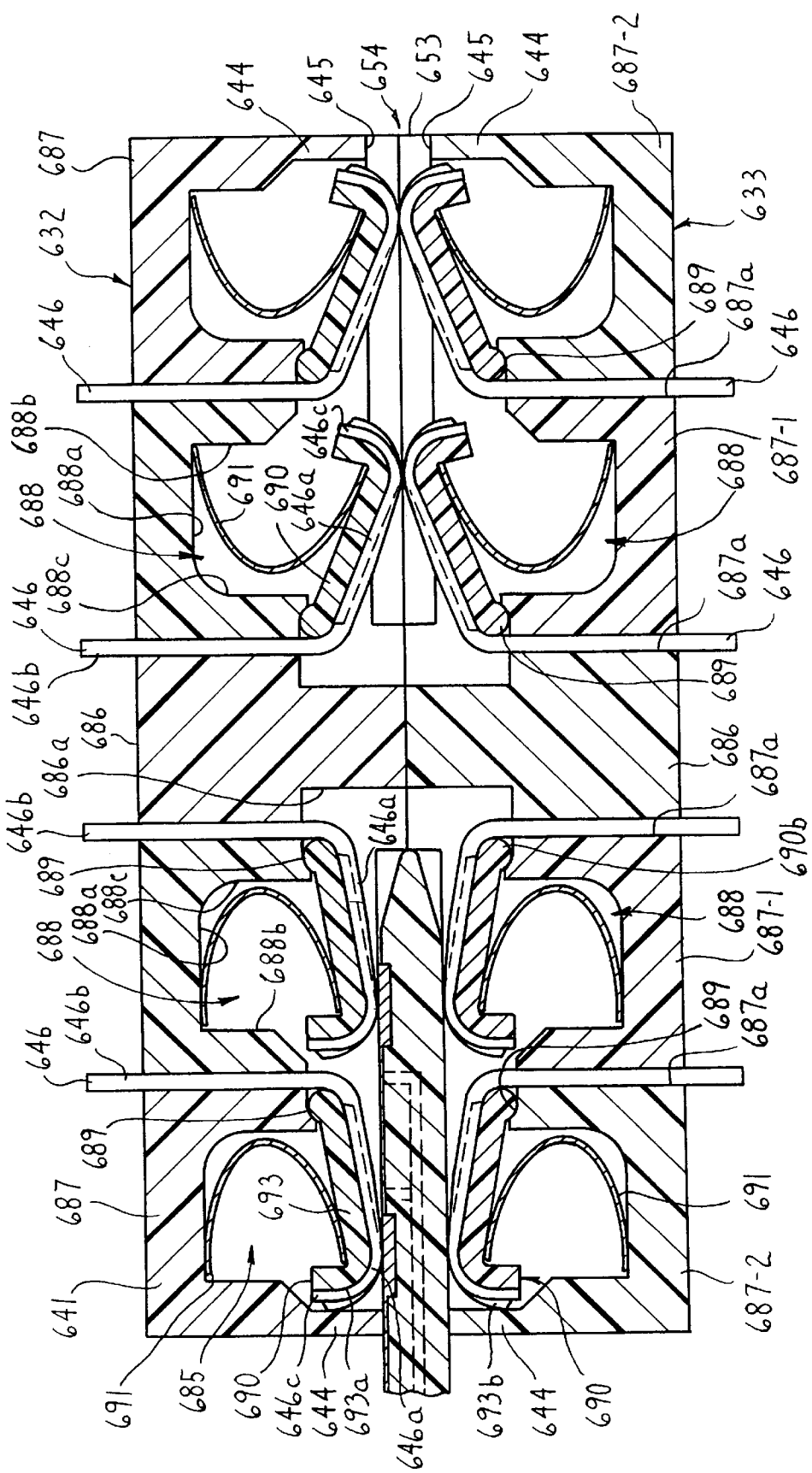
FIG. 72 is a side cross-sectional view of a connector assembly as viewed in the direction of arrows 72—72 of FIG. 71.

With respect to the housing 641 illustrated in FIGS. 71 and 72, the housing 641 is formed of an insulative material such as plastic, and includes a central section or module 686 and elongate rectangular inner and outer side sections or modules 687-1 and 687-2 respectively which define the opposite sides of the connector unit 632 (633). Preferably, the central section 686 and side sections 687-1 and 687-2 are joined together such as by laminating or other suitable adhesives to define the housing 641. When joined together, the housing 641 defines a plurality and in the illustrated embodiment nine recesses 645 along each opposite side thereof. The recesses 645 of each connector unit 632 or 633 are longitudinally spaced apart and communicate with opposing recesses 645 when a connector unit 632 is joined to a connector unit 633. The recesses 645 thereby define nine access ports on each opposite side of the connector assembly 638 similar to the main distribution module 22 (FIGS. 6–18). These access ports 654 permit insertion of a tap-off module 623 or an in-feed module 624. Further, an in-feed module similar to in-feed module 24 (FIG. 19) could be used. The connector unit 632 and 633 when joined together function substantially the same as the connector units 32 and 33 illustrated herein in FIGS. 6–10.

In this embodiment, eight electrical contacts are provided to supply at least one telecommunications link to a workstation wherein the main distribution module 622 includes two parallel rows of four electrical contacts 646 in each recess 645. In particular, each recess 645 includes an inner row of four electrical contacts 646 and an outer row of four electrical contacts 646 which rows are arranged parallel to the open end of the recess 645. The use of two parallel rows thereby reduces the overall length of the main distribution module 622 as compared to the prior distribution modules discussed herein which use a single row of contacts.

The inner row of contacts 646 is provided in the inner side section or module 687-1. To define the outer row of electrical contacts, each housing 641 includes a pair of the outer connector sections 687-2 which preferably are fixedly joined to the outer side edges of the inner section 687-1. While the housing 641 preferably is formed of five separate components, namely the central section or module 686 and the inner and outer sections or modules 687-1 and 687-2, these components may also be formed as a single integral unit typically in a molding process.

More particularly with respect to FIGS. 71 and 72, the central section 686 is defined with a central wall 686a extending axially along the longitudinal length thereof. On the opposite sides thereof, the inner side sections 687-1 define inner sections of the recesses 645 on the opposite sides of the central wall 686a. Also, each inner section 687-1 is molded with a row of inner spring pockets 688 (FIG. 72) on each side of the central wall 686a which open vertically into the respective inner section of the recesses 645. Each spring pocket 688 is defined by a bottom surface 688a and opposite outer and inner side walls 688b and 688c.

In the region of each spring pocket 688, the inner section 687-1 also includes a plurality of L-shaped electrical contacts 646 which have a vertical leg 646b extending vertically therethrough and a horizontal leg 646a extending at a right angle generally horizontally towards an outer side of the inner section 687-1. These contacts 646 preferably are formed by the ends of the individual wires of the cable of the main distribution module. These ends of the individual wires of the cable seat within grooves 687a and are secured in place once the modules 686, 687-1 and 687-2 are joined together. By using the ends of the individual wires of the cable, a further connection is not needed between the cable and a resilient contact which might otherwise be necessary if the contact was formed separate therefrom. In accord therewith, the modules 686, 687-1 and 687-2 are formed separately so that the conductors of the wires of the cable can be laid therein.

The free end of the horizontal contact leg 646a has a curved end 646c which generally defines a J-shape for the contacts 646 and serves as a camming surface for insertion of a tap-off or in-feed module 623 or 624 in the access port 654. Preferably, four of these electrical contacts 646 are disposed in the region of each spring pocket 688 for contact with the tap-off or in-feed modules.

The inner section 687-1 also includes arcuate ridges or pivot surfaces 689 which extend longitudinally along the length of the inner section 687-1 and are disposed inwardly of the spring pockets 688 for pivotably supporting the biasing means 685 for the contacts 646. In particular, the biasing means 685 comprise a plastic contact wire support strip 690 which pivots on the bearing surface 689, and a fingered leaf spring strip 691 which seats within the spring pocket 688 as will be discussed in more detail hereinafter. Since the actual conductors of the wire are used as the contacts 646, the contact wire support strip 690 and spring strip 691 serve to both support the contacts 646 and bias the contacts 646 into contact with opposing contacts 646. The contact wire support strip 690 preferably is formed of an insulative material so as to prevent an undesirable electrical connection between the spring strip 691 and the contacts 646. Alternatively, the spring strip 691 could also be formed of an insulative material such as plastic. Thus, a double row of electrical contacts 646 is disposed on the opposite sides of the central wall 686a in each recess 645 defined therein.

Each of the outer connector sections 687-1 and 687-2 has outer sections of the recesses 645 which align with the corresponding inner recess sections of the inner section 687-1 to define each inwardly extending recess 645. These connector sections 687-2 also include outer spring pockets or cavities 688 which are substantially the same as the inner spring pockets 688 in the inner section 687-1. The outer recess sections also are formed with four electrical contacts 646 extending therethrough in the region of each spring pocket 688 so as to define the outer row of four electrical contacts 646.

Each outer connector section 687-2 also is formed with an arcuate bearing surface 689 for pivotally supporting a contact wire support strip 690. Further, each connector section 687-2 also includes an outer side wall 644 which defines the rectangular outer opening of the access port 654.

Once the central section 686 and the outer sections 687 are connected together, the nine recesses 645 are defined on each side of the central wall 686a. The recesses 645 open outwardly and vertically so as to be oriented in communication with the corresponding recesses 645 of the connector block 633 mated thereto. These aligned recesses 645 thereby define the access ports 654.

With respect to the second alternative arrangement for the housing, this housing 641' is formed from identical molded connector sections or modules 692 which each define a row of recesses 645. Each recess 645 of the modules 692 includes biasing means therein and in particular, the spring strip 691 and the contact wire support strip 690. Each connector module 692 includes nine recesses 645 and four electrical contacts 646 in each recess 645, and multiple connector modules 692 can be joined together to define an individual connector unit 632 or 633.

Figure 74:
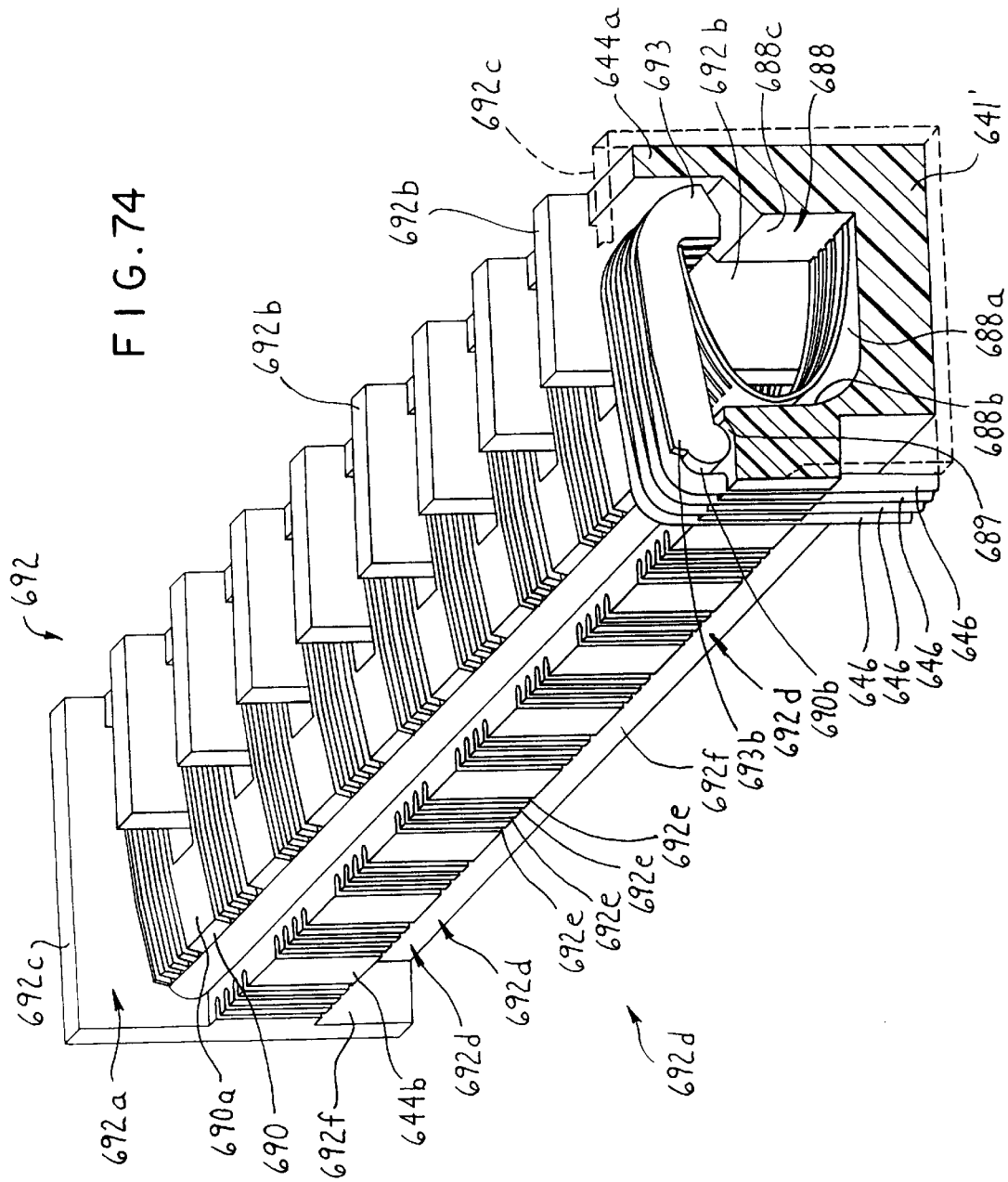
FIG. 74 is a perspective view partially removed of one connector module of the connector unit of FIG. 73 as viewed from the front and below.

In particular, as can be seen in FIG. 74, two connector modules 692 can be fixedly joined together along adjacent side edges thereof to define nine recesses 645 which extend sidewardly through the entire connector module 692. Each recess 645 thereby includes two sidewardly spaced apart but parallel rows of electrical contacts 646 similar to the arrangement of contacts diagrammatically seen in FIG. 71. The connector unit illustrated in FIG. 74 thereby permits access to the electrical contacts 646 from either open end of the recesses 645 similar to the connector units 132 and 133. As discussed hereinafter, both housings 641 and 641' include substantially the same arrangement of the biasing means 685 therein.

More particularly, each connector module 686, 687-1, 687-2 or 692 is formed of plastic and is molded such that the recesses 645 and spring pockets 688 are spaced apart longitudinally along a substantial length thereof. More particularly with respect to the embodiment of FIGS. 73–74, a portion of the spring pockets 688 nearest the side wall 644 are separated from each adjacent spring pocket by divider walls 692b. The innermost end portions of the spring pockets 688, however, open axially so as to be in communication with the adjacent spring pockets 688. These spring pockets 688 thereby define a continuous open channel along the length of the connector section 692. Each connector module 692, however, includes end walls 692c which define the opposite ends of the channel. Besides the spring pockets 688, the connector module 692 also is divided into the nine separate recesses 645 which are separated one from the other by the interior divider walls 692c. The ends of the recesses 645 open outwardly through a first side wall 644a.

To support the vertical legs of the electrical contacts 646 in the connector module 692, a second side wall 644b opposite the first side wall 644a includes nine groups of connector channels 692d formed vertically therein. The groups of channels 692d support the vertical legs 646b of the electrical contacts 646. In particular, each group 692d includes four parallel channels 692e which extend vertically along this side wall 644b and receive the vertical leg 646b therein.

The connector section 692 also includes a notched channel 692f along one corner edge thereof to provide a space for the connection of the electrical contacts 646 to the electrical cable 631. In particular, the vertical leg 646b of the electrical contact terminates in this notched recess 645. The notched recess 645 to permits the twists of each twisted pair of wires of the cable to be brought close to the recesses 645 or in other words, to the end of the wire while minimizing the length of the contacts 646 which are straight and untwisted. The notch also can be provided in the housing 641. Only four electrical contacts 646 are illustrated in FIG. 74 in the first recess 645 for illustrative purposes although it should be understood that each grouping of channels 692d receives four electrical contacts 646 therein for each of the recesses 645. The horizontal leg 646a of each electrical contact 646 extends sidewardly from the vertical leg 646b into the recess 645 and then curves back vertically toward the spring pocket 688 so as to generally define a J-shape for the contacts.

Figure 75:
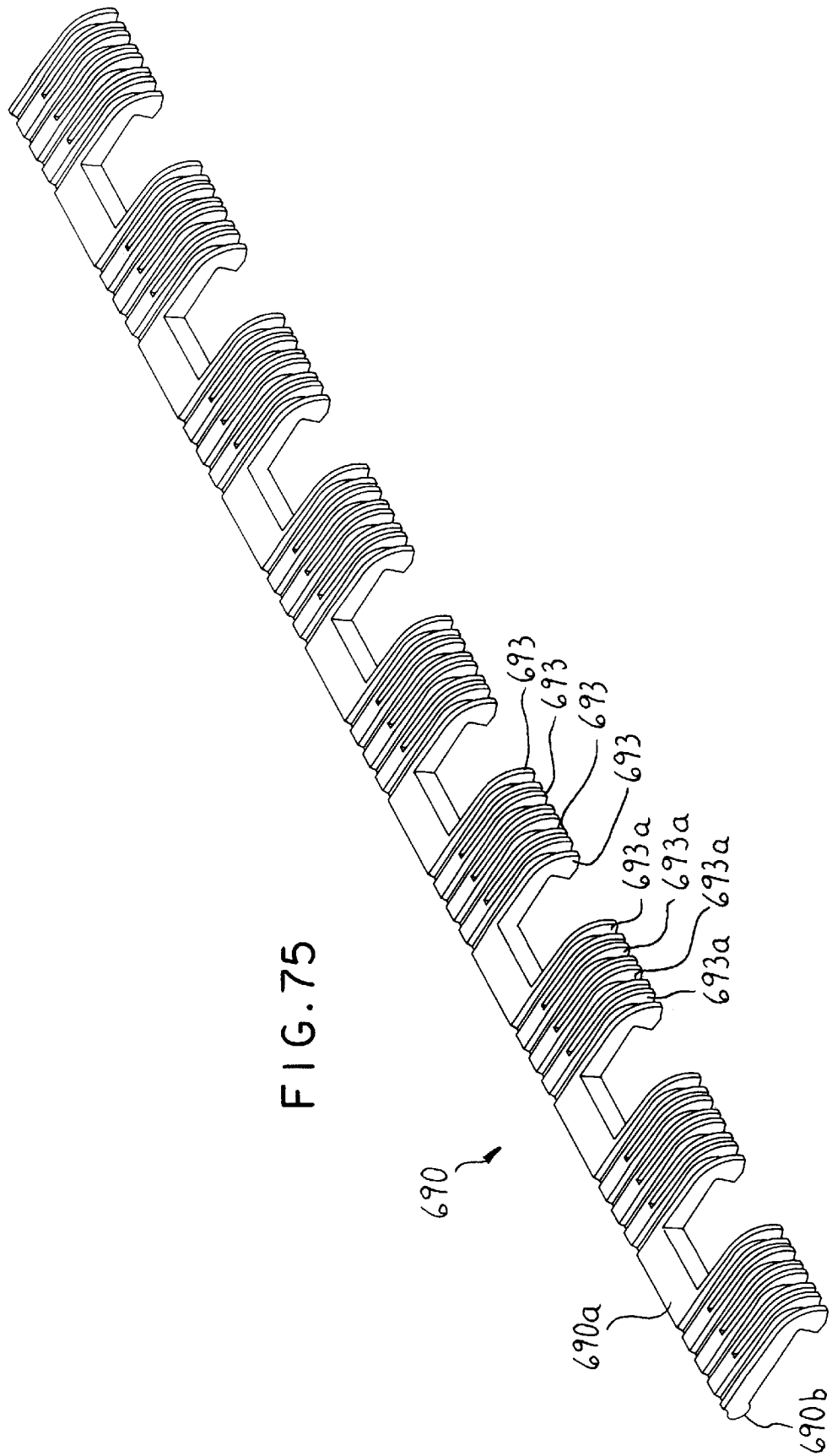
FIG. 75 is a front perspective view of a contact wire support strip as used in the connector units of FIGS. 71 and 74.
Figure 76:
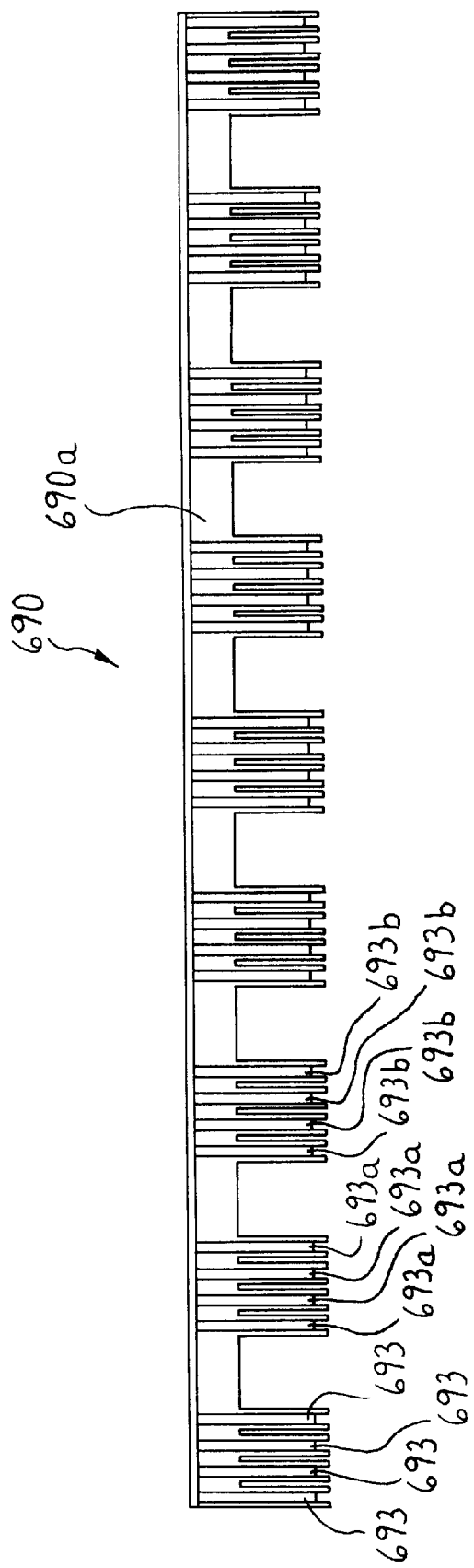
FIG. 76 is a top plan view of the contact wire support strip of FIG. 75.
Figure 77:
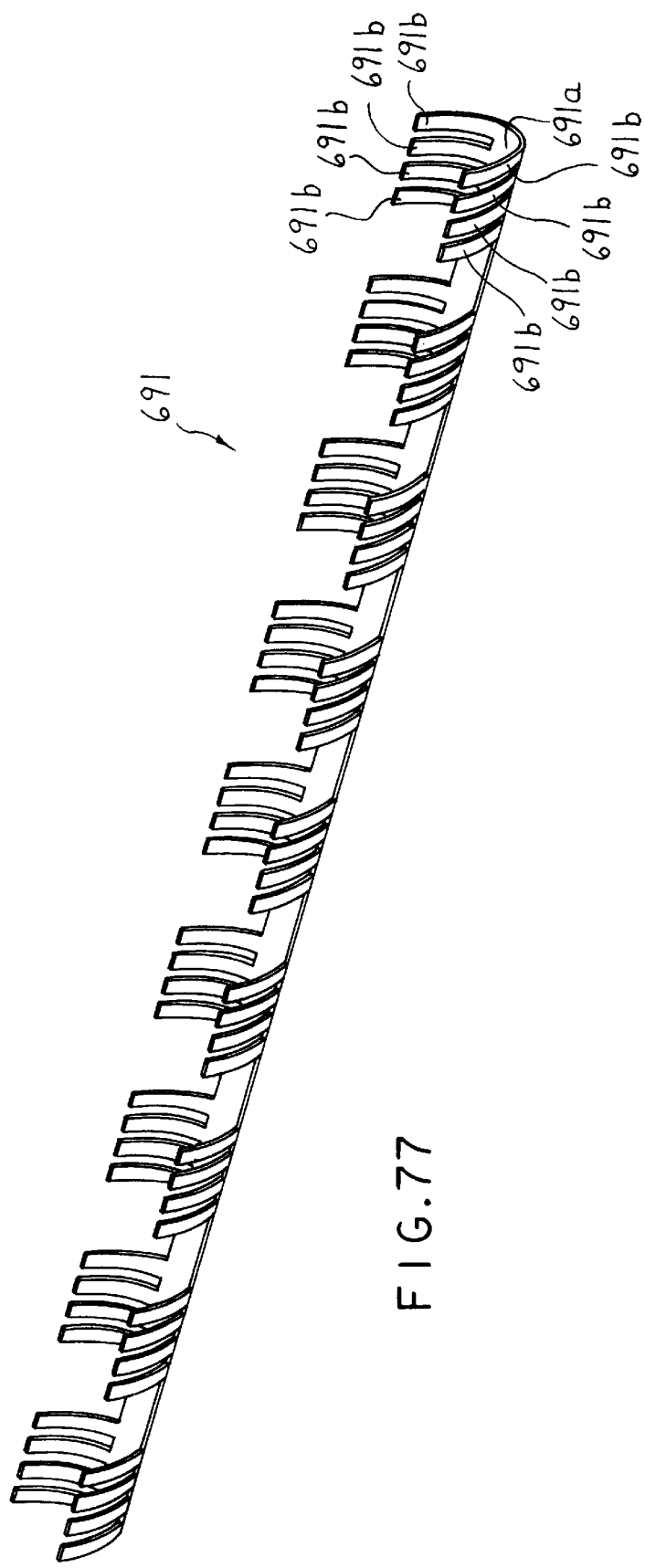
FIG. 77 is a bottom perspective view of a spring strip as used in the connector units of FIGS. 71 and 74.

To support the electrical contacts 646, the contact wire support strip 690 is pivotally supported on the bearing surface 689 in the connector section 692. As can be seen in FIGS. 75 and 76, the support strip 690 is formed as a one-piece plastic unit which includes an elongate main strip 690a extending along the entire length thereof. The main strip 690a has a semi-circular surface or bead 690b on one edge thereof which pivotally seats in the corresponding seat or bearing surface 689 formed in the connector sections 692 (and also 686 and 687). The support strip 690, thereby pivots on this semi-circular pivot surface 689 to permit pivoting of the support strip 690.

The support strip 690 also includes nine sets of four fingers 693 which correspond to the nine recesses 645. Each set of fingers 693 projects sidewardly from the main strip 690a and supports a group of four electrical contacts 646. These fingers 693 further serve as insulators to insulate the contacts 646 from the spring strip 690 and from one another.

In particular, each finger 690c generally has a J-shape corresponding to the J-shape of the contacts 646 so as to curve into the spring cavity 688. Each finger 693 includes a channel 693a on the side thereof which opens away from the spring cavity 688. Each channel 693a receives the horizontal leg 646a of the electrical contact 646 therein. The channel 693a is shallower than the thickness of the contacts 646 such that each electrical contact 646 projects above the upper edges of these channels 693a so as to permit contact with a corresponding electrical contact 646 disposed in a connector unit 633 mated thereto. Also, each channel 693a is defined by spaced apart insulative side walls 693b which maintain separation of the contacts 646. Thus, each electrical contact is independently supported by one of the fingers 693 although the fingers 693 in each recess 645 are grouped in a spaced apart but close relation one with respect to the other.

While the fingers are separated, each set of fingers 693 effectively move in unison upon the insertion of a tap-off or in-feed module while the adjacent group of fingers 693 in an adjacent recess 645 remain substantially stationary. In particular, the support strip 690 is formed of a plastic which is sufficiently flexible between each group of fingers 693 so as to permit one group of fingers 693 to flex or pivot on the arcuate support surface 689 while the adjacent group of fingers 693 continues to maintain the opposing contacts 646 in engagement. Further, while each group of fingers 693 generally move together, movement of the fingers 693 one with respect to the other also is permitted to accommodate variations in the thickness of the components.

Figure 73:
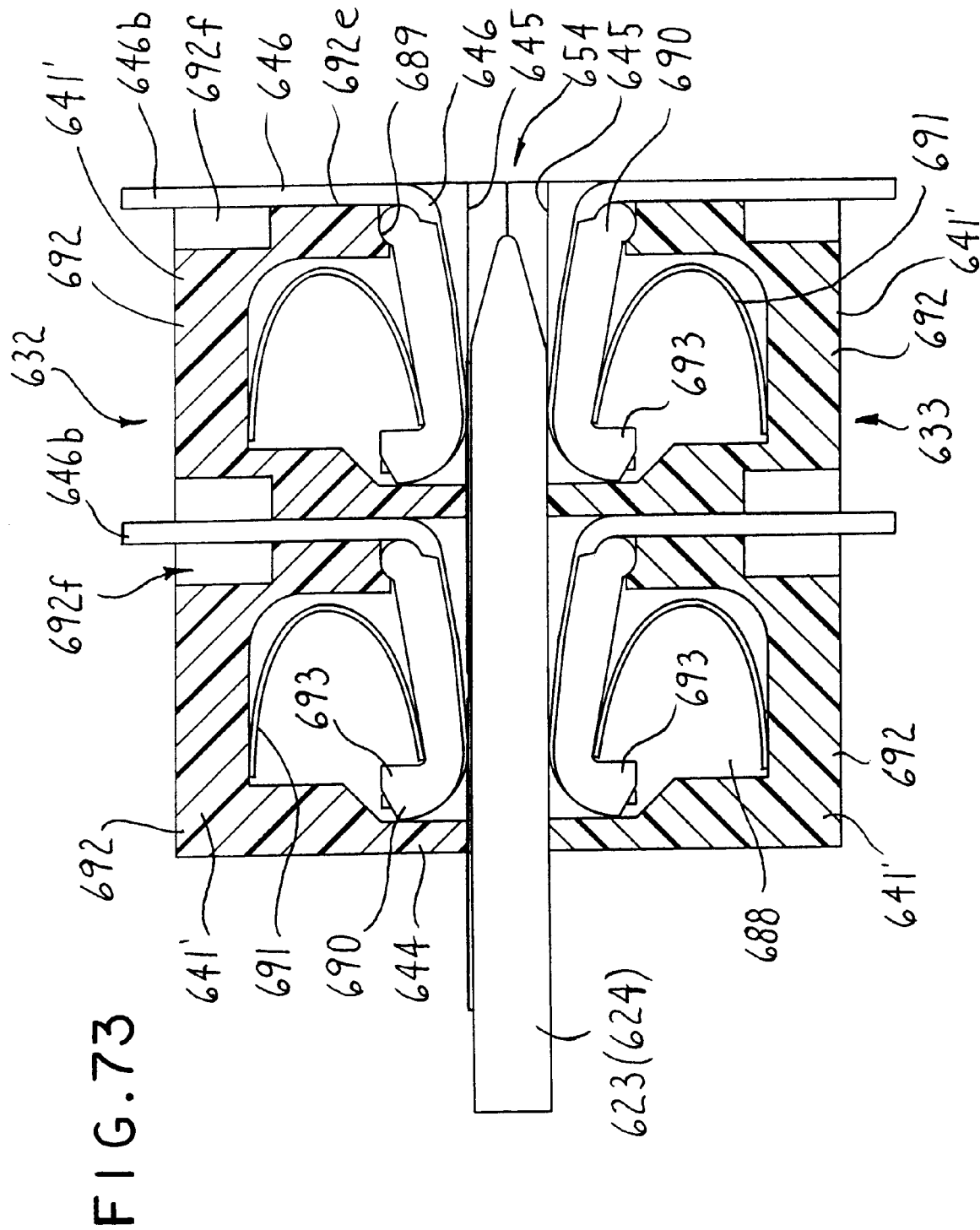
FIG. 73 is a side cross-sectional view of a further embodiment of the connector unit of FIG. 71.

To normally urge or bias the electrical contacts 646 into a contact or engagement position in contact with the opposing contacts 646 of the connector unit 633 (as generally illustrated in FIG. 72), the spring strip 691 is provided in the spring pockets 688 as seen in FIGS. 72–74. This spring strip 691 (FIG. 77) is generally U-shaped and is formed with a central spine 691a extending longitudinally therealong as well as groups of four spring fingers 691b which extend from the opposite sides of the central spine 691a. In particular, nine groups of spring fingers 691b are provided on each side of the spine section 691a wherein each group of spring fingers 691b on one side of the spine 691a is disposed directly opposite to a corresponding set or group of spring fingers 691b on the opposite side thereof.

As seen in FIGS. 72–74, the spring strip 691 is seated within the connector sections 686, 687 and 692 with each group of spring fingers 691b seated in a corresponding spring cavity 688. The spring fingers 691b on one side of the central spine 691a are seated against the interior bottom wall 688a thereof while the spring fingers 691b on the opposite side of the spine 691a individually contact and thereby bias the fingers 693 of the contact wire support strip 690. In particular, each finger 693 of the contact wire support strip 690 is acted upon by one of the spring fingers 691b so as to normally bias the electrical contacts 646 to the engagement position. Since each spring finger 691b is disposed directly opposite to a corresponding spring finger 691b on the opposite side of the spine, an equalized biasing force is provided by the pair of spring fingers 691b on the corresponding individual finger 693 of the contact wire support strip 690. Thus, each finger 693 is independently urged by a corresponding spring finger 691b of the spring strip 691 such that the electrical contacts effectively float in a cantilevered relation relative to the vertical legs 692b thereof.

As can be seen in FIG. 72, the spring strip 691 normally biases the electrical contacts 646 to the engagement position as illustrated on the right side of the connector units 632 and 633. The spring strip 691, however, permits the contact wire support strip 690 to pivot about the arcuate pivot surface 689 to the deflected disengaged position seen on the left half of the connector units 632 and 633 (FIG. 72) or as seen in FIG. 73 upon the insertion of a tap-off or in-feed module.

As a result, each electrical contact is mechanically supported by a pivoting plastic finger 693 and a corresponding U-shaped spring 691 which normally urges the electrical contact to the contact or engagement position while permitting the electrical contacts 646 to be separated to the disengagement position upon the insertion of a tap-off or in-feed module.

Figure 78:
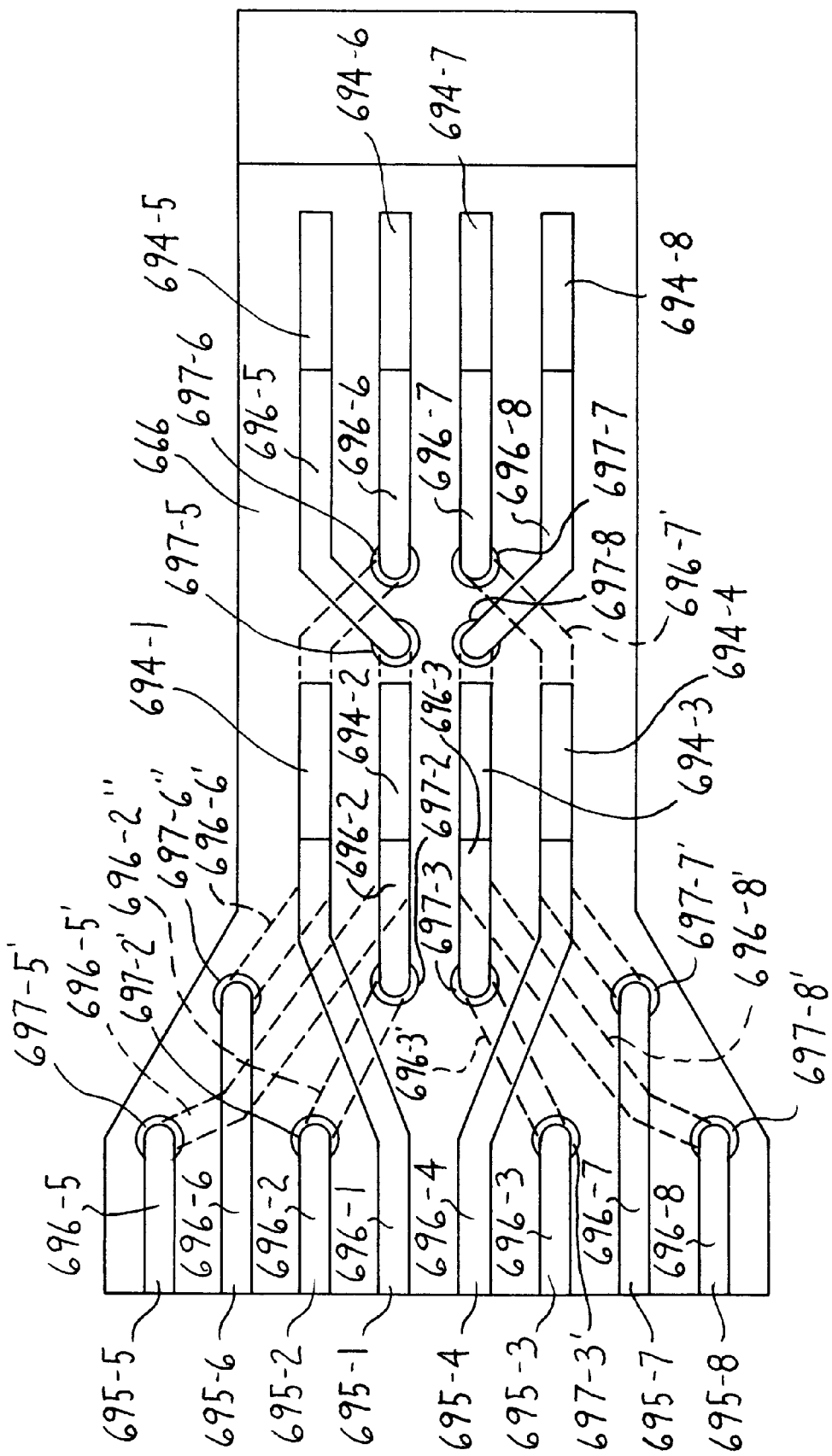
FIG. 78 is a top plan view of a insert portion of a tap-off or in-feed module as generally illustrated in FIGS. 71–73.

In view of the arrangement of the electrical contacts in two parallel rows in each recess 645, a further embodiment for an in-feed or tap-off module is illustrated in FIG. 78. In particular, the insert portion 666 of the tap-off or in-feed module 623 or 624 is illustrated. This insert portion includes two corresponding parallel rows of electrical contacts 694-1 to 694-8 on one surface thereof. These contacts 694-1 to 694-8 as illustrated are rectangular conductors seated in and projecting upwardly a small distance above the one surface. These electrical contacts 694-1 to 694-8 are electrically connected to contact end portions 695-1 to 695-8 along the outer edge of the insert portion 666. These contact end portions 695-1 to 695-8 are then electrically connected to a cable 662 which extends from the module either back to a wiring closest for an in-feed module or to a telecommunications jack or other suitable outlet for a tap-off module.

Preferably, the insert portion 666 is a double-sided computer circuit board with electrical traces 696-1 to 696-8 formed on the upper surface as well as additional intermediate electrical traces (identified with a prime (')) formed on the opposite side thereof although these additional traces are coated with an insulative coating or covered with an insulative layer laminated thereon. In particular, the forward-most row of contact portions 694-5 to 694-8 include electrical traces (696-4 to 696-8). respectively which extend rearwardly to the approximate mid-point of the insert portion 666. Since the outer second row of contact portions 694-1 to 694-4 is also located in this region, the electrical traces from the outer row of contact portions (694-1 to 694-4) are bypassed through vertical bores commonly referred to as "vias" (697-4 to 697-8) formed in the insert portion. The vias are plated or coated with conductive material to electrically connect the traces on the opposite sides of insert portion 666. These inner vertical bores (697-4 to 697-8) are connected to the traces (696-4 to 696-8) and extend through the thickness of the insert portion 666. The lower ends of the bores (697-4 to 697-8) then are connected to the further electrical traces (696-4' to 696-8') on the opposite side thereof which extend back towards the contact end portions (695-4 to 695-8). The traces (696-4' to 696-8') then are connected to the connector ends (695-4 to 695-8) by outer vertical vias or bores (697-4' to 697-8').

The contact portions 694-2 and 694-3 are connected to the contact ends 695-2 and 695-3 by a similar arrangement of traces (696-2, 696-2', 696-3 and 696-3') and bores (697-2, 697-2', 697-3 and 697-3'). The other contact portions 694-1 and 694-4 are connected directly to the contact ends 695-1 and 695-4 by traces 696-1 and 696-4.

The above-described arrangement of traces, vias and contact portions is provided so as to reduce the amount of untwisted sections of conductors in the insert portion 666 or in other words, to bring the twisted pairs of wires as close as possible to the contact portion 694-1 to 694-8. As can be seen, the routing of the electrical circuits from the contact end portion 695-1 to 695-8 to the electrical contact 694-1 to 694-8 incorporates twists therein in the insert portion 666 itself.

In particular, the contact end portions 695-1 to 695-8 are grouped in pairs which correspond to the twisted cable pairs that are being connected thereto. For example, the contact end portions 695-1 to 695-8 are grouped in pairs of end portions 695-5 and 695-6, 695-2 and 695-1, 695-4 and 695-3 and 695-7 and 695-8. The outer pairs of contact end portions, for example, 695-5 and 695-6 go through a 360° twist of the electrical circuits between these end portions 695-1 and 695-6 and the corresponding contacts 694-5 and 694-6. Similarly, a 360° twist effectively is provided in the electrical circuits extending between the end portion 695-7 and 695-8 and contacts 694-7 and 694-8. The nearest row of contacts 694-1 to 694-4, however, only have a 180° twist located between the contact portions 694-1 to 694-4 and the end portions 695-1 to 695-4. For example, the pair of end portions 695-2 and 695-1 are joined to the corresponding contacts 694-1 and 694-2 by electrical circuits which undergo a 180° twist. Similarly, the end portions 694-4 and 695-3 are connected through a 180° twist of the electrical circuits to the contacts 694-3 and 694-4. In this manner, the twisting of the pairs of wires effectively is carried throughout the insert portion up to the actual contacts 694-1 to 694-8.

With this arrangement of the insert portion 666 of the tap-off or in-feed module 623 or 624, selected telecommunications links can be tapped off or fed into the connector units 632 or 633. In particular, the individual contacts are arranged in two rows which allows for the reduction of the overall length of the connector units 632 or 633. Further, the modular construction of these connector units 632 and 633 permits increases and decreases in the number of electrical contacts 646 being accessed in a particular access port 654 depending upon the number of connector modules 692 or connector modules 687 provided.

Also in this embodiment, the forwardmost row of contact portions (694-5 to 694-8) are spaced apart from the leading edge of the insert portion 666. As a result, the leading edge section which is an insulative material first separates or moves the engaged contacts 646 to the disengaged position to break the signal path therethrough. Upon continued insertion of the insert portion 666, the contact portions (694-1 to 694-8) contact the respective contacts 646 to connect the link to the insert portion 666 similar to the arrangement seen in FIG. 40.

Further, while the embodiments of the modular communication system as described herein possess sixteen telecommunication links disposed in groupings of two links each, it will be appreciated that the number of links and the groupings thereof can be significantly varied depending upon user needs, space limitations, accessibility to the closet, and the like. While each access port in the connector assembly can access only a single link, nevertheless it is believed more desirable and expedient to access a pair of links since substantially all workstations require separate voice and data links, and the present invention is able to provide this need in a simple and efficient manner. It will be appreciated that any particular workstation can be provided with additional links, if necessary, merely by using two or more tap-off modules for supplying additional links to the same workstation. Further, even though the access ports may be provided on different sides or surfaces of the connector assembly, it will be recognized that the cables associated with the tap-off modules are sufficiently small and flexible as to enable the cables and the tap-off plugs thereon to be bent around the connector assembly so as to be plugged into an opposite side thereof from the workstation, if desired or necessary.

It will also be understood that the construction and interconnection of the wall panels, as well as the provision of a raceway in association therewith for accommodating the communication system, may assume many different conventional constructions as are well known in the office furniture industry. For example only, however, attention is directed to U.S. Pat. Nos. 4,060,294, 4,080,366, and 4,277,123, all owned by the Assignee hereof, for showing examples of such panels and of the construction thereof.

Reference will now be made to FIGS. 79A–90 which are diagrammatic plan views which illustrate several arrangements and variations of the modular communication system of this invention. In these views, the reference to the "data distribution assembly" refers to the modular communication system, reference to "data tap" means the tap-off module, with the "in-line" data tap being a tap-off module which connects directly into the aligned modules of the system, the reference to the "data distribution segments" mean the main distribution modules, the reference to "quick connectors" mean the connector units, the reference to a "data feed" means the in-feed module, with the "one-way" data feed being connectable at an end or location so that the telecommunication links project only in one direction downstream therefrom, whereas the "two-way" data feed connects intermediate the length of the system so that selected telecommunication links project in opposite directions therefrom. In these drawings, reference is also made to a "data T", this being a connector which is provided as an integral part of the distribution segment and which cooperates with the data taps.

In the modules diagrammatically illustrated in FIGS. 79A–90, the connectors as well as the taps and data feeds are all provided with housings which each possess male and female characteristics so that when two such housings join together as illustrated in the drawings, the male-female parts on one housing respectively mate with the female-male parts on the other housing to provide a quick connect-disconnect between adjacent modules. Such connections in terms of the way in which they interfit to define a non-handed relationship, are themselves well known. The connections, namely the male-female properties associated with the housings thereof, do not effect the contact connections, which contact connections can be generally in accordance with those which have been described above. In this case, however, where the tap-offs have a housing or plug part which plugs either directly in-line or into a separate data T, the connectors no longer need to provide access ports as in the previously described variations.

It should further be noted that the line diagrams associated with FIGS. 79A–90 show only six telecommunication links (i.e. data paths) for purposes of illustration, but the number of such links can obviously be varied as desired, including eight or nine links as described above relative to the variations previously described.

More particularly, a data distribution assembly with in-line data taps and one-way data feeds is illustrated in FIGS. 79A, 79B and 79C. Referencing FIGS. 79A, 79B and 79C, the data distribution assembly includes data distribution segments which have a length equal to a panel length, are pre-wired with connectors attached thereto and are preassembled with a panel. Additionally, the one-way data feed is illustrated in FIG. 79A at the right end thereof although it may be located at either end of the assembly. FIG. 79B illustrates a similar data feed at the opposite end of the assembly which extends to a computer/telephone closet. Quick connectors are provided on the data distribution segments and in-line data taps are provided for voice and data with pre-terminated jacks at the ends thereof. FIG. 79C illustrates the configuration and layout of the modular cabling system with in-line data taps and a bi-directional data feed which may be located anywhere along the length of the data distribution assembly between two serially-adjacent data distribution segments. The bi-directional data feed extends to the computer/telephone closet.

In FIGS. 80A and 80B, a data distribution assembly with data T's is illustrated where the data taps connect to data T's rather than in-line as in previous FIGS. 79A, 79B and 79C. The benefit is that individual users can connect and disconnect without disrupting other users.

In FIG. 80A, the bi-directional data feed is illustrated at the rightward end of the data distribution assembly and extends to a telephone/computer closet. FIG. 80B illustrates the bi-directional data feed connected between two serially-adjacent data distribution segments and extending to the telephone/computer closet. The data taps are pre-terminated and accommodate voice and data.

FIGS. 81A and 81B illustrate a combinational data distribution assembly where the data distribution segments come in two versions, namely, one version having data T's for connection of data taps and another version for pass-through only. Data taps are illustrated which connect to those data distribution segment having the data T therein. FIG. 81A also illustrates one of the pass-through data distribution segments disposed serially between two of the data distribution segments which have data T's. FIG. 81B illustrates a bi-directional data feed connected to the assembly.

Figure 82A:
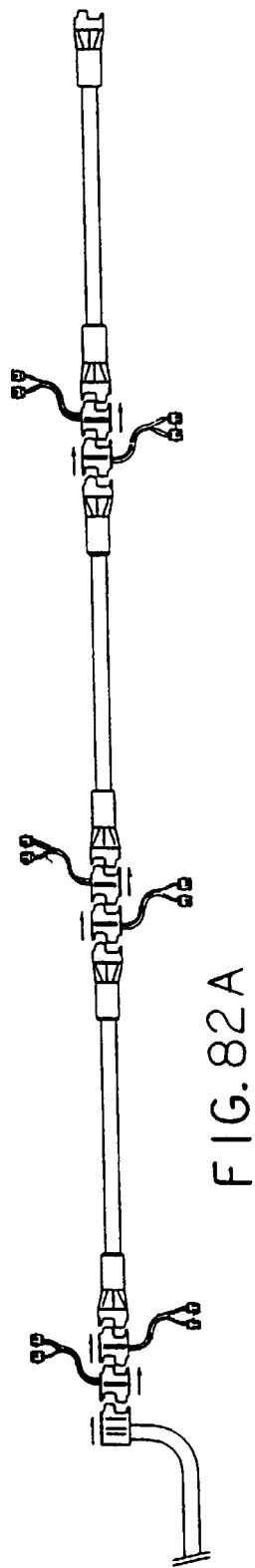
FIGS. 82A and 82B show the data distribution assembly employing extended length data distribution segments (i.e., main distribution modules), with FIGS. 82A and 82B showing different combinations of features.
Figure 82B:
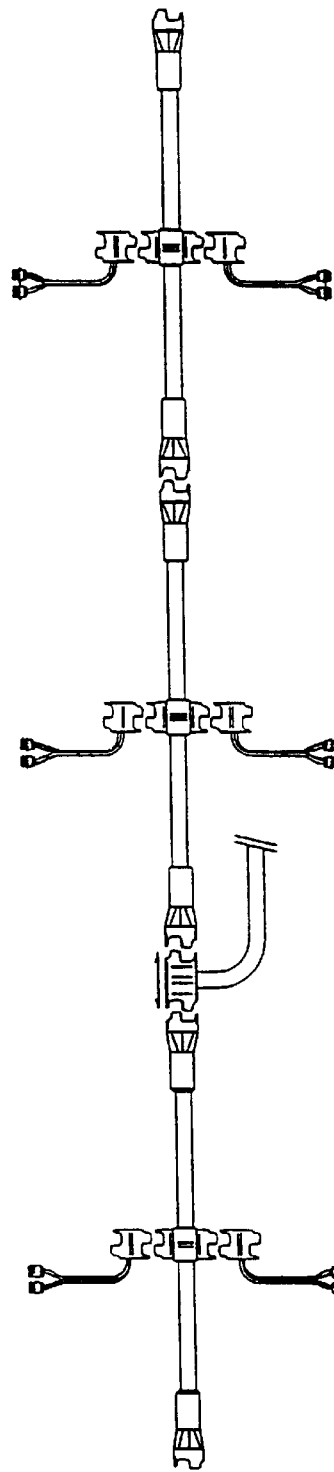

FIGS. 82A and 82B illustrate extended length data distribution segments which are longer in length and run the length of two or more panels. The extended length data distribution segments may be based on office size rather than panel size. FIG. 82A illustrates a data feed at the leftward end of the system while FIG. 82B illustrates the data feed between two serially-adjacent distribution segments.

Figure 83A:
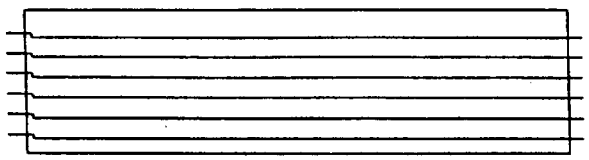
FIGS. 83A and 83B relate solely to the data distribution segment, with FIG. 83B showing the segment structure and FIG. 83A showing the internal telecommunication links which pass therethrough.
Figure 83B:
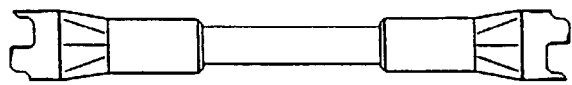

FIGS. 83A and 83B illustrate a data distribution segment having such features as a length based on panel or furniture component size, a non-handed design (genderless connectors), quick connectors on opposite ends for attachment to other segments, feeds or taps, integral strain relief, pre-attachability to furniture-like power systems, and a capacity to service voice and data requirements for a minimum of six offices.

Figure 84A:
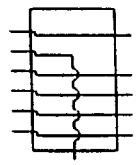
FIGS. 84A and 84B relate to the in-line data tap, with FIG. 84B showing the structure of the data tap and FIG. 84A showing the telecommunication links or paths thereof.
Figure 84B:
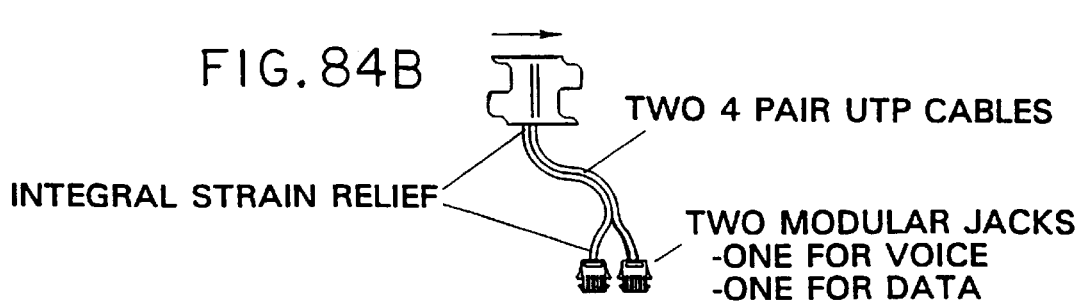

FIGS. 84A and 84B illustrate an in-line data tap which has such features as the ability to access and terminate desired data paths, provide pass-through of all other paths, quick connectors on both ends for attachment to distribution segments, feeds or other taps, pre-terminated modular connectors for computer and phone attachment, and integral strain relief. This in-line data tap must be oriented in a proper direction as illustrated by the reference arrow in FIG. 63A. More particularly, the in-line data tap provides integral strain relief with cables formed of two four-pair UTP (unshielded twisted pair) cables having a siamese configuration and a length which is predetermined. The two modular jacks are provided for voice and for data.

FIGS. 85A and 85B illustrate a data distribution segment with a data T for attachment of data taps. This data distribution segment incorporates such features as a length based on panel or furniture component size, a nonhanded design (genderless connectors), quick connectors on both ends for attachment to other segments, feeds or taps, integral strain relief, pre-attachability to furniture-like power system, a capacity to service voice and data requirements for six offices minimum, and T connectors for attachment of data taps. Insertion of a data tap breaks the continuation of the path therethrough while orientation of the inserted data tap determines the direction of the signal path.

More particularly with respect to FIGS. 80A, 80B, 85A and 85B, these data distribution segments or main distribution modules may be formed in view of the above disclosure wherein the Data T's are formed as an intermediate connector assembly having a plurality of access ports. The intermediate connector assembly provides access to the link in the region between the connector units at the opposite ends thereof. This Data T or connector assembly, however, is formed as a single unit similar to two connector units non-separably joined together while lengths of cable are connected on opposite sides thereof. The lengths of cable terminate at conventional mechanical connectors which passes the links therethrough but do not include access ports as illustrated in FIGS. 85A and 85B. The connector units alternatively may be formed like those described herein to also provide access ports at junction between two serially-adjacent main distribution modules.

FIGS. 86A and 86B illustrate a data tap which uses two modular jacks for voice and data respectively, and two four-pair UTP cables with a siamese configuration and a predetermined length. Integral strain relief is provided for the cables while the data tap incorporates such features as providing access and terminations to desired data paths, orientation of data tap determines direction of data path and data distribution segment, pre-terminated modular connectors for computer and phone attachment, and providing integral strain relief.

FIGS. 87A and 87B illustrate a one-way data feed which provides integral strain relief and connection between a data distribution assembly and the computer/telephone closet. The one-way data feed connects the building cabling to the data distribution assembly with the length and configuration of the closet end of the data feed being provided as necessary. The data feed has the capacity to service voice and data requirements for a minimum of six offices and must be attached to either end of the data distribution assembly since it is not constructed for connection in the middle of a run of data distribution assemblies.

FIGS. 88A and 88B illustrate a bi-directional data feed for connection between the data distribution assembly and the computer/telephone closet while providing integral strain relief. Here again, the building cabling is connected to the data distribution assembly with the length and configuration of the closet end of the data feed to be determined. This data feed provides a six office capacity for voice and data requirements and may be located anywhere along the length of the data distribution assembly with the direction of each data path being selectable for proper routing of signals to desired offices.

FIGS. 89A and 89B illustrate a data distribution segment with a data tap attached where a data path is accessed by the data tap and the data path is discontinued in the direction away from the data tap.

FIG. 90 illustrates a typical layout and configuration of the modular cabling system illustrating a data distribution assembly diagrammatically represented as providing data taps for voice and data to six separate work station areas which data distribution assembly is connected at the rightward end to a data feed as discussed above.

While the modular communication system of this invention has been described above in conjunction with a wall system defined by portable upright space-dividing panels, it will be appreciated that the modular communication system of this invention also has significant capability for use with other components, particularly furniture components, and can, for example, be provided for use on a series of linking desks or worksurfaces. This modular communication system is also highly desirable for use in a beam-type space-dividing arrangement, such type arrangement being illustrated by U.S. Pat. No. 5,236,370.

Attention is also directed to application Ser. No. 08/377,915, filed concurrently herewith, inventors Ross Johnson and Harold Wilson, and entitled "MODULAR COMMUNICATION SYSTEM" (Attorney Reference: Haworth Case 163). The disclosure of this latter-mentioned copending application is incorporated herein, in its entirety, by reference.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A modular telecommunication cabling arrangement for providing access to telecommunication links comprising:

a plurality of elongate main distribution modules which serially couple together, each of said main distribution modules including an elongate intermediate cable having a connector unit at each end thereof and a plurality of conductors extending therebetween, said conductors defining a plurality of telecommunication links extending longitudinally therethrough so as to carry signals between said connector units, each of said connector units having a plurality of recesses which are open on a first side and each include terminals therein that are connected to at least one of said telecommunication links;

said connector units on serially-adjacent ends of two said distribution modules being fixedly coupled together so that said recesses of said connector units on said adjacent ends are aligned one with the other, said terminals of said aligned recesses being engaged one with the other through said open sides for permitting said plurality of multi-conductor telecommunication links to be transmitted longitudinally along said two distribution modules, each pair of said aligned recesses defining an access port for accessing said at least one telecommunication link defined thereat;

each of said main distribution modules comprising a plurality of identical cable assemblies which are joined together to define said cable and said connector units, each said cable assembly including a cable section which defines at least one but less than all of said links and a connector cartridge at each opposite end of said cable section, each of said cartridges defining one of said recesses such that said terminals in said recess are in communication with said cable section, said cartridges at each of said opposite ends being aligned in elongate rows, said main distribution module including first and second joining means for respectively joining each of said rows of cartridges together at said opposite ends of said main distribution module to define said connector units respectively.

2. A cabling arrangement according to claim 1, which includes at least one insert module having an insert part which is insertable into one of said access ports for connection with the at least one telecommunication link defined thereat, said insert part having a plurality of contacts which are engageable with said terminals provided at the access port and are adapted to carry said at least one telecommunication link.

3. A cabling arrangement according to claim 2, wherein said contacts of said insert module are disposed on one side thereof for connection to said terminals of one of said two distribution modules so as to be in communication with said link thereof, said insert module having an insulative material on an opposite side thereof for contacting said terminals of the other of said two distribution modules so as to disconnect said engaged terminals.

4. A cabling arrangement according to claim 3, wherein a plurality of said insert modules are inserted into a plurality of said access ports, each of said insert modules being connected to said respective links at said access ports.

5. A cabling arrangement according to claim 2, wherein said recess of each of said cassettes is open sidewardly on opposite ends thereof such that said access ports have opposite open ends which are disposed on opposite sides of said connector units, said insert module being insertable into either of said opposite open ends of said access port.

6. A cabling arrangement according to claim 1, wherein each of said first and second joining means comprises a hollow housing which receives said row of said cassettes therein, said hollow housing including an open first side through which said cable sections extend and an open second side through which said cartridges project outwardly, said cartridges projecting a limited distance through said open second side such that an open end of said recess is accessible from an exterior of said housing.

7. A cabling arrangement according to claim 6, wherein said open first side is oriented transverse to said second side and said cartridges are inserted one after the other through the open first side.

8. A cabling arrangement according to claim 7, wherein said cartridges are aligned in a longitudinal row extending substantially colinear with said cable sections, said recesses opening through said open second side for alignment with said recesses of an adjacent connector unit.

9. A cabling arrangement according to claim 1, wherein each of said plurality of said main distribution modules are non-handed such that either of said connector units of said first main distribution module are connectable with either of said connector units of said second main distribution module.

10. A telecommunication cabling arrangement comprising:

a plurality of serially-adjacent main distribution modules which have an elongate multi-conductor cable and a connector unit connected to one end of each said cable, said cable defining a plurality of telecommunication links to which said connector unit is connected, said connector units of an adjacent pair of said main distribution modules being removably joined together such that said respective links are connected therebetween;

said main distribution module comprising a plurality of cable sections which define said cable and each define at least one but less than all of said links, each of said cable sections including a cassette at one end thereof which defines an access opening and includes terminals which are connected to said conductors of said cable section and are accessible through said access opening;

said main distribution module further including a housing which is hollow so as to accommodate a plurality of said cassettes therein, said cassettes being received in said housing such that said access openings are accessible from said housing, said cassettes and said housing defining said connector unit wherein when said connector units of said adjacent pair of said main distribution modules are joined together, said access openings define a plurality of access ports which permit access to said terminals of said cassettes.

11. A cabling arrangement according to claim 10, wherein said access ports open through at least one side of said housing in a direction oriented transverse to the longitudinal length of said cable.

12. A cabling arrangement according to claim 11, wherein said row of said access ports extends longitudinally.

13. A cabling arrangement according to claim 10, wherein said cable sections include one said cassette at each opposite end thereof, said housing being a first housing and a second said housing being provided wherein said first housing and said second housing receive said cassettes at said opposite ends of said cable section respectively.

14. A cabling arrangement according to claim 10, wherein each of said access ports is defined by an opposing pair of said access openings, said pair of said access openings defining opposite sides of said access port wherein said respective terminals removably interconnected to join said links of said adjacent pair of said main distribution modules.

15. A cabling arrangement according to claim 14, wherein said interconnected terminals are separable and said cabling arrangement further includes an insert which is insertable into said access port and separates said interconnected terminals one from the other, said insert including conductors on one side thereof which connect with said terminals of one of said main distribution modules.

16. A cabling arrangement according to claim 15, wherein said insert includes an outlet connected to said terminals.

17. A cabling arrangement according to claim 15, wherein said insert connects a source to said terminals.

18. A cabling arrangement according to claim 10, wherein said cable section is flat ribbon cable which defines a layer of said cable, said plurality of said cable sections being laid one next to the other to define said cable.

19. A cabling arrangement according to claim 10, wherein said access ports are arranged one next to the other in a row.

* * * * *

UNITED STATES PATENT AND TRADEMARK OFFICE
CERTIFICATE OF CORRECTION

PATENT NO : 5,964,609
DATED : October 12, 1999
INVENTOR(S): Harold R. WILSON et al It is certified that error appears in the above-identified patent and that said Letters Patent is hereby corrected as shown below:

Column 42, line 59;   after "which" insert ---each---.

Column 42, line 66;   before "said" insert ---each---.

Column 43, line 6;    before "said" insert ---each---.

Signed and Sealed this

Thirteenth Day of June, 2000

Attest:

Q. TODD DICKINSON

*Attesting Officer*       *Director of Patents and Trademarks*